United States Patent
Ko et al.

(10) Patent No.: US 12,425,577 B2
(45) Date of Patent: Sep. 23, 2025

(54) VIDEO SIGNAL PROCESSING METHOD AND APPARATUS USING MULTI-ASSUMPTION PREDICTION

(71) Applicant: WILUS INSTITUTE OF STANDARDS AND TECHNOLOGY INC., Seongnam-si (KR)

(72) Inventors: Geonjung Ko, Seoul (KR); Dongcheol Kim, Suwon-Si (KR); Juhyung Son, Uiwang-Si (KR); Jaehong Jung, Seoul (KR); Jinsam Kwak, Anyang-Si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 0 days.

(21) Appl. No.: 18/664,990

(22) Filed: May 15, 2024

(65) Prior Publication Data
US 2024/0305775 A1    Sep. 12, 2024

Related U.S. Application Data

(63) Continuation of application No. 18/065,839, filed on Dec. 14, 2022, now Pat. No. 12,047,562, which is a
(Continued)

(30) Foreign Application Priority Data

| | | |
|---|---|---|
| Oct. 12, 2018 | (KR) | 10-2018-0121620 |
| Nov. 22, 2018 | (KR) | 10-2018-0145792 |
| Sep. 6, 2019 | (KR) | 10-2019-0111060 |

(51) Int. Cl.
*H04N 19/105* (2014.01)
*H04N 19/159* (2014.01)
(Continued)

(52) U.S. Cl.
CPC ........ *H04N 19/105* (2014.11); *H04N 19/159* (2014.11); *H04N 19/176* (2014.11); *H04N 19/186* (2014.11); *H04N 19/70* (2014.11)

(58) Field of Classification Search
CPC .. H04N 19/105; H04N 19/159; H04N 19/176; H04N 19/186; H04N 19/70
(Continued)

(56) References Cited

U.S. PATENT DOCUMENTS

| | | |
|---|---|---|
| 9,749,646 B2 | 8/2017 | Zhu et al. |
| 2013/0107970 A1 | 5/2013 | Wang et al. |

(Continued)

FOREIGN PATENT DOCUMENTS

| | | |
|---|---|---|
| CN | 102907100 A | 1/2013 |
| CN | 105264889 A | 1/2016 |

(Continued)

OTHER PUBLICATIONS

Non-Final Rejection of U.S. Appl. No. 17/227,839 from the USPTO dated Mar. 30, 2022.
(Continued)

*Primary Examiner* — Albert Kir

(57) ABSTRACT

A video signal processing method comprises the steps of: receiving information for prediction of a current block; determining whether or not a merge mode is applied to the current block on the basis of the information for prediction; when a merge mode is applied to the current block, obtaining a first syntax element indicating whether or not a combined prediction is applied to the current block, wherein the combined prediction indicates a prediction mode that combines inter-prediction and intra-prediction; generating an inter-prediction block and an intra-prediction block of the current block when the first syntax element indicates that the combined prediction is applied to the current block; and
(Continued)

generating a combined prediction block of the current block by weighted-summing the inter-prediction block and the intra-prediction block.

20 Claims, 24 Drawing Sheets

Related U.S. Application Data continuation of application No. 17/227,839, filed on Apr. 12, 2021, now Pat. No. 11,601,641, which is a continuation of application No. PCT/KR2019/013450, filed on Oct. 14, 2019.

(51) Int. Cl.
  *H04N 19/176*   (2014.01)
  *H04N 19/186*   (2014.01)
  *H04N 19/70*    (2014.01)
(58) Field of Classification Search
  USPC ................................................ 375/240.02
  See application file for complete search history.

(56) References Cited

U.S. PATENT DOCUMENTS

| | | | |
|---|---|---|---|
| 2013/0208794 | A1 | 8/2013 | Jeong |
| 2016/0373742 | A1 | 12/2016 | Zhao et al. |
| 2017/0142418 | A1 | 5/2017 | Li et al. |
| 2017/0251213 | A1 | 8/2017 | Ye |
| 2018/0077423 | A1 | 3/2018 | Xu et al. |
| 2019/0320203 | A1* | 10/2019 | Chiang ............... H04N 19/132 |
| 2020/0260091 | A1 | 8/2020 | Pham Van et al. |
| 2020/0374528 | A1 | 11/2020 | Huang |
| 2021/0120235 | A1 | 4/2021 | Liao |
| 2022/0007057 | A1* | 1/2022 | Liu ...................... H04N 19/119 |
| 2022/0086486 | A1 | 3/2022 | Lim |
| 2022/0132119 | A1* | 4/2022 | Zhang .................. H04N 19/96 |
| 2022/0279162 | A1 | 9/2022 | Ko et al. |

FOREIGN PATENT DOCUMENTS

| | | |
|---|---|---|
| CN | 105934948 A | 9/2016 |
| CN | 107736022 A | 2/2018 |
| CN | 107925759 A | 4/2018 |
| CN | 109479141 A | 3/2019 |
| EP | 3866468 A1 | 8/2021 |
| JP | 2009081576 A | 4/2009 |
| JP | 2022543207 A | 10/2022 |
| KR | 10-2014-0136428 A | 11/2014 |
| KR | 10-2015-0081236 A | 7/2015 |
| KR | 10-2017-0059718 A | 5/2017 |
| KR | 10-2018-0005121 A | 1/2018 |
| KR | 10-2018-0007345 A | 1/2018 |
| KR | 10-2018-0041211 A | 4/2018 |
| KR | 10-2018-0043787 A | 4/2018 |
| WO | 2011-126272 A2 | 10/2011 |
| WO | 2017/039117 A | 3/2017 |
| WO | 2019076138 A1 | 4/2019 |
| WO | 2021-015586 A1 | 1/2021 |

OTHER PUBLICATIONS

Chiang,"CE10.1: Combined and multi-hypothesis prediction", JVET of ITU-T SG 16 WP 3 and ISO/IEC JTC 1/SC 29/WG 11, Jul. 10, 2018 (Year: 2018).
Notice of Allowance of U.S. Appl. No. 17/227,839 from the USPTO dated Sep. 14, 2022.
Examination report under sections 12 & 13 of the Patents Act, 1970 and the Patents Rules, 2003 for Application No. 202127017390 from Intellectual Property of India. Aug. 2, 2022.
The Extended European Search Report for EP Application No. 19870803.4 from EPO. Jun. 29, 2022.
The Extended European Search Report for EP Application No. 20844004.0 from EPO. Aug. 2, 2022.
Xiu (Kwai) X et al: "CE2-related: Prediction dependent luma residual scaling for adaptive in-loop re-shaper", 15. JVET Meeting; Jul. 3, 2019-Jul. 12, 2019; Gothenburg; (The Joint Video Explaration Team of ISO/IEC JTC1/SC29/WG11 and ITU-T SG.16), No. JVET-O0603; m48742 Jul. 1, 2019 (Jul. 1, 2019), XP030220023, Retrieved from the Internet: URL:http://phenix.int-evry.fr/jvet/doc_end_user/documents/15_Gothenburg/wg11/JVET-O0603-v2.zip JVET-O0603-WD-text.docx [retrieved on Jul. 1, 2019].
Corrected Notice of Allowance for U.S. Appl. No. 17/227,839 from USPTO dated Nov. 7, 2022.
Notice of Reasons for Refusal for Japanese Patent Application No. 2021-519860 from Japanese Intellectual Property Office. Dec. 23, 2022.
"Versatile Video Coding (Draft 2)" Benjamin Bross et al. Joint Video Experts Team (JVET) of ITU-T SG 16 WP 3 and ISO/IEC JTC 1/SC 29/WG 11 11th Meeting: Ljubljana, SI, Jul. 10-18, 2018. Document: JVET-K1001-v7.
"CE3-6.2.1: Extended MPM list" Ling Li et al. Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0165-v4.
JVET-L0165_CE3_6.2.1_VTM_results.xlsm.
JVET-L0165_CE3_additional_VTM_results.
Benjamin Bross, et al.,Versatile Video Coding (Draft 6), Joint Video Experts Team (JVET) of ITU-T SG 16 WP 3 and ISO/IEC JTC 1/SC 29/WG 11, JVET-O2001-vE, Jul. 31, 2019,pp. 268-269.
Corrected Notice of Allowance for U.S. Appl. No. 17/227,839 from USPTO dated Feb. 6, 2023.
Notice of reasons for rejection by examiner Daigoro Bando from Japan Patent Office. Application No. 2022-505306 Dated May 8, 2023.
Benjamin Bross Et Al., "Versatile Video Coding" (Draft 6), and Joint Video Experts Team (JVET), Jul. 24, 2019, [JVET-O2001-vC] (version 12), pp. 36,69,144,202-204,211-212.
Zhipin Deng Et Al., "Non-CE4 : Cleanups on MVD Ranges" and Joint Video Experts Team (JVET), Jul. 8, 2019, [JVET-O0567-v2] (version 4).
Notification of first office action from China National Intellectual Property Administration for Application No. 201980067130.8. & Search Report. Dated Jun. 29, 2023.
Official Action from European Patent Office. Applicant: Wilus Institute of Standards and Technology Inc. Application No. 20 844 004.0-1208. Dated Jul. 13, 2023.
Ko (Wilusgroup) G et al: "Non-CE4: Neighboring locations for CIIP", 128. MPEG Meeting; Oct. 7, 2019-Oct. 11, 2019; Geneva; (Motion Picture Expert Group or ISO/IEC JTC1/SC29/WG11), No. m50568 Sep. 25, 2019 (Sep. 25, 2019), XP030206699. Retrieved from the Internet: URL:http://phenix.int-evry.fr/mpeg/doc_end_user/documents/128_Geneva/wg11 /m50568-JVET-P0595-V1 -JVET-P0595.zip JVET-P0595.docx [retrieved on Sep. 25, 2019].
NOA from Japan Patent Office; Issue Date: Jul. 31, 2023; Application No. 2021-519860; Applicant: Virus Institute of Standards and Technology Incorporated.
Author: Zhao, Yin et al. , Title: CE6: Sub-Block Transform for Inter Blocks (CE6.4.1),JVET-M0140 (version 3) , ITU , Jan. 16, 2019. Source: Huawei Technologies Co., Ltd.
Office Action from Japan Patent Office; Issue Date: Sep. 22, 2023; Application No. 2022-505306; Applicant: Wilus Institute of Standards and Technology Inc. Title: Video Signal Processing Method and Device.
Notice of Allowance for U.S. Appl. No. 17/629,385 from the USPTO dated Dec. 12, 2024.
Office Action for KR Application No. 10-2021-7012536 from KIPO dated Jan. 18, 2024.
Man Shu Chiang, et. al., "CE10.1: Combined and multi-hypothesis prediction", Joint Video Experts Team (JVET) of ITU-T SG 16 WP 3 and ISO/IEC JTC 1/SC 29/WG 11 11th Meeting: Ljubljana, SI, Jul. 10-18, 2018, JVET-K0257-v1.

(56) References Cited

OTHER PUBLICATIONS

Notice of Allowance for Chinese Application No. 201980067130.8 from the China National Intellectual Property Administration dated Jan. 31, 2024.
Pre-Appeal Examination Report for Japanese Patent Application No. 2022-505306 from Japan Patent Office dated Feb. 27, 2024.
Hearing Notice from Intellectual Property of India for Application No. 202227004628 dated Mar. 19, 2024.
Non-final rejection for U.S. Appl. No. 18/065,839 from USPTO dated Dec. 14, 2022.
Notice of allowance for U.S. Appl. No. 18/065,839 from USPTO dated Feb. 22, 2024.
Corrected Notice of allowance for U.S. Appl. No. 18/065,839 from USPTO dated Mar. 13, 2024.
Corrected Notice of allowance for U.S. Appl. No. 18/065,839 from USPTO dated Mar. 27, 2024.
Corrected Notice of allowance for U.S. Appl. No. 18/065,839 from USPTO dated May 2, 2024.
International Search Report of International application No. PCT/KR2019/013450. Feb. 11, 2020.
Written Opinion of International application No. PCT/KR2019/013450. Feb. 11, 2020.
"Versatile Video Coding (Draft 4)". Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M1001-v5.
"CE10: CIIP with position-independent weights (Test CE10-1.1)". Joint Video Experts Team (JVET) of ITU-T SG 16 WP 3 and ISO/IEC JTC 1/SC 29/WG 11 14th Meeting: Geneva, CH, Mar. 19-27, 2019. Document: JVET-N0302_v1.
CE10: CIIP with position-independent weights (CE10-1.1). PPT presented by L. Pham Van, G. Van der Auwera, A. K. Ramasubramonian, Vadim Seregin, M. Karczewicz.
CE10: CIIP with position-independent weights (Test CE10-1.1)/JVET-NO302/2019-03-13_Tester_xlsm(Excel Chart).
Benjamin Bross et al. Versatile Video Coding (Draft 6), Joint Video Experts Team (JVET) of ITU-T SG 16 WP 3 and ISO/IEC JTC 1/SC 29/WG 11, JVET-O2001-vC, 15th Meeting: Gothenburg, SE, pp. 1-419, Jul. 24, 2019[Retrieved on:Oct. 12, 2020.
Benjamin Bross et al. Versatile Video Coding (Draft 7), Joint Video Experts Team (JVET) of ITU-T SG 16 WP 3 and ISO/IEC JTC 1/SC 29/WG 11, JVET-P2001-v5, 16th Meeting: Geneva, CH, pp. 1-446, Oct. 13, 2019 [Retrieved on:Oct. 12, 2020.
"Non-CE4: Neighboring locations for CIIP" Joint Video Experts Team (JVET) of ITU-T SG 16 WP 3 and ISO/IEC JTC 1/SC 29/WG 11 16th Meeting: Geneva, CH, Oct. 1-11, 2019. Document: JVET-P0595.
"JVET-P0595 Non-CE4: Neighboring locations for CIIP" G. Ko, D. Kim, J. Jung, J. Son, J. Kwak. Oct. 2019 Wilus Inc.
Examination report under sections 12 & 13 of the Patents Act, 1970 and the Patents Rules, 2003 for Application No. 202107017390 from Intellectual Property of India. Aug. 2, 2022.
"Versatile Video Coding (Draft 2)" Joint Video Experts Team (JVET) of ITU-T SG 16 WP 3 and ISO/IEC JTC 1/SC 29/ WG 11 11th Meeting: Ljubljana, SI, Jul. 10-18, 2018. Document: JVET-K1001-v7.
JVET-L0100 CE10.1: Combined and multi-hypothesis prediction (CE10.1.1.a, CE10.1.1.b, CE10.1.1.c, CE10.1.1.d) Man-Shu Chiang, Chih-Wei Hsu, Yu-Wen Huang, Shaw-Min Lei. Presenter: Man-Shu Chiang.
JVET-L0100 CE10.1_Result Table 2.xlsm.
JVET-L0100 CE10.1_Result Table 3.xlsm.
JVET-L0100 CE10.1_Result Table 4.xlsm.
JVET-L0100 CE10.1_Result Table 5.xlsm.
JVET-L0100 CE10.1_Result Table 6.xlsm.
JVET-L0100 CE10.1_Result Table 7.xlsm.
JVET-L0100 CE10.1_Result Table 8.xlsm.
"CE10.1.1: Multi-hypothesis prediction for improving AMVP mode, skip or merge mode, and intra mode". Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0100-v1.
"CE10.1.1: Multi-hypothesis prediction for improving AMVP mode, skip or merge mode, and intra mode". Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0100-v2 (Mark-Up).
"CE10.1.1: Multi-hypothesis prediction for improving AMVP mode, skip or merge mode, and intra mode". Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0100-v2-clean.
"CE10.1.1: Multi-hypothesis prediction for improving AMVP mode, skip or merge mode, and intra mode". Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0100-v3 (Mark-Up).
"CE10.1.1: Multi-hypothesis prediction for improving AMVP mode, skip or merge mode, and intra mode". Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L0100-v3-clean.
English Translation of Written Opinion of International application No. PCT/KR2019/013450. Feb. 11, 2020.
International Search Report of International application No. PCT/KR2020/009783. Oct. 27, 2020.
English Translation of Written Opinion of International application No. PCT/KR2020/009783. Oct. 27, 2020.
Mn Zhao, et al. , CE6: Sub-block transform for inter blocks (CE6.1.2) , Joint Video Experts Team (JVET) of ITU-T SG 16 WP 3 and ISO/IEC JTC 1/SC 29/WG 11 , JVET-L0358-v2 , Sep. 30, 2018.
Chih-Wei Hsu and Martin Winken , Description of Core Experiment 10: Combined and multi-hypothesis prediction , Joint Video Experts Team (JVET)of ITU-T SG 16 WP 3 and ISO/IEC JTC 1/SC 29/WG 11 , JVET-L1030-v1 , Oct. 12, 2018.
Benjamin Bross, et al. , Versatile Video Coding (Draft 3) , Joint Video Experts Team (JVET) of ITU-T SG 16 WP 3 and ISO/IEC JTC 1/SC 29/WG 11 , JVET-L1001-v2 , Nov. 8, 2018. , pp. 63-64, 67-68.
Zhang (Qualcomm) K et al: "Intra-prediction Mode Propagation for Inter-pictures", 10. JVET Meeting; Apr. 10, 2018-Apr. 20, 2018; San Diego; (The Joint Video Exploration Team of ISO/IEC JTC1/SC29/WG11 and ITU-T SG.16), No. JVET-J0053 Apr. 15, 2018 (Apr. 15, 2018), XP030248264, Retrieved from the Internet: URL: http://phenix.int-evry.fr/jvet/doc_end_user/documents/10_San%20Diego/wg11/JVET-J0053-v3.zip JVET-J0053.dox.
C-W Hsu (Mediatek) et al: "Description of SDR video coding technology proposal by MediaTek", 10. JVET Meeting; Apr. 10, 2018-Apr. 20, 2018; San Diego; (The Joint Video Exploration Team of ISO/IEC JTC1/SC29/ WG11 and ITU-T SG.16), No. JVET-J0018 Apr. 11, 2018 (Apr. 11, 2018), XP030248125, Retrieved from the Internet: URL: http://phenix.int-evry.fr/jvet/doc_end_user/documents/10_San%20Diego/wg11/JVET-J0018-v2.zip JVET-J0018.docx.
Zhao (Huawei) Y et al: "CE6: Sub-block transform for inter blocks (CE6.1.2)", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0358 Sep. 30, 2018 (Sep. 30, 2018), pp. 1-9, XP030194091, Retrieved from the Internet: URL: http://phenix.int-evry.fr/jvet/doc_end_user/documents/12_Macao/wg11/JVET-L0358-v2.zip JVET-L0358-v2.docx.
Examination report under sections 12 & 13 of the Patents Act, 1970 and the Patents Rules, 2003 for Application No. 202107017390 from Intellectual Property of India. Jun. 24, 2022.
Notice of Reasons for Refusal for Japanese Patent Application No. 2021-519860 from Japanese Intellectual Property Office. Jun. 6, 2022.

(56) References Cited

OTHER PUBLICATIONS

The Extended European Search Report from EPO. Jun. 29, 2022.
Yin Zhao, et al., CE6: Sub-block transform for inter blocks (CE6.1.2), Joint Video Experts Team (JVET) of ITU-T SG 16 WP 3 and ISO/IEC JTC 1/SC 29/WG 11, JVET-L0358-v1, Sep. 25, 2018.
JVET-L0358_anchor_bugfix.xlsmReference:BMS2.0.1_vtmCfg Tested:BMS2.0.1_vtmCfg_SVT6.1.2-a.
JVET-L0358_CE6_1_2-a_bmsCfg.pdf Reference:BMS2.0.1_bmsCfg Tested:BMS2.0.1_bmsCfg_SVT6.1.2-a.
JVET-L0358_CE6_1_2-a_vtmCfg.xlsm Reference:BMS2.0.1_vtmCfg Tested:BMS2.0.1_vtmCfg_SVT6.1.2-a.
JVET-L0358_CE6_1_2-a_vtmCfg_emt3.xlsm Reference:BMS2.0.1_vtmCfg_emt3 Tested:BMS2.0.1_vtmCfg_SVT6.1.2-a_emt3.
JVET-L0358_CE6_1_2-b_bmsCfg.pdf Reference:BMS2.0.1_bmsCfg Tested:BMS2.0.1_bmsCfg_SVT6.1.2-b.
JVET-L0358_CE6_1_2-b_vtmCfg.pdf Reference:BMS2.0.1_vtmCfg Tested:BMS2.0.1_vtmCfg_SVT6.1.2-b.
JVET-L0358_CE6_1_2-b_vtmCfg_emt3.xlsm Reference:BMS2.0.1_vtmCfg_emt3 Tested:BMS2.0.1_vtmCfg_SVT6.1.2-b_emt3.
JVET-L0358_CE6_1_2-b_vtmCfg_emt3_svt_vs-svt.xlsm Reference:BMS2.0.1_vtmCfg_emt3 Tested:BMS2.0.1_vtmCfg_SVT6.1.2-b_emt3.
Examination report under sections 12 & 13 of the Patents Act, 1970 and the Patents Rules, 2003 for Application No. 202227004628 from Intellectual Property of India. Jun. 24, 2022.
Pham Van (Qualcomm) L et al: "CE10: CIIP with position-independent weights (Test CE10-1.1)", 14. JVET Meeting; Mar. 19, 2019-Mar. 27, 2019; Geneva; (The Joint Video Exploration Team of ISO/IEC JTC1/SC29/WG11 and ITU-T SG.16), No. JVET-N0302 Mar. 13, 2019 (Mar. 13, 2019), XP030202954, Retrieved from the Internet: URL: http://phenix.int-evry.fr/jvet/doc_end_user/documents/14_Geneva/wg11/JVET-N0302-v1.zip JVET-N0302_Spec.docx [retrieved on Mar. 13, 2019].
The extended European search report for Application No./Patent No. 20844004.0-1208 / 4007282 PCT/KR2020009783. Dated Aug. 2, 2022.
Communication under Rule 71(3) EPC for EP Application No. 20844004.0. from EPO dated Jun. 18, 2024. (NOA).
Hearing Notice in Reference of Application No. 202127017390 from Intellectual Property India, dated Jul. 15, 2024.
Communication pursuant to Article 94(3) EPC for EP Application No. 19870803.4 from EPO dated Jul. 9, 2024. (Office Action).
Non-Final Office Action of U.S. Appl. No. 18/584,910 from USPTO dated Aug. 12, 2024.
Notice of reasons for refusal for application No. 2023-140496 from Japanese Patent Office dated Aug. 23, 2024.
Written Decision on Registration for application No. 10-2021-7012536 from Korean Intellectual Property Office dated Sep. 26, 2024.
Notification of First Office Action for PCT Application Entering Chinese National Phase Application No. 202080053632.8 from China National Intellectual Property Administration dated Nov. 11, 2024.
Notice of Allowance for VN Application No. 1-2021-02638 from Intellectual Property Office of Vietnam dated Nov. 25, 2024.
Notice for Reasons for Refusal for JP Patent Application No. 2024-000706 from Japanese Patent Office dated Dec. 11, 2024.
Office Action/Rejection issued by Chinese Patent Office, in counterpart Patent Application No. 202080053632.8 on May 22, 2025.
Decision issued by Administrative Judge of the Japanese Patent Office, Board of Appeals for Japanese Application No. 2022-505306 on Mar. 7, 2025.
Extended European Search Report (EESR) issued by European Patent Office for European Patent Application No. EP 24209367.2 on Mar. 24, 2025.
Office Action/Rejection issued by Korean Patent Office, in counterpart Patent Application 10-2022-7002072, on Aug. 18, 2025.

* cited by examiner

Updating process consists of the following ordered steps:
1. For each index HMVPIdx with HMVPIdx = 0 .. HMVPCandNum - 1,
   the following steps apply in order until variable sameCand equal to true:
   - if mvCand have the same motion vectors and the same reference indices,
     as HMVPCandList[ HMVPIdx ], the vaiable sameCand is set to true.
   - Otherwise, the vaiable sameCand is set to false.
   - HMVPIdx ++
2. Variable tempIdx is set to HMVPCandNum.
3. If sameCand is equal to true or HMVPCandNum equal to 6,
   for each index tempIdx with tempIdx = (sameCand ? HMVPIdx :1) ... HMVPCandNum - 1,
   copy HMVPCandList[ tempIdx ] to HMVPCandList[ tempIdx - 1]
4. Copy mvCand to HMVPCandList[tempIdx]
5. If HMVPCandNum is smaller than 6, HMVPCandNum is increased by 1

*FIG. 14*

Updating process consists of the following ordered steps:
1. For each index HMVPIdx with HMVPIdx = 1 .. HMVPCandNum - 1,
   the following steps apply in order until variable sameCand equal to true:
   - if mvCand have the same motion vectors and the same reference indices,
     as HMVPCandList[ HMVPIdx ], the vaiable sameCand is set to true.
   - Otherwise, the vaiable sameCand is set to false.
   - HMVPIdx ++
2. Variable tempIdx is set to HMVPCandNum.
3. If sameCand is equal to true or HMVPCandNum equal to 6,
   for each index tempIdx with tempIdx = (sameCand ? HMVPIdx :1) ... HMVPCandNum - 1,
   copy HMVPCandList[ tempIdx ] to HMVPCandList[ tempIdx - 1]
4. Copy mvCand to HMVPCandList[tempIdx]
5. If HMVPCandNum is smaller than 6, HMVPCandNum is increased by 1

*FIG. 15*

Updating process consists of the following ordered steps:
1. For each index HMVPIdx with HMVPIdx = (HMVPCandNum − NumPrune + 1) .. HMVPCandNum − 1,
   the following steps apply in order until variable sameCand equal to true:
   – if mvCand have the same motion vectors and the same reference indices,
     as HMVPCandList[ HMVPIdx ], the variable sameCand is set to true.
   – Otherwise, the variable sameCand is set to false.
   – HMVPIdx ++
2. Variable tempIdx is set to HMVPCandNum.
3. If sameCand is equal to true or HMVPCandNum equal to 6,
   for each index tempIdx with tempIdx = (sameCand ? HMVPIdx : 1) .. HMVPCandNum − 1,
   copy HMVPCandList[ tempIdx ] to HMVPCandList[ tempIdx − 1]
4. Copy mvCand to HMVPCandList[tempIdx]
5. If HMVPCandNum is smaller than 6, HMVPCandNum is increased by 1

FIG. 16

Updating process consists of the following ordered steps:
1. For each index HMVPIdx with HMVPIdx = HMVPCandNum − 1 .. 0,
   the following steps apply in order until variable sameCand equal to true:
   – if mvCand have the same motion vectors and the same reference indices,
     as HMVPCandList[ HMVPIdx ], the variable sameCand is set to true.
   – Otherwise, the variable sameCand is set to false.
   – HMVPIdx --
2. Variable tempIdx is set to HMVPCandNum.
3. If sameCand is equal to true or HMVPCandNum equal to 6,
   for each index tempIdx with tempIdx = (sameCand ? HMVPIdx : 1) .. HMVPCandNum − 1,
   copy HMVPCandList[ tempIdx ] to HMVPCandList[ tempIdx − 1]
4. Copy mvCand to HMVPCandList[tempIdx]
5. If HMVPCandNum is smaller than 6, HMVPCandNum is increased by 1

FIG. 17

HMVPCandList[Idx] ←—— One of L0 and L1 motion information ——→ New motion information

FIG. 18 mh_intra_flag = 0
IntraPredMode
    = INTRA_HOR

Neighboring block mh_intra_flag = 1
**candIntraPredMode
    = INTRA_HOR**

Current block

The variable scallFact is derived as follows:
scallFact = ( cIdx == 0 ) ? 0 : 1.

The neighbouring luma locations ( xNbA, yNbA ) and ( xNbB, yNbB ) are set equal to ( xCb − 1, yCb − 1 + ( cbHeight << scallFact ) ) and ( xCb − 1 + (cbWidth << scallFact ), yCb − 1 ), respectively.

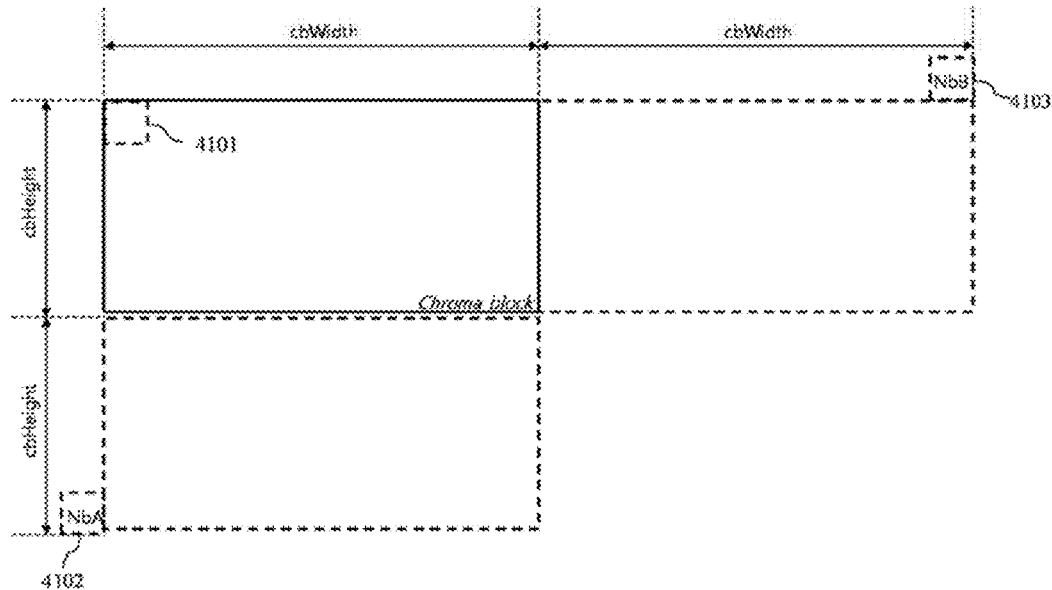

FIG. 41

The variable scallFact is derived as follows:

scallFactWidth = ( cIdx = = 0 || SubWidthC = = 1 ) ? 0 : 1
scallFactHeight = ( cIdx = = 0 || SubHeightC = = 1 ) ? 0 : 1

The neighbouring luma locations ( xNbA, yNbA ) and ( xNbB, yNbB ) are set equal to ( xCb − 1, yCb − 1 + ( cbHeight << scallFactHeight ) ) and ( xCb − 1 + ( cbWidth << scallFactWidth ), yCb − 1 ), respectively.

FIG. 42

The variable scallFact is derived as follows:

scallFactWidth = ( cIdx = = 0 || SubWidthC = = 1 ) ? 1 : 2
scallFactHeight = ( cIdx = = 0 || SubHeightC = = 1 ) ? 1 : 2

The neighbouring luma locations ( xNbA, yNbA ) and ( xNbB, yNbB ) are set equal to ( xCb − 1, yCb − 1 + ( cbHeight * scallFactHeight ) ) and ( xCb − 1 + ( cbWidth * scallFactWidth ), yCb − 1 ), respectively.

FIG. 43

The variable scallFact is derived as follows:

scallFactWidth = ( cIdx == 0 || SubWidthC == 1 ) ? 0 : 1 scallFactHeight = ( cIdx == 0 || SubHeightC == 1 ) ? 0 : 1

The neighbouring luma locations ( xNbA, yNbA ) and ( xNbB, yNbB ) are set equal to ( xCb − 1, yCb − 1 + ( cbHeight << scallFactHeight ) ) and ( xCb − 1 + (cbWidth << scallFactWidth ), yCb − 1 ), respectively.

VIDEO SIGNAL PROCESSING METHOD AND APPARATUS USING MULTI-ASSUMPTION PREDICTION

CROSS-REFERENCE TO RELATED APPLICATIONS

This application is a continuation of pending U.S. application Ser. No. 18/065,839, which was filed on Dec. 14, 2022, and which is a continuation of U.S. application Ser. No. 17/227,839, which was filed on Apr. 12, 2021, now issued as U.S. Pat. No. 11,601,641 on Mar. 7, 2023, and which is a continuation of PCT International Application No. PCT/KR2019/013450, which was filed on Oct. 14, 2019, and which claims priority under 35 U.S.C 119(a) to Korean Patent Application No. 10-2018-0121620 filed with the Korean Intellectual Property Office on Oct. 12, 2018, Korean Patent Application No. 10-2018-0145792 filed with the Korean Intellectual Property Office on Nov. 22, 2018, and Korean Patent Application No. 10-2019-0111060 filed with the Korean Intellectual Property Office on Sep. 6, 2019. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DETAILED DESCRIPTION OF THE INVENTION

Technical Problem

An aspect of the present disclosure is to increase coding efficiency of a video signal. Further, another aspect of the present disclosure is to increase signaling efficiency related to a motion information set of a current block.

Technical Solution

In order to solve the above-mentioned problems, the present disclosure provides a video signal processing device and a video signal processing method.

In accordance with an aspect of the present disclosure, a video signal processing method may include: configuring a merge candidate list using a spatial candidate; adding, to the merge candidate list, a predetermined history-based motion vector predictor (HMVP) in a HMVP table including at least one HMVP, wherein the HMVP is motion information of a block that was coded in advance of a plurality of coding blocks; obtaining index information indicating a merge candidate used for prediction of the current block in the merge candidate list; and generating a prediction block of the current block based on motion information of the merge candidate determined based on the index information, wherein if the current block is located in a merge sharing node including a plurality of coding blocks, the merge candidate list is configured using a spatial candidate adjacent to the merge sharing node, and motion information of at least one of the plurality of coding blocks included in the merge sharing node is not updated in the HMVP table.

In accordance with an aspect of the present disclosure, a video signal processing device may include a processor, wherein the processor configures a merge candidate list using a spatial candidate, adds, to the merge candidate list, a predetermined history-based motion vector predictor (HMVP) in a HMVP table including at least one HMVP, wherein the HMVP is motion information of a block that was coded in advance of a plurality of coding blocks, obtains index information indicating a merge candidate used for prediction of the current block in the merge candidate list, and generates a prediction block of the current block based on motion information of the merge candidate determined based on the index information, wherein if the current block is located in a merge sharing node including a plurality of coding blocks, the merge candidate list is configured using a spatial candidate adjacent to the merge sharing node, and motion information of at least one of the plurality of coding blocks included in the merge sharing node is not updated in the HMVP table.

According to an embodiment, the method may further include updating the HMVP table using motion information of a predetermined number of coding blocks which have relatively late turns in the order of decoding among the plurality of coding blocks included in the merge sharing node.

According to an embodiment, the method may further include updating the HMVP table using motion information of a coding block which have the last turn in the order of decoding among the plurality of coding blocks included in the merge sharing node.

According to an embodiment, the method may further include updating the HMVP table using motion information of the merge candidate if the current block is not located in the merge sharing node.

According to an embodiment, the operation of adding the HMVP to the merge candidate list may include: identifying whether duplicate motion information of motion information of candidates in the merge candidate list is present using HMVP having a predetermined index defined in advance in the HMVP table; and adding the HMVP having the predetermined index to the merge candidate list if the HMVP having the predetermined index does not have duplicate motion information of motion information of candidates in the merge candidate list.

In accordance with an aspect of the present disclosure, a video signal processing method may include: receiving information for predicting a current block; determining whether a merge mode is applied to the current block based on the information for the prediction; if the merge mode is applied to the current block, obtaining a first syntax element indicating whether combined prediction is applied to the current block, wherein the combined prediction is a prediction mode that combines inter-prediction and intra-prediction; if the first syntax element indicates that the combined prediction is applied to the current block, generating an inter-prediction block and an intra-prediction block of the current block; and generating a combined prediction block of the current block by performing a weighted-sum of the inter-prediction block and the intra-prediction block.

In accordance with an aspect of the present disclosure, a video signal processing device may include a processor, wherein the processor is configured to: obtain a first syntax element indicating whether combined prediction is applied to the current block if the merge mode is applied to the current block, wherein the combined prediction is a prediction mode that combines inter-prediction and intra-prediction; generate an inter-prediction block and an intra-prediction block of the current block if the first syntax element indicates that the combined prediction is applied to the current block; and generate a combined prediction block of the current block by performing a weighted-sum of the inter-prediction block and the intra-prediction block.

According to an embodiment, the method may further include: decoding a residual block of the current block; and reconstructing the current block using the combined prediction block and the residual block.

According to an embodiment, the operation of decoding the residual block may further include: if the first syntax element indicates that the combined prediction is not applied to the current block, obtaining a second syntax element indicating whether sub-block transform is applied to the current block, and wherein the sub-block transform indicates a transform mode that applies transform to any one of sub-blocks of the current block divided in the horizontal direction or in the vertical direction.

According to an embodiment, if the second syntax element is not present, the value of the second syntax element is inferred to be 0.

According to an embodiment, if the first syntax element indicates that the combined prediction is applied to the current block, an intra-prediction mode for intra-prediction of the current block is set to a planar mode.

According to an embodiment, the method may further include: setting locations of a left neighboring block and an upper side neighboring block to which reference is made for the combined prediction, wherein the locations of the left neighboring block and the upper side neighboring block are identical to locations to which reference is made by the intra-prediction.

According to an embodiment, the locations of the left neighboring block and the upper side neighboring block may be determined using a scaling factor variable which is determined based on a color component index value of the current block.

Advantageous Effects

According to an embodiment of the present disclosure, it is possible to increase coding efficiency of a video signal. Further, according to an embodiment of the present disclosure, a transform kernel suitable for a current transform block may be selected.

BRIEF DESCRIPTION OF THE DRAWINGS

FIG. 14 is a diagram illustrating a method of updating a HMVP table according to an embodiment of the present disclosure.

FIG. 15 is a diagram illustrating a method of updating a HMVP table according to an embodiment of the present disclosure.

FIG. 16 is a diagram illustrating a method of updating a HMVP table according to an embodiment of the present disclosure.

FIG. 17 is a diagram illustrating a method of updating a HMVP table according to an embodiment of the present disclosure.

FIG. 18 is a diagram illustrating a pruning process according to an embodiment of the present disclosure.

FIG. 41 is a diagram illustrating a neighboring reference location according to an embodiment of the present disclosure.

FIG. 42 is a diagram illustrating a weighted-sample prediction process according to an embodiment of the present disclosure.

FIG. 43 is a diagram illustrating a weighted-sample prediction process according to an embodiment of the present disclosure.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
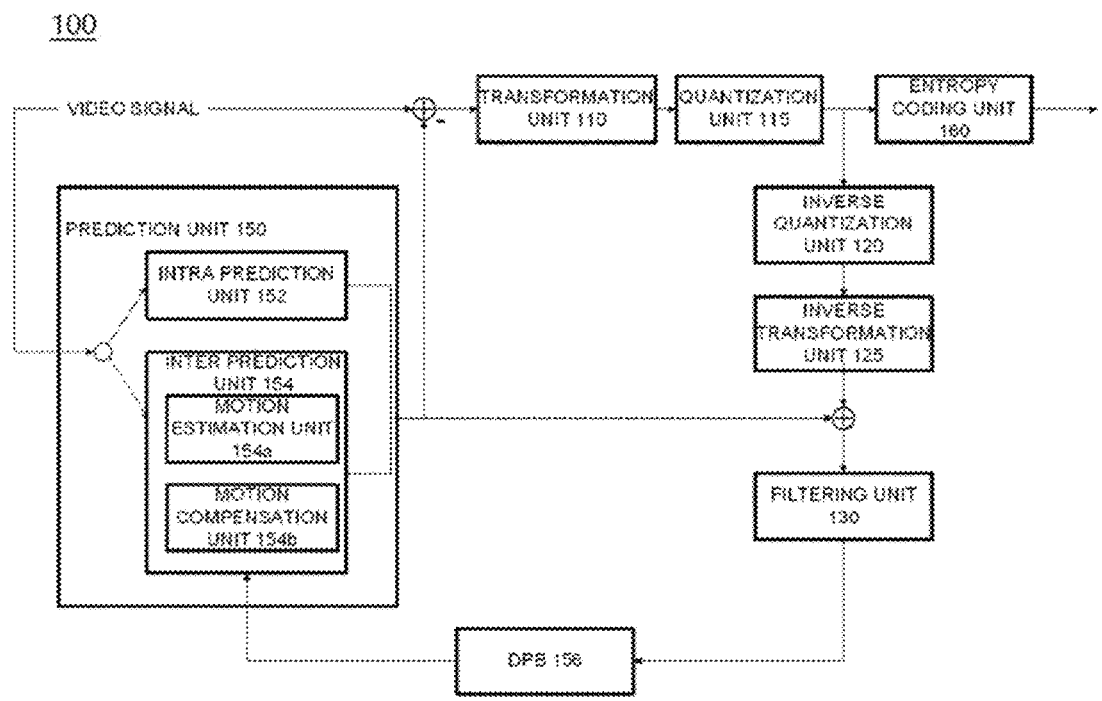
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154a and a motion compensation unit 154b. The motion estimation unit 154a obtains a motion vector value of the current region by referring to a specific reconstructed region. The motion estimation unit 154a transfers location information (reference frame, motion vector, etc.) of the reference region to the entropy coding unit 160 so as to enable the location information to be included in a bitstream. The motion compensation unit 154b performs inter motion compensation by using the motion vector value transferred from the motion estimation unit 154a.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The intra encoding information may include information on a reference sample. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information set (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes information indicating a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding. For example, the entropy coding unit 160 may binarize information indicating a quantized transform coefficient. The entropy coding unit 160 may generate a bitstream by arithmetic-coding the binary information.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
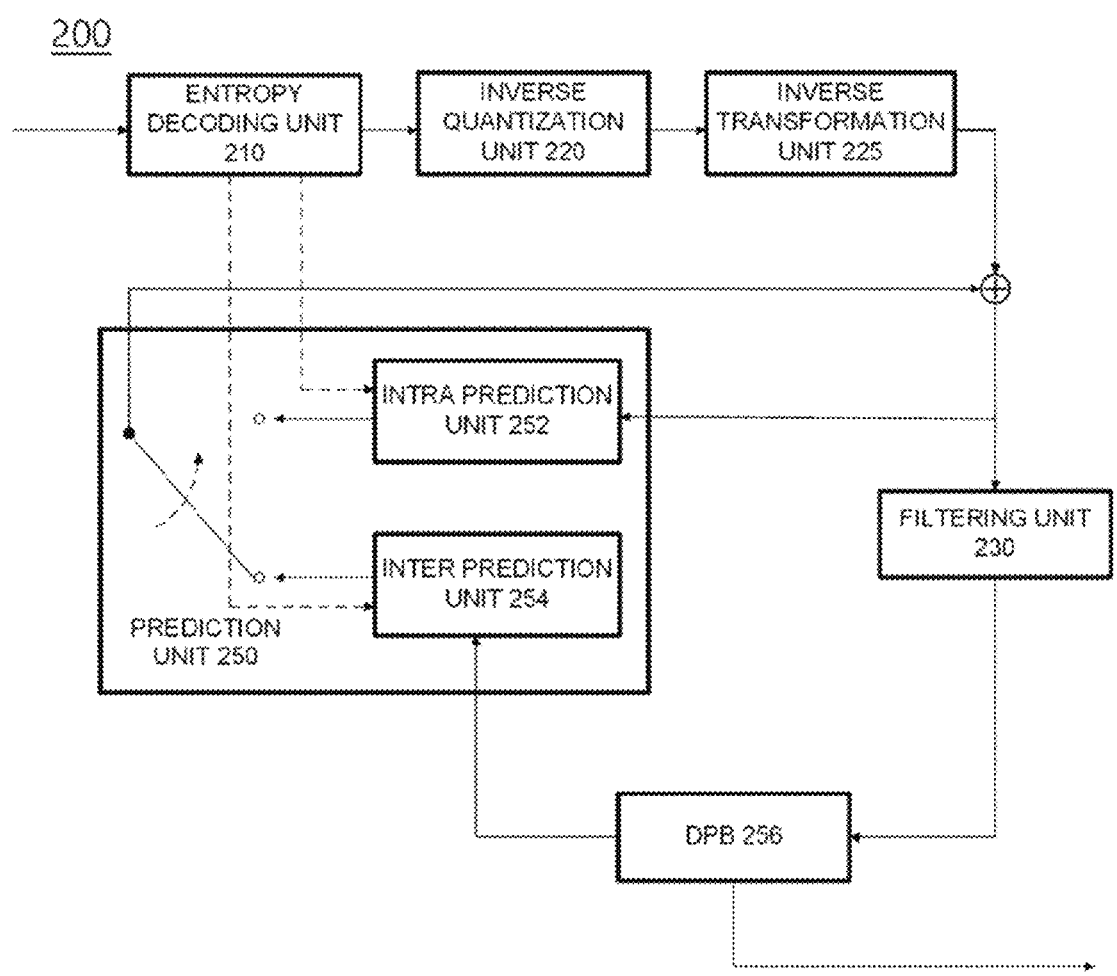
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. For example, the entropy decoding unit 210 may obtain a binarization code for transform coefficient information of a specific region from the video signal bitstream. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction or intra BC prediction, is called an intra picture or an I picture (or, tile/slice), and a picture (or, tile/slice) that may perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect. According to an embodiment, two reference regions used in the bi-prediction scheme may be regions selected from picture list L0 and picture list L1, respectively.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra BC prediction unit (not shown). The intra BC prediction unit may reconstruct the current region by referring to a specific region including reconstructed samples in the current picture. The intra BC prediction unit obtains intra BC encoding information for the current region from the entropy decoding unit 210. The intra BC prediction unit obtains a block vector value of the current region indicating the specific region in the current picture. The intra BC prediction unit may perform intra BC prediction by using the obtained block vector value. The intra BC encoding information may include block vector information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device.

According to an embodiment, the operation of each element of the above-described decoding apparatus 200 may be performed by a processor (not shown).

Figure 3:
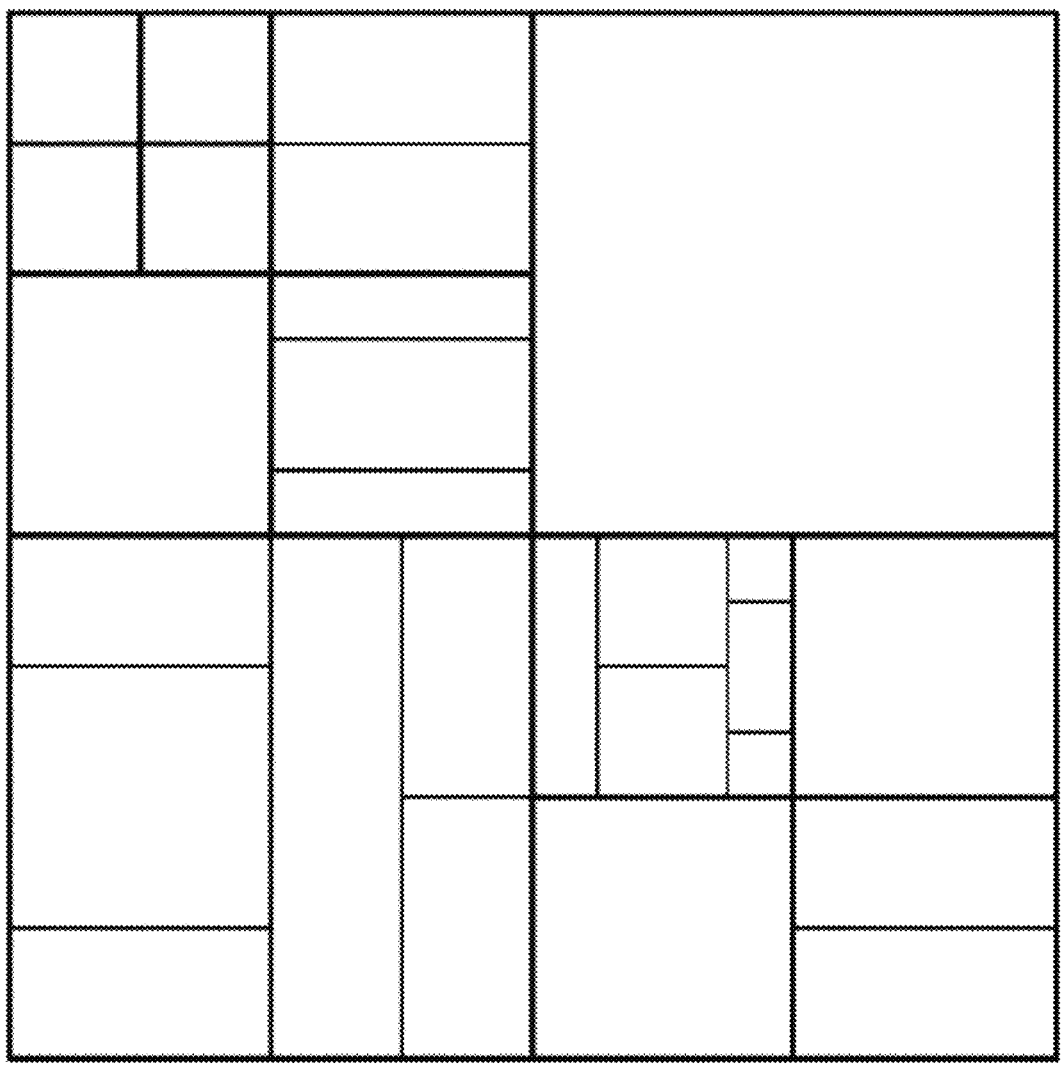
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal binary split. This multi-type tree split may be performed recursively.

The leaf node of the multi-type tree may be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a high level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
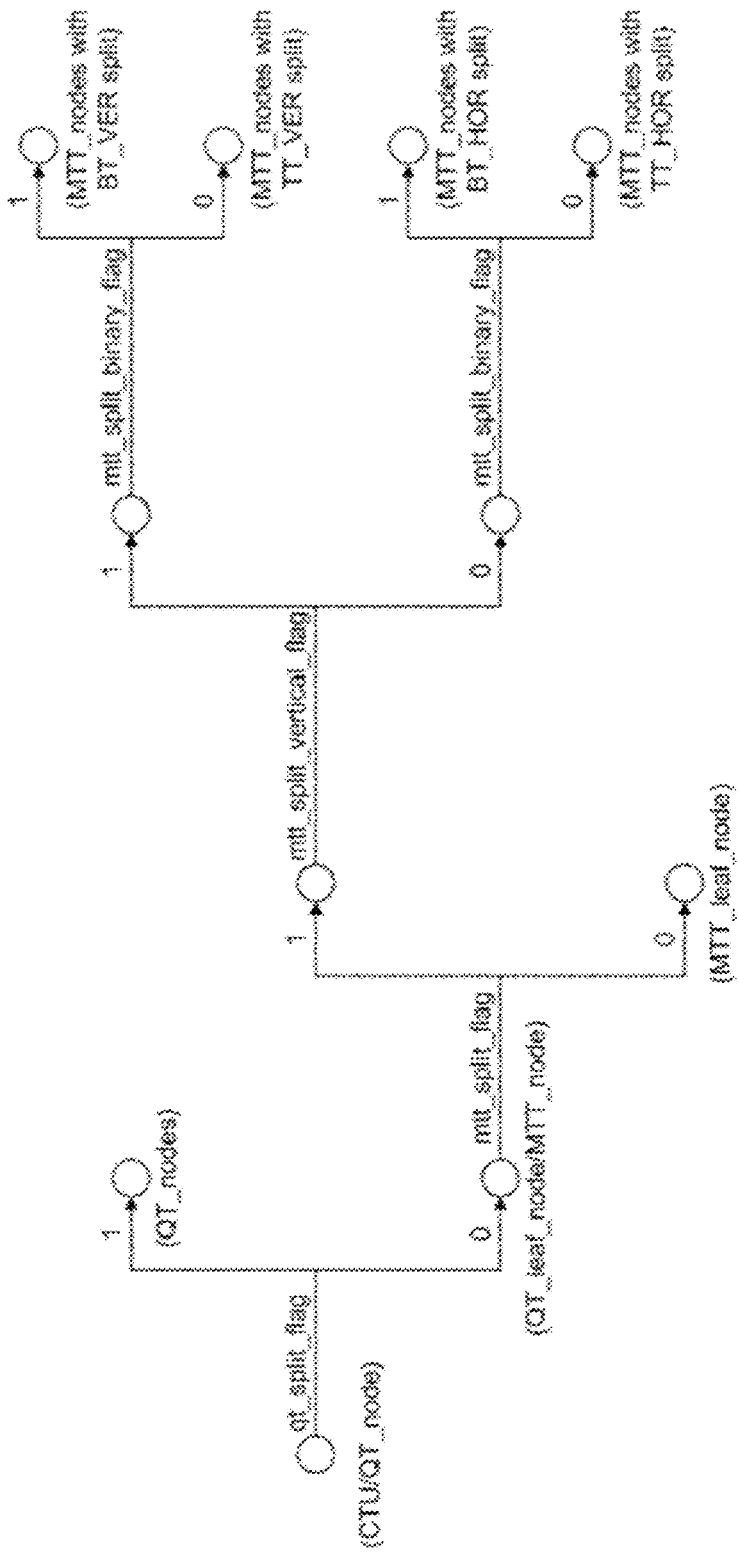
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
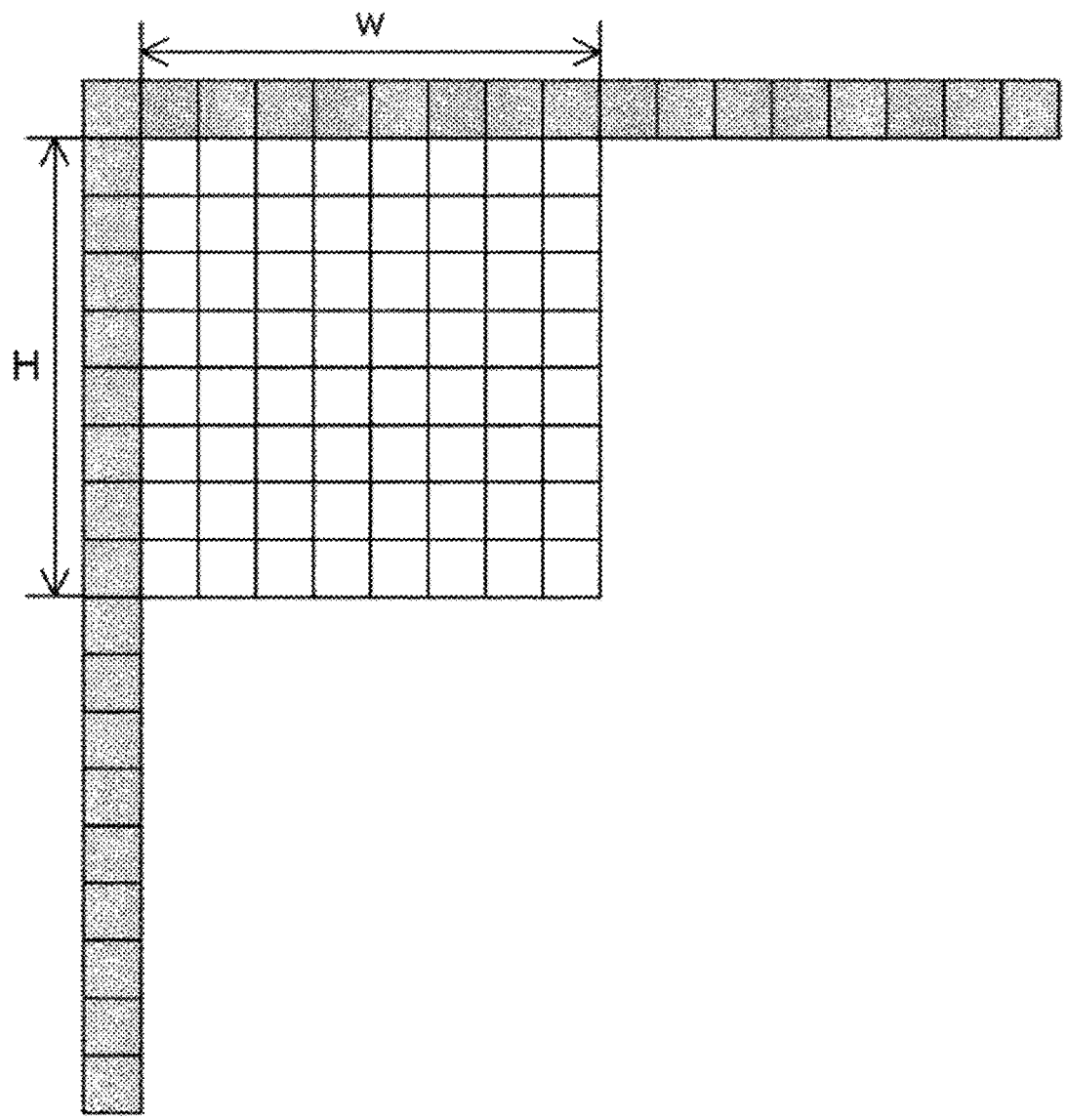
FIGS. 5 and 6 illustrate an intra-prediction method in more detail according to an embodiment of the present disclosure.
Figure 6:
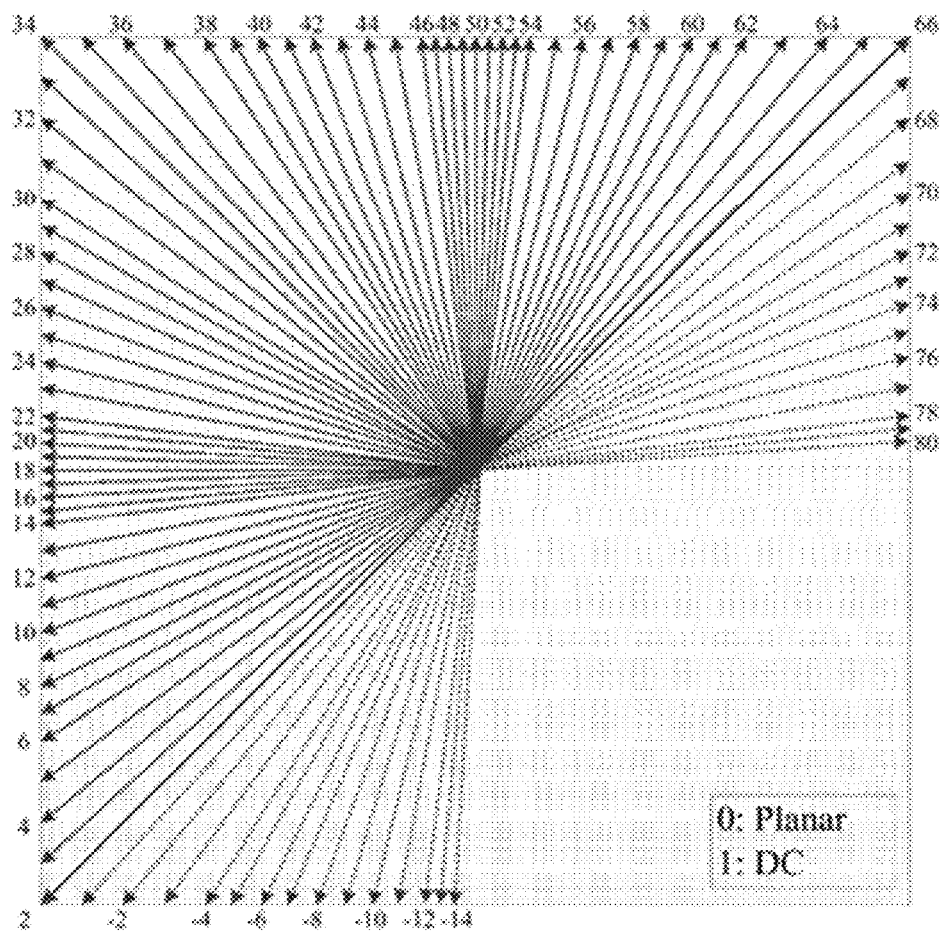

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

When at least some samples to be used as reference samples have not yet been reconstructed, the intra prediction unit may obtain reference samples by performing a reference sample padding procedure. The intra prediction unit may perform a reference sample filtering procedure to reduce an error in intra prediction. That is, filtering may be performed on neighboring samples and/or reference samples obtained by the reference sample padding procedure, so as to obtain the filtered reference samples. The intra prediction unit predicts samples of the current block by using the reference samples obtained as in the above. The intra prediction unit predicts samples of the current block by using unfiltered reference samples or filtered reference samples. In the present disclosure, neighboring samples may include samples on at least one reference line. For example, the neighboring samples may include adjacent samples on a line adjacent to the boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees Clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Hereinafter, an inter-prediction method according to an embodiment of the present disclosure will be described with reference to FIG. 7. In the present disclosure, the inter-prediction method may include a normal inter-prediction method which is optimized for a translation motion, and an affine model-based inter-prediction method. In addition, a motion vector may include at least one of a normal motion vector for motion compensation according to the normal inter-prediction method and a control point motion vector for affine motion compensation.

Figure 7:
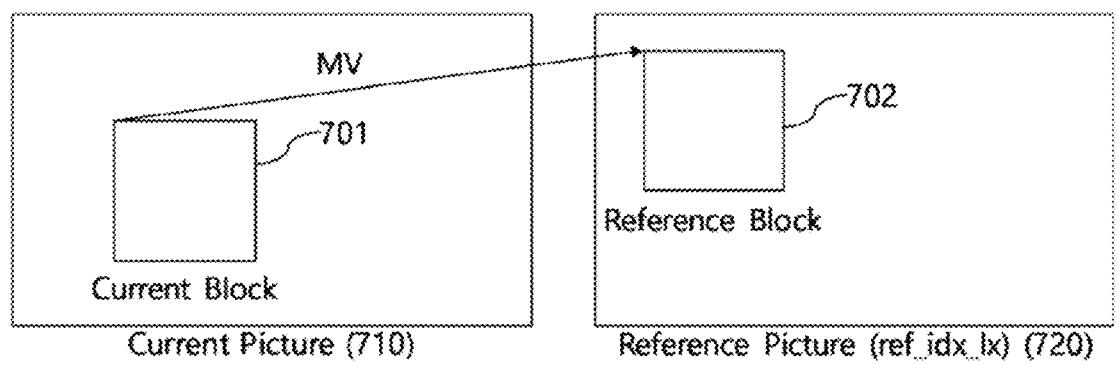
FIG. 7 is a diagram illustrating an inter-prediction method according to an embodiment of the present disclosure.

FIG. 7 is a diagram illustrating an inter-prediction method according to an embodiment of the present disclosure. As described above, a decoder may predict a current block by making reference to reconstructed samples of a different decoded picture. Referring to FIG. 7, the decoder may obtain a reference block 702 in a reference picture 720 based on a motion information set of a current block 701. In this instance, the motion information set may include a reference picture index and a motion vector 703. The reference picture index may indicate the reference picture 720 including a reference block for inter-prediction of the current block in a reference picture list. According to an embodiment, the reference picture list may include at least one of the above-mentioned L0 picture list or L1 picture list. The motion vector 703 may indicate an offset between the coordinate values of the current block 701 in a current picture 710 and coordinate values of the reference block 702 in the reference picture 720. The decoder may obtain a predictor of the current block 701 based on the sample values of the reference block 702, and may reconstruct the current block 701 using the predictor.

Particularly, an encoder may obtain the above-mentioned reference block by searching for a block similar to the current block from pictures which have earlier turns in the order of reconstruction. For example, the encoder may search for a reference block having the minimum sum which is obtained by adding differences between the current block and sample values in a predetermined search area. In this instance, in order to measure similarity between the current block and the samples of a reference block, at least one of a sum of absolute difference (SAD) or a sum of Hadamard transformed difference (SATD) may be used. Here, SAD may be a value obtained by adding the absolute values of the differences between samples included in two blocks. In addition, SATD may be a value obtained by adding the absolute values of Hadamard transform coefficients that are obtained by performing Hadamard transform on the differences between samples included in two blocks.

The current block may be predicted using one or more reference areas. As described above, the current block may be inter-predicted according to bi-prediction scheme that uses two or more reference areas. According to an embodiment, the decoder may obtain two reference blocks based on two motion information sets of the current block. In addition, the decoder may obtain a first predictor and a second predictor of the current block based on the sample values of each of the two obtained reference blocks. In addition, the decoder may reconstruct the current block using the first predictor and the second predictor. For example, the decoder may reconstruct the current block based on the average of the samples of each of the first predictor and the second predictor.

As described above, for the motion compensation of the current block, one or more motion information sets may be signaled. In this instance, similarity between motion information sets for motion compensation with respect to each of a plurality of blocks may be used. For example, a motion information set used for predicting the current block may be derived from a motion information set which was used for predicting any one of the other samples previously reconstructed. Through the above, the encoder and the decoder may reduce signaling overhead.

For example, there may be a plurality of candidate blocks having the probability of being predicted based on a motion information set which is identical or similar to the motion information set of the current block. The decoder may generate a merge candidate list based on the plurality of candidate blocks. Here, the merge candidate list may include candidates corresponding to samples which have the probability of being predicted based on a motion information set related to the motion information set of the current block, among the samples reconstructed in advance of the current block. The encoder and the decoder may configure the merge candidate list of the current block according to a previously defined rule. In this instance, the merge candidate list configured by the encoder and the merge candidate list configured by the decoder may be identical to each other. For example, the encoder and the decoder may configure merge candidate lists of the current block based on the location of the current block in the current picture. A method of configuring the merge candidate lists of the current block by the encoder and the decoder will be described with reference to FIG. 9. In the present disclosure, the location of a predetermined block may be a relative location of a top-left sample of a predetermined block in a picture including the predetermined block.

Meanwhile, in order to improve coding efficiency, a method of quantizing a transform coefficient value obtained by transforming a residual signal and the quantized transform coefficient may be used instead of coding the above-described residual as it is. As described above, the transform unit may obtain a transform coefficient value by transforming a residual signal. In this case, the residual signal of a specific block may be distributed over an entire area of the current block. Accordingly, it is possible to improve coding efficiency by concentrating energy in the low frequency region through frequency domain conversion of a residual signal. Hereinafter, a method of transforming or inversely transforming a residual signal will be described in detail.

Figure 8:
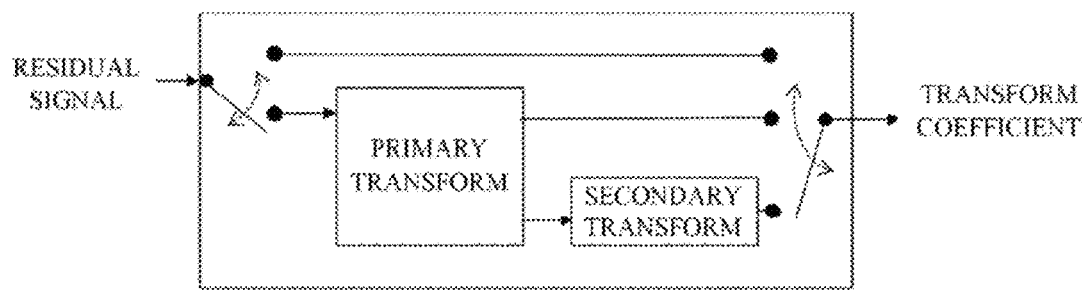
FIG. 8 is a diagram specifically illustrating a method for transforming a residual signal by an encoder.

FIG. 8 is a diagram specifically illustrating a method for transforming a residual signal by an encoder. As described above, a residual signal in a spatial domain may be transformed to a frequency domain. An encoder may obtain a transform coefficient by transforming the obtained residual signal. First, the encoder may obtain at least one residual block including a residual signal for a current block. The residual block may be either the current block or one of blocks divided from the current block. In the present disclosure, the residual block may be referred to as a residual array or a residual matrix which include residual samples of the current block. In the present disclosure, the residual block may represent a transform unit or a block having the same size as that of the transform block.

Next, the encoder may transform the residual block by using a transform kernel. The transform kernel used for transformation of the residual block may be a transform kernel having separable characteristics of vertical transform and horizontal transform. In this case, the transform for the residual block may be performed separately into vertical transform and horizontal transform. For example, the encoder may perform vertical transformation by applying a transform kernel in the vertical direction of the residual block. The encoder may perform horizontal transform by applying the transform kernel in the horizontal direction of the residual block. In the present disclosure, the transform kernel may be used as a term to refer to a parameter set used for transform of the residual signal, such as transform matrix, transform array, transform function, and transform. According to an embodiment, the transform kernel may be any one of a plurality of available kernels. A transform kernel based on different transform types may be used for each of the vertical transform and the horizontal transform. A method of selecting one of a plurality of available transform kernels will be described later with reference to FIG. 12 to FIG. 26.

The encoder may transfer the transform block transformed from the residual block to a quantization unit and quantize the transform block. The transform block may include a plurality of transform coefficients. Specifically, the transform block may include the plurality of transform coefficients arranged in two dimensions. As in the case of the residual block, the size of the transform block may be the same as the size of either the current block or the block divided from the current block. The transform coefficients transferred to the quantization unit may be expressed as quantized values.

The encoder may perform additional transform before the transform coefficients are quantized. As illustrated in FIG. 8, the above-described transform method may be referred to as a primary transform, and an additional transform may be referred to as a secondary transform. The secondary transform may be selective for each residual block. According to an embodiment, the encoder may improve coding efficiency by performing secondary transform for a region where it is difficult to concentrate energy in a low-frequency region only by primary transform. For example, secondary transform may be added to a block in which residual values appear larger in a direction other than the horizontal or vertical direction of the residual block. The residual values of an intra-predicted block may have a higher probability of transformation in a direction other than the horizontal or vertical direction compared to the residual values of an inter-predicted block. Accordingly, the encoder may additionally perform secondary transform on the residual signal of the intra-predicted block. The encoder may omit secondary transform for the residual signal of the inter-predicted block.

As another example, whether to perform secondary transform may be determined depending on the size of the current block or the size of the residual block. Transform kernels having different sizes may be used depending on the size of the current block or the size of the residual block. For example, 8×8 secondary transform may be applied to a block in which a length of a shorter side between a width or a height is shorter than a first preconfigured length. Further, 4×4 secondary transform may be applied to a block in which the length of the shorter side between the width or the height is longer than a second preconfigured length. Here, the first preconfigured length may be a value larger than the second preconfigured length, but the present disclosure is not limited thereto. Unlike primary transform, secondary transform may not be performed separately into vertical transform and horizontal transform. This secondary transform may be referred to as a low frequency band non-separable transform (low frequency non-separable transform, LFNST).

In the case of a video signal in a specific region, energy in a high frequency band may not be reduced even if frequency transformation is performed due to a sudden change in brightness. Accordingly, compression performance due to quantization may be deteriorated. When transform is performed on a region in which a residual value rarely exists, an encoding time and a decoding time may be unnecessarily increased. Accordingly, transform on the residual signal of the specific region may be omitted. Whether to perform transform on the residual signal of the specific region may be determined by a syntax element related to transform of the specific region. For example, the syntax element may include transform skip information. The transform skip information may be a transform skip flag. If the transform skip information on the residual block indicates a transform skip, transform on the residual block is not performed. In this case, the encoder may immediately quantize the residual signal on which transform of a corresponding region has not been performed. The operations of the encoder described with reference to FIG. 8 may be performed via the transform unit of FIG. 1.

The above-described transform-related syntax elements may be information parsed from a video signal bitstream. The decoder may entropy-decode the video signal bitstream so as to obtain transform-related syntax elements. The encoder may entropy-code the transform-related syntax elements so as to generate a video signal bitstream.

Figure 9:
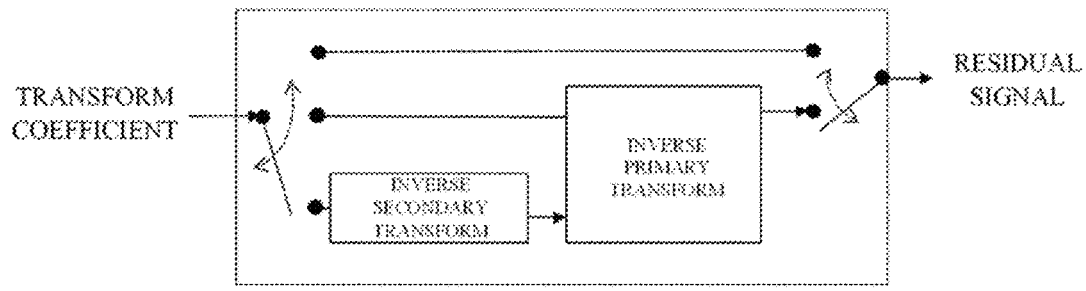
FIG. 9 is a diagram specifically illustrating a method for obtaining a residual signal by inverse transforming a transform coefficient by an encoder and a decoder.

FIG. 9 is a diagram specifically illustrating a method for obtaining a residual signal by inverse transforming a transformation coefficient by an encoder and a decoder. For the convenience of description, it will be described that an inverse transform operation is performed via an inverse transform unit of each of an encoder and a decoder. The inverse transform unit may obtain a residual signal by inverse transforming an inverse quantized transform coefficient. First, the inverse transform unit may detect whether inverse transform for a specific region is performed, from a transform-related syntax element of the region. According to an embodiment, when a transform-related syntax element for a specific transform block indicates a transform skip, transform on the transform block may be omitted. In this case, both the primary inverse transform and the secondary inverse transform described above regarding the transform block may be omitted. The inverse quantized transform coefficient may be used as a residual signal. For example, the decoder may reconstruct a current block by using the inverse quantized transform coefficient as a residual signal.

According to another embodiment, the transform-related syntax element for the specific transform block may not indicate a transform skip. In this case, the inverse transform unit may determine whether to perform secondary inverse transform for secondary transform. For example, when the transform block is a transform block of an intra-predicted block, secondary inverse transform may be performed on the transform block. A secondary transform kernel used for the transform block may be determined based on an intra prediction mode corresponding to the transform block. As another example, whether to perform secondary inverse transform may be determined based on the size of the transform block. Secondary inverse transform may be performed after inverse quantization and before primary inverse transform.

The inverse transform unit may perform primary inverse transform on the inverse quantized transform coefficient or a secondary inverse transformed transform coefficient. In the case of primary inverse transform, vertical transform and horizontal transform may be performed separately as in the case of primary transform. For example, the inverse transform unit may obtain a residual block by performing vertical inverse transform and horizontal inverse transform on the transform block. The inverse transform unit may inverse transform the transform block on the basis of the transform kernel used for transforming the transform block. For example, the encoder may explicitly or implicitly signal information indicating the transform kernel applied to the current transform block from among a plurality of available transform kernels. The decoder may select a transform kernel to be used for inverse transform of the transform block from among the plurality of available transform kernels by using information indicating the signaled transform kernel. The inverse transform unit may reconstruct the current block by using the residual signal obtained via inverse transform on the transform coefficient.

Figure 10:
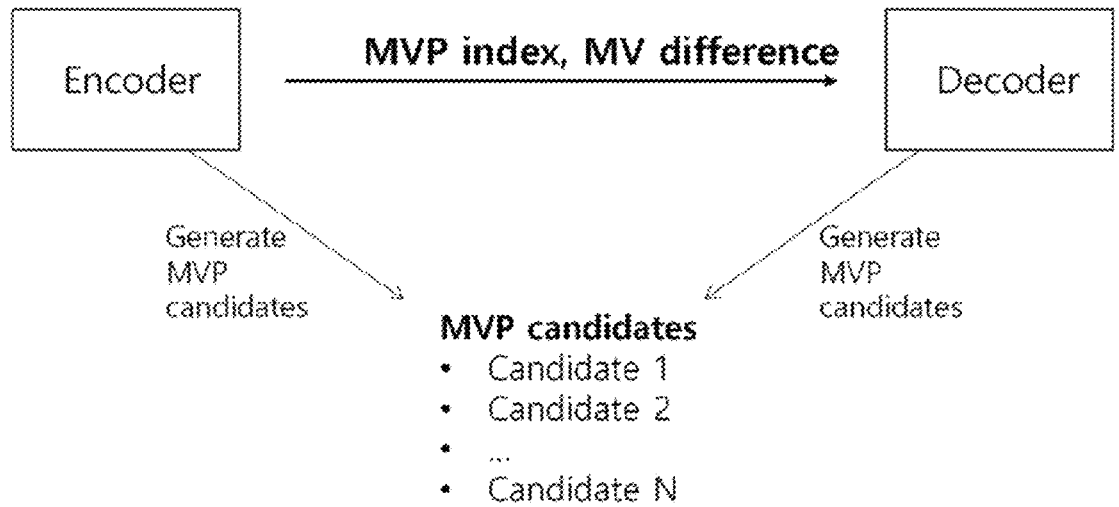
FIG. 10 is a diagram illustrating a motion vector signaling method according to an embodiment of the present disclosure.

FIG. 10 is a diagram illustrating a motion vector signaling method according to an embodiment of the present disclosure. According to an embodiment, a motion vector (MV) may be generated based on a motion vector prediction (or predictor) (MVP). For example, an MV may be determined to be an MVP as shown in Equation 1 below. In other words, an MV may be determined to be (or set to or derived as) a value identical to an MVP.

$$MV = MVP \qquad \text{[Equation 1]}$$

As another example, an MV may be determined based on an MVP and a motion vector difference (MVD), as shown in Equation 2 below. An encoder may signal MVD information to a decoder in order to accurately represent an MV, and the decoder may derive an MV by adding the obtained MVD to an MVP.

$$MV = MVP + MVD \qquad \text{[Equation 2]}$$

According to an embodiment of the present disclosure, the encoder may transmit determined motion information to the decoder, and the decoder may generate (or derive) an MV from the received motion information and may generate a prediction block based thereon. For example, the motion information may include MVP information and MVD information. In this instance, the components of the motion information may differ depending on an inter-prediction mode. For example, in a merge mode, the motion information may include MVP information, and may exclude the MVD information. As another example, in an advanced motion vector prediction (AMVP) mode, the motion information may include MVP information and MVD information.

In order to determine, transmit, and receive information associated with the MVP, the encoder and the decoder may generate an MVP candidate (or an MVP candidate list) in the same manner. For example, the encoder and the decoder may generate the same MVP candidate in the identical order. The encoder may transmit an index indicating an MVP determined (or selected) among the generated MVP candidates to the decoder, and the decoder may derive an MVP and/or MV determined based on the received index.

According to an embodiment of the present disclosure, the MVP candidate may include a spatial candidate, a temporal candidate, and the like. If the merge mode is applied, the MVP candidate may be referred to as a merge candidate. If the AMVP mode is applied, the MVP candidate may be referred to as an AMVP candidate. The spatial candidate may be an MV (or motion information) associated with a block located in a predetermined location based on the current block. For example, the spatial candidate may be the MV of a block existing in a location adjacent to, or far from, the current block. The temporal candidate may be an MV corresponding to a block in a picture different from a current picture. In addition, for example, an MVP candidate may include an affine MV, an ATMVP, an STMVP, a combination of the above-mentioned MVs (or candidates), an average MV of the above-mentioned MV (or candidates), a zero MV, and the like.

According to an embodiment, the encoder may signal information indicating a reference picture to the decoder. According to an embodiment, if the reference picture of an MVP candidate and the reference picture of the current block (or current processing block) are different from each other, the encoder/decoder may perform scaling on the MV of the MVP candidate (motion vector scaling). In this instance, MV scaling may be performed based on the picture order count (POC) of the current picture, the POC of the reference picture of the current block, and the POC of the reference picture of the MVP candidate.

Hereinafter, a detailed embodiment associated with an MVD signaling method will be described in detail. Table 1 shows a syntax structure for MVD signaling.

TABLE 1

| | Descriptor |
|---|---|
| mvd_coding( x0, y0, refList ) { | |
|     abs_mvd_greater0_flag[ 0 ] | ae(v) |
|     abs_mvd_greater0_flag[ 1 ] | ae(v) |
|     if( abs_mvd_greater0_flag[ 0 ] ) | |
|         abs_mvd_greater1_flag[ 0 ] | ae(v) |
|     if( abs_mvd_greater0_flag[ 1 ] ) | |
|         abs_mvd_greater1_flag[ 1 ] | ae(v) |
|     if( abs_mvd_greater0_flag[ 0 ] ) { | |
|         if( abs_mvd_greater1_flag[ 0 ] ) | |
|             abs_mvd_minus2[ 0 ] | ae(v) |
|         mvd_sign_flag[ 0 ] | ae(v) |
|     } | |
|     if( abs_mvd_greater0_flag[ 1 ] ) { | |
|         if( abs_mvd_greater1_flag[ 1 ] ) | |
|             abs_mvd_minus2[ 1 ] | ae(v) |
|         mvd_sign_flag[ 1 ] | ae(v) |
|     } | |
| } | |

Referring to FIG. 1, according to an embodiment of the present disclosure, in the case of an MVD, the sign of the MVD and the absolute value of the MVD may be separately coded. That is, the sign and the absolute value of the MVD may be different syntaxes (or syntax elements). In addition, the absolute value of the MVD may be coded directly intactly, or may be coded sequentially based on a flag indicating whether the absolute value is greater than N as shown in Table 1. If the absolute value is greater than N, the value of (absolute value−N) may be signaled together. Particularly, abs_mvd_greater0_flag, indicating whether the absolute value is greater than 0, in the example of Table 1 may be transmitted. If abs_mvd_greater0_flag indicates (or shows) that the absolute value is not greater than 0, the absolute value of the MVD may be determined to be 0. If abs_mvd_greater0_flag indicates that the absolute value is greater than 0, an additional syntax (or syntax element) may be present.

For example, abs_mvd_greater1_flag indicating whether the absolute value is greater than 1 may be transmitted. If abs_mvd_greater1_flag indicates (or shows) that the absolute value is not greater than 1, the absolute value of the MVD may be determined to be 1. If abs_mvd_greater1_flag indicates that the absolute value is greater than 1, an additional syntax may be present. For example, abs_mvd_minus2 may be present. abs_mvd_minus2 may be the value of (absolute value−2). It is determined that the absolute value is greater than 1 (i.e., greater than or equal to 2) based on abs_mvd_greater0_flag and abs_mvd_greater1_flag, the value of (absolute value−2) may be signaled. By hierarchically performing syntax signaling of the information associated with the absolute value, a smaller number of bits may be used when compared to the case of performing signaling after binarization of the absolute value.

According to an embodiment, the above-mentioned syntax related to the absolute value may be coded by applying a variable length-based binarization method such as exponential-Golomb, truncated unary, truncated Rice, and the like. In addition, the flag indicating the sign of the MVD may be signaled via mvd_sign_flag.

Although an MVD coding method has been described in the above-mentioned embodiments, other information, in addition to the MVD, may also be signaled separately as a sign and an absolute value. An absolute value may be coded as a flag indicating whether the absolute value is greater than a predetermined value defined in advance and a value obtained by subtracting the predetermined value from the absolute value. [0] and [1] in Table 1 may be component indices. For example, they may be an x-component (i.e., a horizontal component) and a y-component (i.e., a vertical component).

Figure 11:
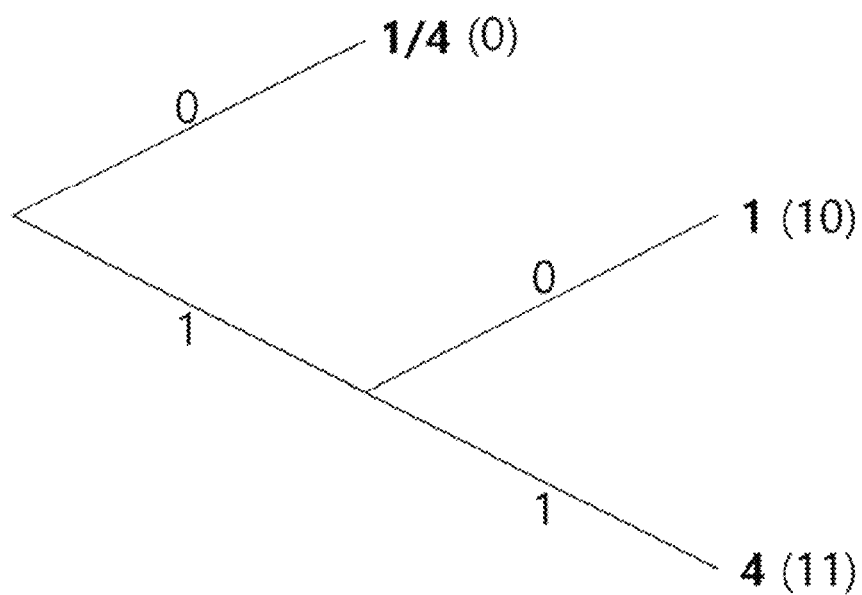
FIG. 11 is a diagram illustrating a method of signaling adaptive motion vector resolution information according to an embodiment of the present disclosure.

FIG. 11 is a diagram illustrating a method of signaling adaptive motion vector resolution information according to an embodiment of the present disclosure. According to an embodiment of the present disclosure, there may be various types of resolutions for representing an MV or an MVD. For example, a resolution may be represented based on a pixel (or pel). For example, an MV or an MVD may be signaled in units of ¼ (quarter), ½ (half), 1 (integer), 2, 4 pixels, or the like. An encoder may signal resolution information of an MV or MVD to a decoder. In addition, for example, if signaling is performed in units of ¼ pixels, 16 may be coded into 64 (¼*64=16). If signaling is performed in a unit of one pixel, 16 may be coded into 16 (1*16=16). If signaling is performed in units of 4 pixels, 16 may be coded into 4 (4*4=16). That is, the value of an MV or MVD may be determined based on Equation 3 below.

$$valueDetermined = \text{resoution} * valuePerResolution \quad \text{[Equation 3]}$$

In Equation 3, valueDetermined denotes the value of an MV or MVD. In addition, valuePerResolution may indicate a value that is signaled based on a determined resolution. In this instance, if the value signaled as the MV or MVD is not divided by the determined resolution, a rounding process or the like may be applied. If a high resolution is used, accuracy may become high. However, a value to be coded is large and a large number of bits may be used. If a low resolution is used, accuracy may become low. However, a value to be coded is small and a small number of bits may be used. According to an embodiment, the above-described resolution may be differently represented based on a different unit such as a sequence, a picture, a slice, a coding tree unit (CTU), a coding unit (CU), and the like. That is, the encoder/decoder may adaptively determine/apply a resolution according to a predetermined unit among the above-mentioned units.

According to an embodiment of the present disclosure, the above-mentioned resolution information may be signaled from the encoder to the decoder. In this instance, the resolution information may be binarized based on a variable length, and may be signaled, as described above. In this instance, if signaling is performed based on an index corresponding to the smallest value (i.e., the foremost value), a signaling overhead may be reduced. According to an embodiment, resolutions may be mapped to signaling indices sequentially from the highest resolution to the lowest resolution.

According to an embodiment of the present disclosure, FIG. 11 illustrates a signaling method by assuming the case in which three types of resolutions are used among various resolutions. In this instance, three signaling bits may be "0", "10", and "11", and the three signaling indices may denote a first resolution, a second resolution, and a third resolution, respectively. One bit may be needed to signal the first resolution, and two bits may be needed to signal the remaining resolutions. Accordingly, if the first resolution is signaled, a signaling overhead may be relatively reduced. In FIG. 11, the first resolution, the second resolution, and the third resolution may be defined to be ¼-pixel resolution, 1-pixel resolution, and 4-pixel resolution, respectively. An MV resolution in the embodiments described below may indicate an MVD resolution.

Figure 12:
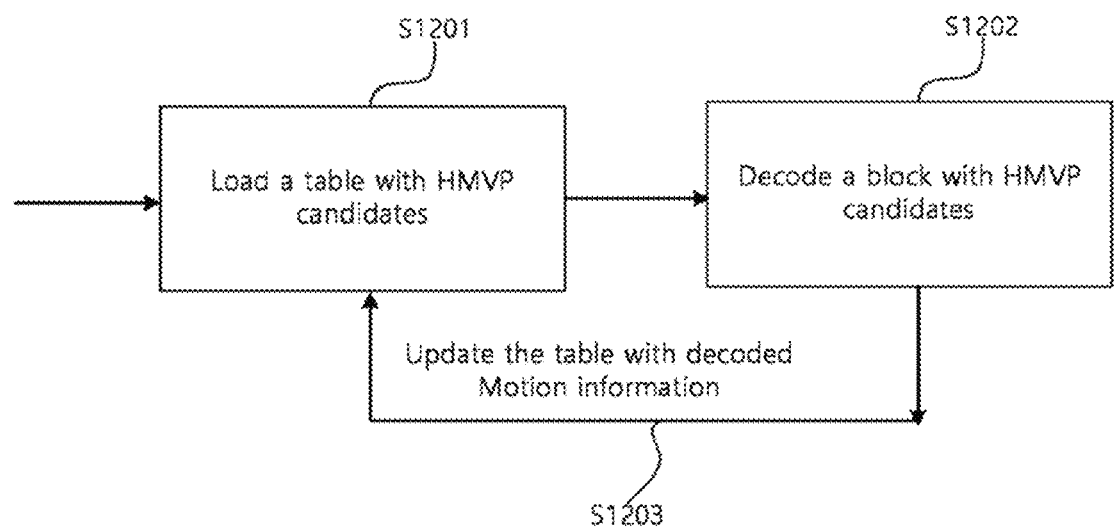
FIG. 12 is a diagram illustrating a history-based motion vector prediction (HMVP) method according to an embodiment of the present disclosure.

FIG. 12 is a diagram illustrating a history-based motion vector prediction (HMVP) method according to an embodiment of the present disclosure. As described above, an encoder/decoder may use a spatial candidate, a temporal candidate, and the like as a motion vector candidate. According to an embodiment of the present disclosure, a history-based motion vector, that is, a HMVP, may be additionally used as a motion vector candidate.

According to an embodiment of the present disclosure, the encoder/decoder may store motion information of a previously coded block in a table. In the present disclosure, a HMVP may be the motion information of a previously coded block. That is, the encoder/decoder may store a HMVP in a table. In the present disclosure, the table that stores the HMVP is referred to as a table or a HMVP table, but the present disclosure is not limited to the name. For example, the table (or HMVP table) may be referred to as a buffer, a HMVP buffer, a HMVP candidate buffer, a HMVP list, a HMVP candidate list, and the like.

Motion information stored in the HMVP table may include at least one of an MV, a reference list, a reference index, or a utilization flag. For example, the motion information may include at least one of an MV of reference list L0, an MV of L1, an L0 reference index, an L1 reference index, an L0 prediction list utilization flag, or an L1 prediction list utilization flag. In this instance, a prediction list utilization flag may indicate whether a corresponding list is usable information, meaningful information, or the like.

In addition, according to an embodiment of the present disclosure, the motion information stored in the HMVP table may be generated to be history-based motion information and may be stored. The history-based motion information may be motion information of a block coded in advance of a current block from the perspective of the order of coding. For example, the encoder/decoder may store the motion information of a block coded in advance of the current block in the HMVP table. In this instance, the block may be a coding unit (CU), a prediction unit (PU), or the like. The motion information of the block may be motion information used for motion compensation associated with the corresponding block, a motion information candidate used for motion compensation, or the like. The motion information (i.e., HMVP) stored in the HMVP table may be used for motion compensation associated with a block to be encoded/decoded in the future. For example, motion information stored in the HMVP table may be used for motion candidate list configuration (motion candidate list construction).

Referring to FIG. 12, the encoder/decoder may call one or more HMVP candidates from the HMVP table in operation S1201. The encoder/decoder may add the HMVP candidates to a motion candidate list. For example, the motion candidate list may be a merge candidate list (or a merge list) or an AMVP candidate list (or AMVP list). The encoder/decoder may perform motion compensation and encoding/decoding in association with the current block based on the motion candidate list in operation S1202. The encoder/decoder may update the HMVP table using information used for motion compensation or decoding associated with the current block in operation S1203.

According to an embodiment of the present disclosure, a HMVP candidate may be used for a merge candidate list configuring process. Various latest HMVP candidates of the HMVP are identified sequentially, and they may be inserted (or added) to a merge candidate list after a temporal motion vector prediction (or predictor) (TMVP) candidate. In addition, when adding the HMVP candidates, a pruning process (or pruning check) may be performed with respect to the spatial or temporal merge candidates included in the merge list, excluding a sub-block motion candidate (i.e., an ATMVP). According to an embodiment, in order to reduce the number of times that pruning is performed, the following embodiments may be applied.

1) For example, the number of HMPV candidates may be set as shown in Equation 4 below.

$$L = (N <= 4)?M:(8-N) \qquad \text{[Equation 4]}$$

In Equation 4, L denotes the number of HMPV candidates. N denotes the number of available non-sub block merge candidates. M denotes the number of HMVP candidates available in the table. For example, N denotes the number of non-sub block merge candidates included in the merge candidate list. If N is less than or equal to 4, the number of HMVP candidates may be determined to be M. Otherwise, the number of HMVP candidates may be determined to be (8–N).

2) In addition, for example, if the total number of available merge candidates reaches a value obtained by subtracting 1 from the signaled maximum number of allowed merge candidates, the merge candidate list configuring process based on the HMVP list may be terminated.

3) In addition, for example, the number of candidate pairs for deriving combined bi-predictive merge candidates may be reduced from 12 to 6.

In addition, according to an embodiment of the present disclosure, a HMVP candidate may be used for an AMVP candidate list configuring process. A motion vector of a HMVP candidate having the last index K in a table may be inserted after a TMVP candidate. According to an embodiment, only a HMVP candidate having the same reference picture as an AMVP target reference picture may be used for the AMVP candidate list configuration. In this instance, the above-mentioned pruning process may be applied to the HMVP candidate. For example, the above-mentioned K may be set to 4, and the size (or length) of an AMVP list may be set to 2.

Figure 13:
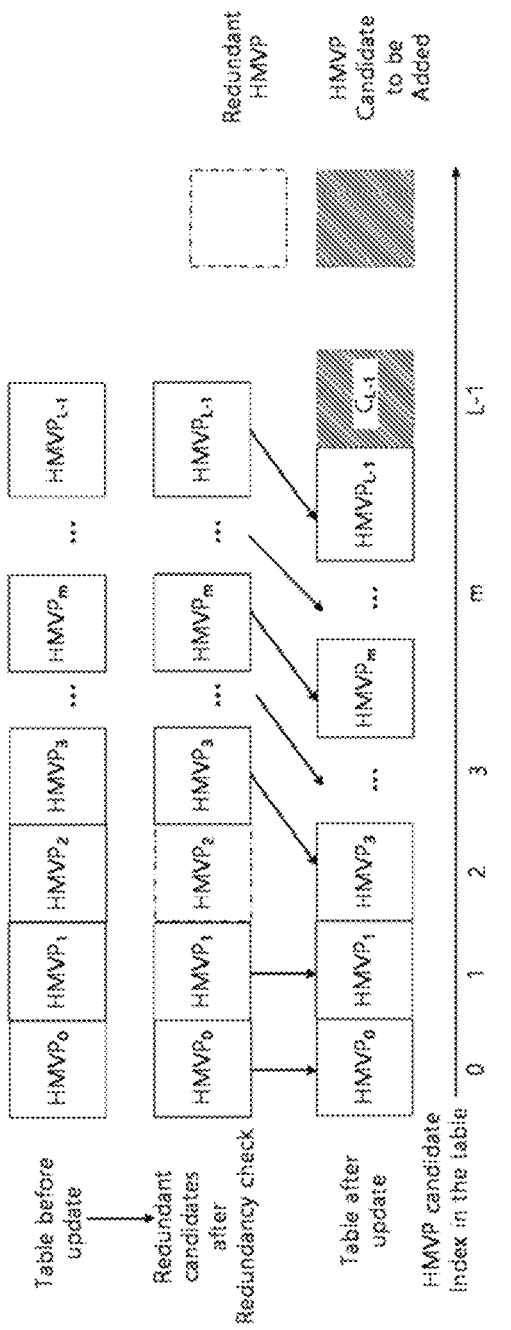
FIG. 13 is a diagram illustrating a method of updating a HMVP table according to an embodiment of the present disclosure.

FIG. 13 is a diagram illustrating a method of updating a HMVP table according to an embodiment of the present disclosure. According to an embodiment of the present disclosure, a HMVP table may be maintained/managed according to first-in first-out (FIFO) scheme. That is, if a new input is provided, the oldest element (or candidate) may be output first. For example, when adding motion information used for a current block to the HMVP table, an encoder/decoder may output the oldest added motion information from the HMVP table if the HMVP table is filled with the maximum number of elements, and may add the motion information used for the current block to the HMVP table. In this instance, if the motion information included in the existing HMVP table is output, the encoder/decoder may move motion information so as to fill the location of the output motion information with motion information of a subsequent location (or index). For example, if the HMVP table index of the output motion information is m, and the oldest element is located at HMVP table index 0, motion information corresponding to indices n which are greater than m may be moved to the locations of index (n−1) of the HMVP table, respectively. Through the above, the location corresponding to a high index in the HMVP table may become empty, and the encoder/decoder may allocate the motion information used for the current block as the highest index in the HMVP table. That is, if the maximum index where a valid element is included is M, the motion information of the current block may be inserted to a location corresponding to index (M+1).

In addition, according to an embodiment of the present disclosure, the encoder/decoder may apply a pruning process when updating the HMVP table based on predetermined motion information. That is, the encoder/decoder may identify whether the motion information or information corresponding the motion information is included in the HMVP table. A HMVP table updating method may be differently defined depending on whether duplicate motion information is included or not. Through the above, duplicate motion information is prevented from being included in the HMVP table, and various candidates may be taken into consideration for motion compensation.

According to an embodiment, when updating the HMVP table based on motion information used for the current block, if the motion information is already included in the HMVP table, the encoder/decoder may delete the duplicate motion information that is included in the existing HMVP table, and may newly add the motion information to the HMVP table. In this instance, the method which has been described in FIFO may be used as the method that deletes the existing candidate and adds new one. That is, the index of motion information that is to be currently added to the HMVP table is determined to be m, and the oldest motion information may be output. If the motion information is not already included in the HMVP table, the encoder/decoder may delete the oldest added motion information, and may add the motion information to the HMVP table.

According to another embodiment, when updating the HMVP table based on the motion information used for the current block, the encoder/decoder may not change the HMVP table if the motion information is already included in the HMVP table, and the encoder/decoder may update the HMVP table according to the FIFO scheme if the motion information is not included.

In addition, according to an embodiment of the present disclosure, the encoder/decoder may initialize (or reset) the HMVP table at a predetermined point in time or a predetermined location. The encoder and decoder need to use the same motion candidate list and thus, the encoder and the decoder may need to use the same HMVP table. In this instance, if they continuously use the HMVP table without initialization, dependency among coding blocks may occur, which is a problem. Therefore, in order to support parallel processing, dependency among blocks needs to be reduced and an operation of initializing the HMVP table may be set in advance according to a unit based on which parallel processing is supported. For example, the encoder/decoder may be configured to initialize the HMVP table in a slice level, a CTU row level, a CTU level, and the like. For example, if initialization of the HMVP table in the CTU row level is defined, the encoder/decoder may perform encoding/decoding in the state in which the HMVP table is empty when starting coding of each CTU row.

FIG. 14 is a diagram illustrating a method of updating a HMVP table according to an embodiment of the present disclosure. Referring to FIG. 14, according to an embodiment of the present disclosure, an encoder/decoder may update HMVPCandList based on mvCand according to an embodiment of the present disclosure. In the present disclosure, HMVPCandList denotes a HMVP table, and mvCand denotes motion information of a current block. The process illustrated in FIG. 14, a motion candidate mvCand having two motion vectors mvL0 and mvL1, two reference indices refIdxL0 and refIdxL1, and two prediction list utilization flags predFlagL0 and predFlagL1 may be used as an input. The process illustrated in FIG. 14 may output a corrected HMVPCandList arrangement.

In a first step (Step 1), the encoder/decoder may identify whether mvCand is identical to HMVPCandList[HMVPIdx] by changing a HMVPIdx value, which is a variable indicating the index of a HMVP in the HMVP table, from 0 to (HMVPCandNum−1). Here, HMVPCandNum denotes the number of HMVPs included in the HMVP table. HMVPCandList[HMVPIdx] denotes a candidate having a HMVPIdx value in the HMVP table. If mvCand is identical to HMVPCandList[HMVPIdx], the encoder/decoder may set a variable sameCand indicating whether candidates are the same to "true". According to an embodiment, when identifying whether mvCand is identical to HMVPCandList [HMVPIdx], the encoder/decoder may perform comparison with motion information having a prediction list utilization flag of 1 between an L0-related MV and reference index or an L1-related MV and reference index.

In a second step (Step 2), the encoder/decoder may set a variable tempIdx which is a variable indicating a temporal index to HMVPCandNum. In a third step (Step 3), if sameCand is true or HMVPCandNum is the same as the size (or length) of the maximum HMVP table, the encoder/decoder may copy HMVPCandList[tempIdx] into HMVPCandList[tempIdx−1] by changing tempIdx from (sameCand?HMVPIdx:1) to (HMVPCandNum−1). That is, if sameCand is true, tempIdx starts from HMVPIdx. The encoder/decoder may set HMVPIdx to a value obtained by adding 1 to an element index which is the same as mvCand in the HMVP table. In addition, if sameCand is false, tempIdx starts from 1, and HMVPCandList[0] may be used as the content of HMVPCandList[1].

In a fourth step (Step 4), the encoder/decoder may copy mvCand which is motion information to be used for updating into HMVPCandList[tempIdx]. In a fifth step (Step 5), if HMVPCandNum is smaller than the maximum HMVP table size, the encoder/decoder may increase HMVPCandNum by 1.

FIG. 15 is a diagram illustrating a method of updating a HMVP table according to an embodiment of the present disclosure. Referring to FIG. 15, according to an embodiment of the present disclosure, the encoder/decoder may perform comparison from HMVPIdx having a value greater than 0 in the process of identifying whether motion information of a current block is included in a HMVP table. For example, when identifying whether the motion information of the current block is included in the HMVP table, the encoder/decoder may perform comparison excluding motion information corresponding to HMVPIdx 0. In other words, the encoder/decoder may compare mvCand with a candidate from a candidate corresponding to HMVPIdx 1. In the process illustrated in FIG. 15, a motion candidate mvCand having two motion vectors mvL0 and mvL1, two reference indices refIdxL0 and refIdxL1, and two prediction list utilization flags predFlagL0 and predFlagL1 may be used as an input. The process illustrated in FIG. 15 may output a corrected HMVPCandList arrangement.

Referring again to the HMVP table updating method described in FIG. 14, whether motion information that is identical to mvCand is present may be checked from motion information corresponding to HMVPIdx 0 in the first step. However, if mvCand is present in HMVPCandList[0], or is not present in HMVPCandList[HMVPIdx] corresponding to the range of HMVPIdx 0 to HMVPCandNum, the above-described updating method may output motion information of HMVPCandList[0]. If mvCand is present in HMVPCandList[HMVPIdx] among HMVPIdx different from 0, the content of HMVPCandList[0] is not updated and thus, it is unnecessary to compare mvCand with HMVPCandList[0]. In addition, the motion information of the current block may be similar to the motion information of a spatially neighboring block, and thus, the motion information may have a high probability of being similar to motion information that is recently added in the HMVP table. According to the assumption, mvCand may be more similar to the motion information of a candidate of which HMVPIdx is greater than 0, than the motion information of a candidate corresponding to HMVPIdx 0, and a pruning process may be terminated if similar (or identical) motion information is discovered. Accordingly, by performing the first step of FIG. 14 from HMVPIdx greater than 0, the number of times that comparison is performed may be reduced when compared to the embodiment of FIG. 14.

FIG. 16 is a diagram illustrating a method of updating a HMVP table according to an embodiment of the present disclosure. Referring to FIG. 16, according to an embodiment of the present disclosure, the encoder/decoder may perform comparison from HMVPIdx having a value greater than 0 in the process of identifying whether the motion information of a current block, that is, mvCand, is included in a HMVP table. In the process illustrated in FIG. 16, a motion candidate mvCand having two motion vectors mvL0 and mvL1, two reference indices refIdxL0 and refIdxL1, and two prediction list utilization flags predFlagL0 and predFlagL1 may be used as an input. The process illustrated in FIG. 16 may output a corrected HMVPCandList arrangement. For example, when identifying whether mvCand is included in the HMVP table, the encoder/decoder may perform a comparison process (or pruning process) excluding a predetermined number of pieces of motion information (or candidates) corresponding to HMVPIdx having a value greater than or equal to 0. Particularly, if a variable indicating the number of elements to be compared is NumPrune, the encoder/decoder may identify whether mvCand is identical to a HMVP table element in the range of elements corresponding to HMVPIdx (HMVPCandNum−NumPrune+1) to (HMVPCandNum−1). Through the above-described process, the number of times that comparison is performed may be dramatically reduced when compared to the previously described embodiment.

According to another embodiment, the encoder/decoder may compare mvCand with a predetermined location, which is set in advance and is different from HMVPIdx 0, in the HMVP table. For example, the encoder/decoder may check whether mvCand is duplicated motion information by comparing with a HMVP table element in the range of elements corresponding to HMVPIdx PruneStart to (HMVPCandNum−1).

FIG. 17 is a diagram illustrating a method of updating a HMVP table according to an embodiment of the present disclosure. Referring to FIG. 17, according to an embodiment of the present disclosure, in the process of identifying whether mvCand is included in the HMVP table, an encoder/decoder may compare mvCand with a HMVP table element in order from the latest added HMVP table element to the oldest HMVP table element. In the process illustrated in FIG. 17, a motion candidate mvCand having two motion vectors mvL0 and mvL1, two reference indices refIdxL0 and refIdxL1, and two prediction list utilization flags predFlagL0 and predFlagL1 may be used as an input. The process illustrated in FIG. 17 may output a corrected HMVPCandList arrangement. mvCand has a high probability of being similar to motion information of a spatially neighboring block, and thus, mvCand may be similar to relatively recently added motion information in the HMVP table. In the same manner, if similar (or identical) motion information is discovered, a pruning process may be terminated. Through the above, by performing comparison from HMVPIdx corresponding to a recently added element in the same manner as the embodiment of FIG. 17, the number of times that comparison needs to be performed may be reduced.

FIG. 18 is a diagram illustrating a pruning process according to an embodiment of the present disclosure. According to an embodiment of the present disclosure, when checking whether motion information of a current block is already included in a HMVP table, an encoder/decoder may compare with some information of the HMVP table. This is to reduce complexity caused by the comparison process. For example, in the case of checking whether the motion information is included in HMVPCandList[HMVPIdx], the encoder/decoder may perform a pruning process using a subset of HMVPCandList[HMVPIdx] or HMVPCandList[HMVPIdx] having a predetermined index. For example, information associated with L0 and L1 may be included in HMVPCandList[HMVPIdx]. If L0 and L1 utilization flags are all 1, the encoder/decoder may select any one of L0 and L1 according to a predetermined agreement (or condition) and may perform comparison. For example, a pruning process that checks whether duplicate motion information is present may be performed with respect to only a smaller reference list between the L0 reference index and L1 reference index.

According to an embodiment, the encoder/decoder may perform a pruning process with respect to only a smaller reference list between L0 reference index and L1 reference index of motion information in HMVP table. For example, the encoder/decoder may perform a pruning process with respect to only a smaller reference index between L0 reference index and L1 reference index of motion information of a current block. According to another embodiment, the encoder/decoder may compare a value obtained based on a subset of a motion information bit and a reference index bit of a current block with a value obtained based on a subset of a motion information bit and a reference index bit of a HMVP table element, so as to determine whether the value is already included in the HMVP table. According to an embodiment, the value obtained based on the subset of the motion information bit and the reference index bit may be a part of the motion information bit and the reference index bit. According to another embodiment, the value obtained based on the subset of the motion information bit and the reference index bit may be a value (or output) obtained by passing a first subset and a second subset through a hash function. According to another embodiment, in the pruning process, if the difference between two motion vectors is less than or equal to a predetermined threshold value, the encoder/decoder may determine that the two motion vectors are identical, or similar, to each other.

Figure 19:
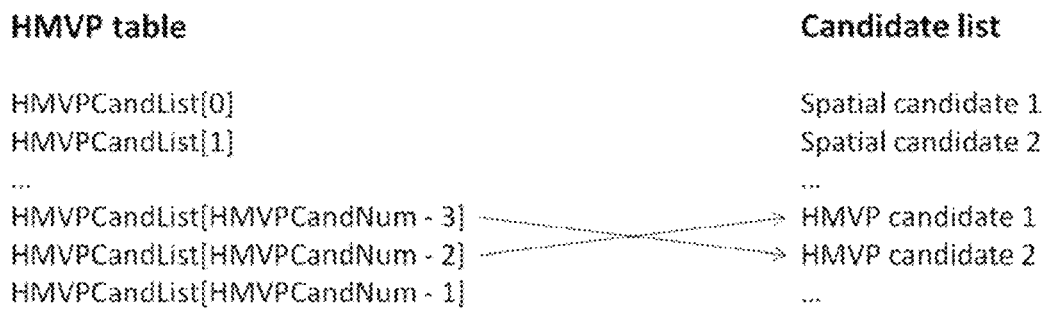
FIG. 19 is a diagram illustrating a method of adding a HMVP candidate according to an embodiment of the present disclosure.

FIG. 19 is a diagram illustrating a method of adding a HMVP candidate according to an embodiment of the present disclosure. According to an embodiment of the present disclosure, the encoder/decoder may add an MV included in a HMVP table to a motion candidate list. According to an embodiment, a motion of a current block may have a probability of being similar to a recently added motion, and the recently added motion may have a probability of being usable as a candidate, and thus, the encoder/decoder may add the recently added element in the HMVP table to the candidate list.

In this instance, according to an embodiment, referring to FIG. 19, the encoder/decoder may preferentially add, to the candidate list, an element having a predetermined index value, as opposed to a latest added HMVP table element. Alternatively, the encoder/decoder may add, to the candidate list, a predetermined number of previously added elements from an element immediately subsequent to the latest added HMVP table element.

Alternatively, according to an embodiment, the encoder/decoder may add, to the candidate list, a predetermined number of previously added elements from an element remaining after excluding at least one latest added HMVP table element. In this instance, the encoder/decoder may preferentially add, to the candidate list, relatively recently input motion information among the HMVP table elements.

The latest added HMVP table element may be a block that is spatially adjacent to the current block, and thus, the block may have a high probability of being already added as a spatial candidate in the candidate list configuring process. Therefore, by configuring the candidate list excluding a predetermined number of recently added candidates as described in the embodiment, an unnecessary candidate may be prevented from being added to the candidate list, and complexity of the pruning processor may be reduced when a candidate is added to the candidate list. Although a HMVP table element and the use thereof have been mainly described from the perspective of motion candidate list configuration, the present disclosure is not limited thereto, and may be applicable to another parameter or inter/intra-prediction related information.

Figure 20:
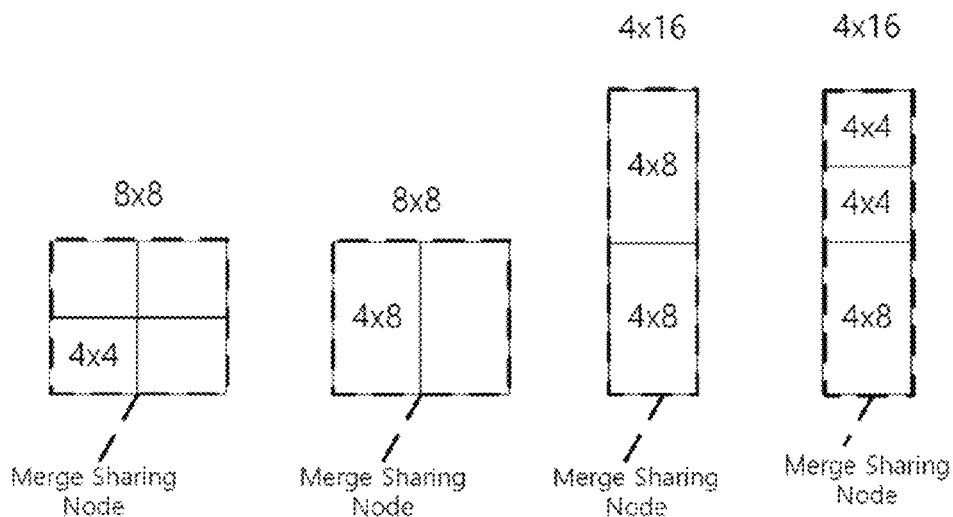
FIG. 20 is a diagram illustrating a merge sharing node according to an embodiment of the present disclosure.

FIG. 20 is a diagram illustrating a merge sharing node according to an embodiment of the present disclosure. According to an embodiment of the present disclosure, an encoder/decoder may share the same candidate list for a plurality of blocks for case of parallel processing. The candidate list may be a motion candidate list. The plurality of blocks may be defined according to a predetermined agreement. For example, blocks which are subordinate to a block (or an area) that satisfies a predetermined condition may be defined as the plurality of blocks. Alternatively, blocks included in a block that satisfies a predetermined condition may be defined as the plurality of blocks. In the specification, a candidate list that the plurality of blocks commonly uses may be referred to as a shared list. If it is applied to a merge candidate list, the merge candidate list may be referred to as a shared merge list.

In addition, in the specification, a block that satisfies the predetermined condition may be referred to as a merge sharing node (i.e., a part marked with a broken line in FIG. 20), a shared merge node, a merge sharing area, a shared merge area, a shared merge list node, a shared merge list area, or the like. The encoder/decoder may configure a motion candidate list based on motion information of a neighboring block adjacent to the merge sharing node. Through the same, parallel processing on coding units within the merge sharing node may be secured. In addition, a threshold value may be used as the above-mentioned predetermined condition. For example, a block defined as the merge sharing node may be defined (or determined) based on the threshold value. For example, the threshold value used for the predetermined condition may be set to a value related to a block size, a block width, or a block height.

Figure 21:
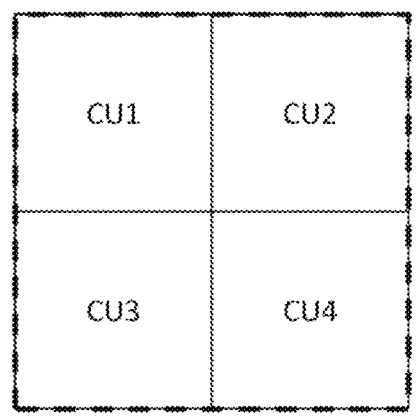
FIG. 21 is a diagram illustrating a method of updating a HMVP if a shared list is used according to an embodiment of the present disclosure.

FIG. 21 is a diagram illustrating a method of updating a HMVP if a shared list is used according to an embodiment of the present disclosure. FIG. 21 assumes the case in which a shared list described in FIG. 20 is used. When configuring a shared list using HMVP candidates, an encode and a decoder need to maintain the same HMVP table. If a rule for updating the HMVP table based on motion information used by a plurality of blocks that use the same shared list is not defined, they may be incapable of configuring the same candidate list. Therefore, on the assumption that CU1, CU2, CU3, and CU4 use a shared list in a merge sharing node as illustrated in FIG. 21, a method of updating a HMVP table in order to secure the same shared list in the merge sharing node will be described with reference to FIGS. 22 to 24.

Figure 22:
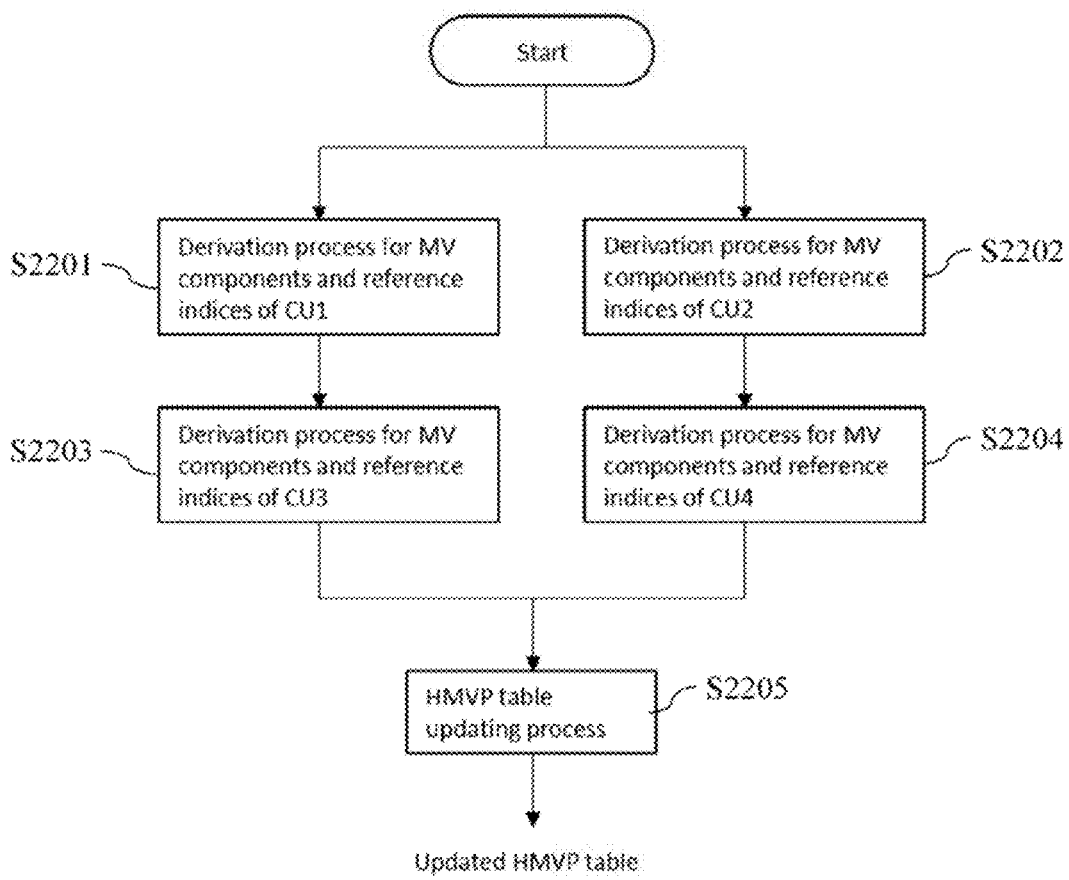
FIG. 22 is a diagram illustrating a method of updating a HMVP table based on motion information of blocks in a merge sharing node according to an embodiment of the present disclosure.

FIG. 22 is a diagram illustrating a method of updating a HMVP table based on motion information of blocks in a merge sharing node according to an embodiment of the present disclosure. Referring to FIG. 22, an encoder/decoder may apply the same shared list to CU1, CU2, CU3, and CU4 in subordinate node coding units of the merge sharing node. Particularly, the encoder/decoder may configure the same motion candidate list for CU1, CU2, CU3, and CU4 based on the motion information of a neighboring block adjacent to the merge sharing node in operations S2201, S2202, S2203, and S2204. The motion candidate list may include a motion vector component and a reference index.

After deriving or encoding/decoding motion information associated with CU1, CU2, CU3, and CU4 using the shared motion candidate list, the encoder/decoder may update the HMVP table using the motion information associated with CU1, CU2, CU3, and CU4 in operation S2205. In the state in which the same candidate list needs to be used, that is, in the merge sharing node, if the plurality of CUs perform HMVP table updating, they may not use the same candidate list. Therefore, according to an embodiment of the present disclosure, in the state in which the shared list needs to be used, updating of the HMVP table may be performed after MV deriving or coding for all CUs in the merge sharing node is terminated. Accordingly, all the CUs that belong to the merge sharing node may configure a motion candidate list based on the same HMVP table.

Figure 23:
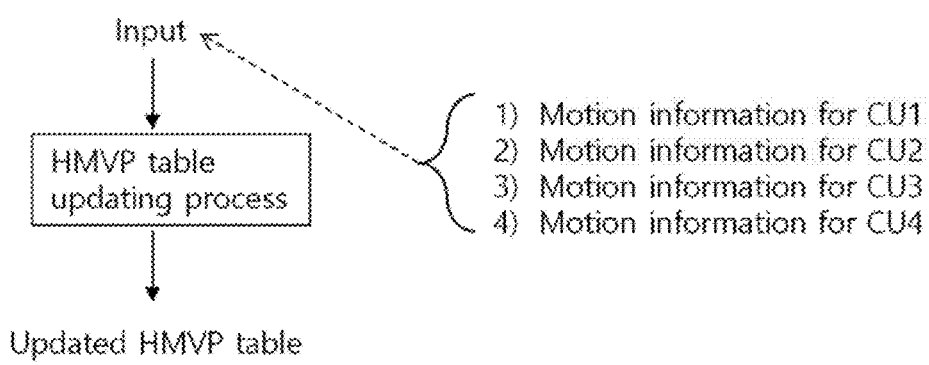
FIG. 23 is a diagram illustrating a method of updating a HMVP if a shared list is used according to an embodiment of the present disclosure.

FIG. 23 is a diagram illustrating a method of updating a HMVP if a shared list is used according to an embodiment of the present disclosure. Referring to FIG. 23, it is assumed that a shared list which has been described in FIGS. 20 to 22 is used. In this instance, if MV deriving or encoding/decoding for each CU of FIG. 22 is terminated, a plurality of CUs may be present in a merge sharing node, and thus, a plurality of pieces of used motion information may also be present.

According to an embodiment, as illustrated in FIG. 23, the encoder/decoder may update a HMVP table using all pieces of motion information in the merge sharing node. In other words, using the motion information used by all CUs that use the same shared list, the encoder/decider may update the HMVP table. In this instance, the order of updating may need to be set in advance for the encoder and the decoder.

According to an embodiment, the encoder/decoder may make reference to the order of regular decoding as the order of updating. For example, as shown in FIG. 23, motion information corresponding to each CU may be used sequentially in the order of regular coding, as input for the process of updating the HMVP table. Alternatively, according to an embodiment, the encoder/decoder may determine the order of updating the HMVP table associated with motion information of a plurality of CUs by making reference to the order of reference indices, a POC relationship between a current picture and a reference picture, and the like. For example, the HMVP table may be updated with all pieces of motion information in the merge sharing node in the order of reference indices. Alternatively, for example, the HMVP table may be updated with all pieces of motion information in the merge sharing node in the order of low difference in POC between the current picture and the reference picture or in the order of high difference.

Figure 24:
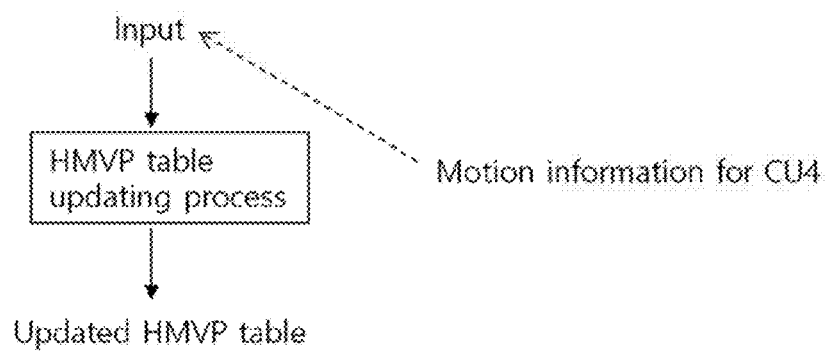
FIG. 24 is a diagram illustrating a method of updating a HMVP table based on motion information of blocks in a merge sharing node according to an embodiment of the present disclosure.

FIG. 24 is a diagram illustrating a method of updating a HMVP table based on motion information of blocks in a merge sharing node according to an embodiment of the present disclosure. Referring to FIG. 24, it is assumed that a shared list which has been described in FIGS. 20 to 22 is used. In this instance, if MV deriving or encoding/decoding for each CU of FIG. 22 is terminated, a plurality of CUs may be present in a merge sharing node, and thus a plurality of pieces of used motion information may also be present.

According to an embodiment of the present disclosure, an encoder/decoder may update a HMVP table using some of the motion information that a plurality of CUs use in the merge sharing node. In other words, the encoder/decoder may not update, in the HMVP table, at least some of the motion information that the plurality of CUs use in the merge sharing node. For example, the encoder/decoder may make reference to the order of regular decoding as the order of updating. For example, the encoder/decoder may update the HMVP table using a predetermined number of pieces of motion information which have late decoding turns in the order of regular decoding among the motion information corresponding to each CU. A block having a late decoding turn in the order of regular coding may have a high probability of being spatially adjacent to a block to be subsequently coded, and may need a similar motion when motion compensation is performed.

According to an embodiment, referring to FIG. 24, if CU1 to CU4 that use the same shared list are present, the encoder/decoder may use only motion information associated with CU4 that is coded lastly according to the order of regular decoding to update the HMVP table. According to another embodiment, the encoder/decoder may update the HMVP table using some of the motion information of a plurality of CUs by making reference to the order of reference indices, a POC relationship between a current picture and a reference picture, and the like.

In addition, according to another embodiment of the present disclosure, when adding a HMVP candidate from the HMVP table to a candidate list, the encoder/decoder may add the HMVP candidate to the candidate list by making reference to the relationship between a current block and a block corresponding to an element in the HMVP table. Alternatively, the encoder/decoder may make reference to the location relationship between candidate blocks included in the HMVP table, when adding a HMVP candidate from the HMVP table to the candidate list. For example, the encoder/decoder may add a HMVP candidate from the HMVP table to the candidate list by taking into consideration the order of HMVP or block decoding.

Figure 25:
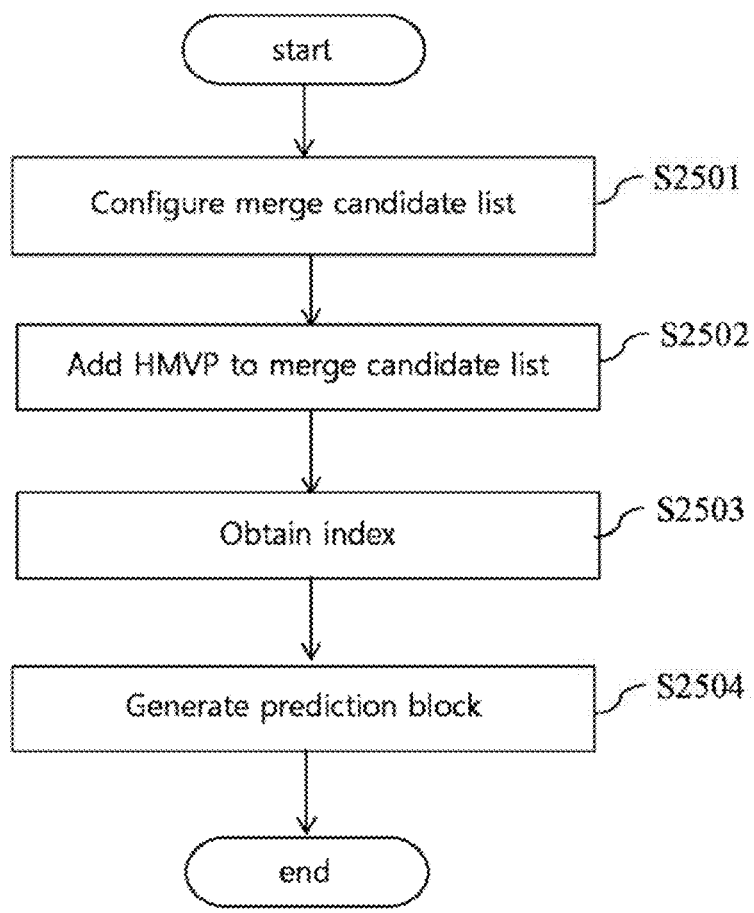
FIG. 25 is a diagram illustrating a method of processing a video signal based on a HMVP according to an embodiment of the present disclosure.

FIG. 25 is a diagram illustrating a method of processing a video signal based on a HMVP according to an embodiment of the present disclosure. Referring to FIG. 25, description will be provided mainly from the perspective of a decoder for case of description, but the present disclosure is not limited thereto. A HMVP-based video signal processing method according to the embodiment may be applied to an encoder in substantially the same manner.

Particularly, if a current block is located in a merge sharing node including a plurality of coding blocks, the decoder may configure a merge candidate list using a spatial candidate adjacent to the merge sharing node in operation S2501. The decoder may add, to the merge candidate list, a predetermined HMVP of a HMVP table including at least one history-based motion vector predictor (HMVP) in operation S2502. Here, the HMVP is motion information of a block coded in advance of the plurality of coding blocks.

The decoder may obtain index information indicating a merge candidate used for predicting the current block from the merge candidate list in operation S2503, and may generate a prediction block of the current block based on the motion information of the merge candidate in operation S2504. The decoder may generate a reconstruction block of the current block by adding the prediction block and a residual block. As described above, according to an embodiment of the present disclosure, motion information of at least one of the plurality of coding blocks included in the merge sharing node may not be updated in the HMVP table. As described above, the decoder may update the HMVP table using motion information of a predetermined number of coding blocks which have relatively late turns in the order of decoding among the plurality of coding blocks included in the merge sharing node.

As described above, the decoder may update the HMVP table using motion information of a coding block which has the latest turn in the order of decoding among the plurality of coding blocks included in the merge sharing node. In addition, if the current block is not located in the merge sharing node, the decoder may update the HMVP table using motion information of the merge candidate. In addition, as described above, the decoder may check whether duplicate motion information of that of a candidate in the merge candidate list is present using a HMVP having a predetermined index defined in advance in the HMVP table.

Figure 26:
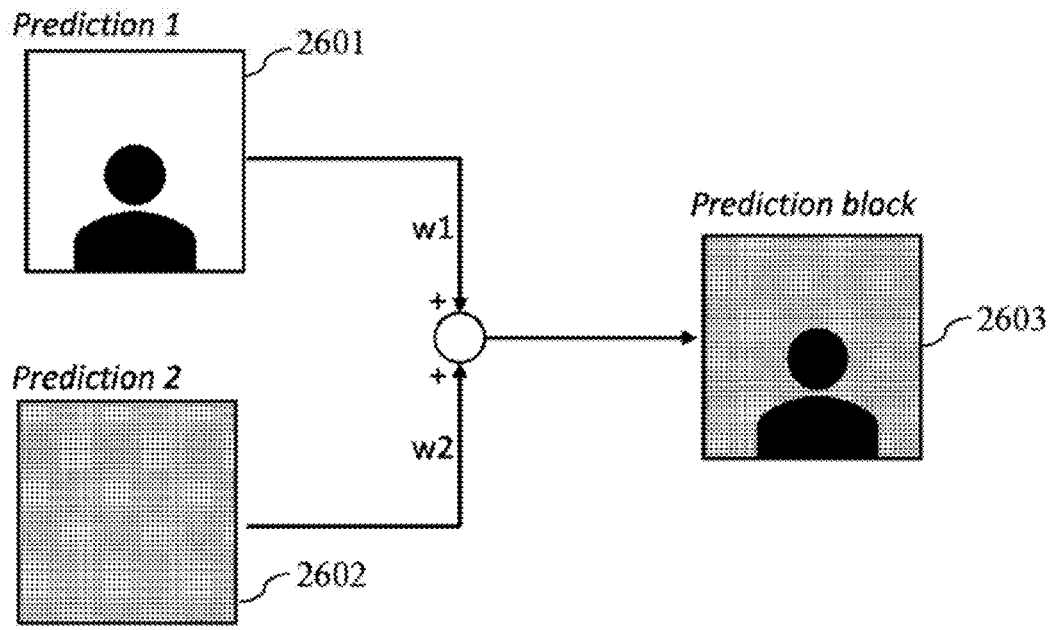
FIG. 26 is a diagram illustrating a multi-hypothesis prediction method according to an embodiment of the present disclosure.

FIG. 26 is a diagram illustrating a multi-hypothesis prediction method according to an embodiment of the present disclosure. According to an embodiment of the present disclosure, an encoder/decoder may generate a prediction block based on various prediction methods. In the specification, a prediction method based on various prediction modes is referred to multi-hypothesis prediction. However, the present disclosure is not limited to the name, and the multi-hypothesis prediction in the specification may be referred to as multi-prediction, numerous predictions, combined prediction, inter-intra weighted prediction, combined inter-intra prediction, combined inter-intra weighed prediction, or the like. According to an embodiment, the multi-hypothesis prediction may be a block generated by an arbitrary prediction method. In addition, according to an embodiment, a prediction method in the multi-prediction may include an intra-prediction method, an inter-prediction method, and the like. In addition, a prediction method in the multi-prediction may be a merge mode, an AMVP mode, a predetermined mode of intra-prediction, and the like in detail. In addition, an encoder/decoder may generate a final prediction block by performing a weighted-sum of prediction blocks (or prediction samples) generated based on the multi-prediction.

According to an embodiment of the present disclosure, the maximum number of prediction methods used for the multi-prediction may be set in advance. For example, the maximum number of prediction methods of the multi-prediction may be 2. Therefore, the encoder/decoder may generate a prediction block by applying two predictions in the case of uni-prediction, and by applying two predictions (i.e., the case in which multi-prediction is used only for prediction based on a single reference list) or four predictions (i.e., the case in which multi-prediction is used for prediction based on two reference lists) in the case of bi-prediction.

Alternatively, according to an embodiment of the present disclosure, a prediction mode usable in multi-hypothesis prediction may be set in advance. Alternatively, a combination of prediction modes usable for multi-hypothesis prediction may be set in advance. For example, the encoder/decoder may perform multi-hypothesis prediction using a prediction block (or prediction sample) generated via inter-prediction and intra-prediction.

According to an embodiment of the present disclosure, the encoder/decoder may use some of inter-prediction and/or intra-prediction modes for multi-hypothesis prediction. For example, for multi-hypothesis prediction, the encoder/decoder may use only a merge mode of the inter-prediction. In addition, for multi-hypothesis prediction, the encoder/decoder may use a merge mode, as opposed to a subblock merge mode, of the inter-prediction mode. Alternatively, for multi-hypothesis prediction, the encoder/decoder may use a predetermined intra-mode of the intra-prediction mode. For example, for multi-hypothesis prediction, the encoder/decoder may restrictively use a prediction mode including at least one of a planar, a DC mode, and a vertical and/or horizontal mode among the intra-prediction. According to an embodiment, the encoder/decoder may generate a prediction block based on predictions via the intra-prediction and merge mode. In this instance, at least one restrictive prediction mode among a planar mode, a DC mode, and a vertical and/or horizontal mode may be used as the intra-prediction.

Referring to FIG. 26, the encoder/decoder may generate a prediction block using a first prediction (prediction 1) and a second prediction (prediction 2). Particularly, the encoder/decoder may generate a first temporary prediction block (or prediction sample) by applying the first prediction, and may generate a second temporary prediction block by applying the second prediction. The encoder/decoder may generate a final prediction block by performing a weighted-sum of the first temporary prediction block and the second temporary prediction block. In this instance, the encoder/decoder may do a weighted sum by applying a first weight (w1) to the first temporary prediction block generated based on the first prediction, and by applying a second weight (w2) to the second temporary prediction block generated based on the second prediction.

According to an embodiment of the present disclosure, in the case of generating a prediction block based the multi-hypothesis prediction, a weight applied to the multi-hypothesis prediction may be determined based on a predetermined location in a block. In this instance, the block may be a current block or a neighboring block. Alternatively, the weight of the multi-hypothesis prediction may be based on a mode used for generating a prediction. For example, if one of the modes for generating a prediction corresponds to intra-prediction, the encoder/decoder may determine a weight based on a prediction mode. In addition, for example, if one of the prediction modes corresponds to intra-prediction and a directionality mode, the encoder/decoder may increase a weight for a sample located far from a reference sample.

According to an embodiment of the present disclosure, if an intra-prediction mode used for multi-hypothesis prediction is a directionality mode, and another prediction mode corresponds to inter-prediction, the encoder/decoder may apply a relatively higher weight to a prediction sample generated based on intra prediction applied to a sample far away from a reference sample. In the case of inter-prediction, motion compensation may be performed using a spatial neighboring candidate. In this instance, the motion of the spatial neighboring block to which reference is made for motion compensation may have a high probability of being identical, or similar, to that of the current block. Accordingly, prediction of an area adjacent to the spatial neighboring block and prediction of an area including an object that moves may have a high probability of being more accurate than other parts. In this instance, the number of residual signals adjacent to the boundary in the opposite direction of the spatial neighboring block may be greater than the other area (or part). According to an embodiment of the present disclosure, this may be offset by applying a combination of intra-predicted samples in the multi-hypothesis prediction. In addition, according to an embodiment, the location of a reference sample of intra-prediction may be adjacent to a spatial neighboring candidate of inter-prediction. Accordingly, the encoder/decoder may apply a high weight to an area that is relatively far away from it.

According to another embodiment, if one of the modes used for generating a multi-hypothesis prediction sample corresponds to intra-prediction and a directionality mode, the encoder/decoder may apply a high weight to a sample relatively close to a reference sample. Particularly, one of the modes used for generating a multi-hypothesis prediction sample corresponds to intra-prediction and a directionality mode, and a mode for generating another multi-hypothesis prediction sample corresponds to inter-prediction, the encoder/decoder may apply a high weight to a prediction sample generated based on intra prediction applied to a sample close to a reference sample. In the intra-prediction, as the distance between a prediction sample and a reference sample is closer, the accuracy of the prediction is higher.

According to another embodiment, if one of the modes used for generating a multi-hypothesis prediction sample corresponds to intra-prediction and is not a directionality mode (e.g., a planar mode or DC mode), a weight may be set to be a constant value irrespective of a location in a block. In addition, according to an embodiment, a weight for prediction 2 may be determined based on a weight for prediction 1 in the multi-hypothesis prediction. The following equation shows an example of determining a prediction sample based on the multi-hypothesis prediction.

$$pbSamples[x][y] = \text{Clip3}(0, (1 \ll bitDepth) - 1, (w * predSamples[x][y] + (8 - w) * predSamplesIntra[x][y] \gg 3)) \quad \text{[Equation 5]}$$

In Equation 5, pbSamples is a (final) prediction sample (or prediction block) generated based on the multi-hypothesis prediction. predSamples denotes a block/sample generated by inter-prediction, and predSamplesIntra denotes a block/sample generated by intra-prediction. In Equation 5, x and y represent the coordinates of a sample in a block, and the range thereof are as follow. x=0 . . . nCbW−1 and y=0 . . . nCbH−1. In addition, nCbW and nCbH denote the width and the height of a current block, respectively. In addition, according to an embodiment, a weight w may be determined according to the following process.

If predModeIntra is INTRA_PLANAR or INTRA_DC, or nCbW<4, or nCbH<4 or cIdx>0, w may be set to 4.

Otherwise, if predModeIntra is INTRA_ANGULAR50 and y<(nCbH/4), w may be set to 6.

Otherwise, if predModeIntra is INTRA_ANGULAR50 and (nCbH/4)<=y<(nCbH/2), w may be set to 5.

Otherwise, if predModeIntra is INTRA_ANGULAR50 and (nCbH/2)<=y<(3*nCbH/4), w may be set to 4.

Otherwise, if predModeIntra is INTRA_ANGULAR50 and (3*nCbH/4)<=y<nCbH, w may be set to 3.

Otherwise, if predModeIntra is INTRA_ANGULAR18 and x<(nCbW/4), w may be set to 6.

Otherwise, if predModeIntra is INTRA_ANGULAR18 and (nCbW/4)<=x<(nCbW/2), w may be set to 5.

Otherwise, if predModeIntra is INTRA_ANGULAR18 and (nCbW/2)<=x<(3*nCbW/4), w may be set to 4.

Otherwise, if predModeIntra is INTRA_ANGULAR18 and (3*nCbW/4)<=x<nCbW, w may be set to 3.

Table 2 shows a multi-hypothesis prediction-related syntax structure according to an embodiment of the present disclosure.

TABLE 2

| | |
|---|---|
| if( mh_conditions ) | |
|   mh_intra_flag[ x0 ][ y0 ] | ae(v) |
| if( mh_intra_flag[ x0 ][ y0 1] ) { | |
|   mh_intra_luma_mpm_flag[ x0][ y0 ] | ae(v) |
|   if( mh_intra_luma_mpm_flag[ x0 ][ y0 ] ) | |
|     mh_intra_luma_mpm_idx[ x0 ][ y0 ] | ae(v) |
| } | |

In Table 2, mh_intra_flag denotes a flag indicating whether multi-hypothesis prediction is used. According to an embodiment of the present disclosure, multi-hypothesis prediction may be applied only when a previously defined predetermined condition (referred to as mh_conditions for ease of description in the specification) for multi-hypothesis prediction is satisfied. If mh_conditions is not satisfied, an encoder/decoder may infer the value of mh_intra_flag to be "0" without parsing mh_intra_flag. For example, mh_conditions may include a condition related to a block size. In addition, mh_conditions may include a condition related to usage of a predetermined mode defined in advance. For example, if merge_flag which is a flag indicating whether to apply a merge mode is 1, and subblock_merge_flag which is a flag indicating whether to apply a subblock merge mode is 0, mh_intra_flag may be parsed. In other words, if a merge mode is applied to the current block, and a subblock merge mode is not applied, the encoder/decoder may take into consideration (or apply) the multi-hypothesis prediction.

In addition, according to an embodiment of the present disclosure, in order to determine a mode in the multi-hypothesis prediction, the encoder may configure a plurality of lists by dividing candidate modes into the lists, and may signal a list to be used to the decoder. Referring to Table 2, mh_intra_luma_mpm_flag may be a flag indicating a list to be used among the plurality of lists. If mh_intra_luma_mpm_flag is not present, the value of mh_intra_luma_mpm_flag is inferred (or regarded) to be 1. In addition, according to an embodiment of the present disclosure, the plurality of lists may be an MPM list and a non-MPM list.

In addition, according to an embodiment, the encoder may signal, to the decoder, an index (or index information) indicating a candidate to be used in a list among the plurality of lists. Referring to Table 2, mh_intra_luma_mpm_idx may be the above-mentioned index. In addition, according to an embodiment, the index may be signaled only when a predetermined list is selected. Only when a predetermined list is determined based on mh_intra_luma_mpm_flag, mh_intra_luma_mpm_idx may be parsed.

According to an embodiment of the present disclosure, multi-hypothesis prediction may be performed based on a prediction generated based on inter-prediction and a prediction generated based on intra-prediction according to an embodiment described in FIG. 26. For example, the encoder/decoder may perform the multi-hypothesis prediction only when use of inter-prediction is signaled. Alternatively, the encoder/decoder may perform multi-hypothesis prediction only when use of a predetermined mode of inter-prediction, such as a merge mode, is signaled. In this instance, signaling associated with inter-prediction is not separately required. In addition, according to an embodiment, when the encoder/decoder performs prediction according to intra-prediction, the total number of candidate modes may be 4. For example, a first list and a second list may be configured using three candidate modes and one candidate modes, respectively, among a total of 4 candidate modes. In this instance, the second list including one prediction mode is selected, the encoder may not signal an index to the decoder. In addition, if the first list is selected, an index indicating a predetermined candidate may be signaled to the decoder. In this instance, the number of candidates included in the first list is three, and thus, 1-bit signaling or 2-bit signaling may be performed according to a variable length coding scheme.

Table 3 shows a multi-hypothesis prediction-related syntax structure according to an embodiment of the present disclosure.

TABLE 3

| | |
|---|---|
| if( mh_conditions ) | |
|   mh_intra_flag[ x0 ][ y0 ] | ae(v) |
| if( mh_intra_flag[ x0 ][ y0 ] ) { | |
|   if( !mh_mpm_infer_condition ) | |
|     mh_intra_luma_mpm_flag[ x0 ][ y0 ] | ae(v) |
|   if( mh_intra_luma_mpm_flag[ x0 ][ y0 ] ) | |
|     mh_intra_luma_mpm_idx[ x0 ][ y0 ] | ae(v) |
| } | |

In Table 3, as described in Table 2, signaling indicating a list to be used among the plurality of lists may be present, and mh_intra_luma_mpm_flag may be such syntax element in Tables 2 to 3. Description of a syntax element which has been described in Table 2 will be omitted.

According to an embodiment of the present disclosure, signaling indicating a list to be used may be explicitly signaled only for a predetermined case. If a list to be used is not explicitly signaled, the encoder/decoder may infer the value of a syntax element according to a predetermined method. Referring to Table 3, if a condition of mh_mpm_infer_condition is satisfied, explicit signaling may not be present. If the condition of mh_mpm_infer_condition is not satisfied, explicit signaling may be present. In addition, if the condition of mh_mpm_infer_condition is satisfied, mh_intra_luma_mpm_flag is not present. In this instance, the value of mh_intra_luma_mpm_flag is inferred to 1. That is, in this instance, the encoder/decoder may infer that an MPM list is used.

Table 4 shows a multi-hypothesis prediction-related syntax structure according to an embodiment of the present disclosure.

TABLE 4

```
if( mh_conditions )
    mh_intra_flag[ x0 ][ y0 ]                        ae(v)
if( mh_intra_flag[ x0 ][ y0 ] ) {
    if( Abs(Log2( cbWidth/cbHeight )) < 2 )
        mh_intra_luma_mpm_flag[ x0 ][ y0 ]           ae(v)
    if( mh_intra_luma_mpm_flag[ x0 ][ y0 ] )
        mh_intra_luma_mpm_idx[ x0 ][ y0 ]            ae(v)
}
```

As described in Table 2 to Table 3, signaling indicating a list to be used among the plurality of lists may be present, and if a predetermined condition is satisfied, the encoder/decoder may infer the value. Description of a syntax element which has been described in Table 2 and Table 3 will be omitted.

According to an embodiment of the present disclosure, a condition for inferring a signaling value (or a syntax element or parameter) indicating a list to be used among the plurality of list may be determined based on the size of the current block. For example, the encoder/decoder may determine the condition based on the width and the height of the current block. Particularly, the encoder/decoder may infer the signaling value if a larger value between the width and the height of the current block is greater than n times a smaller value. For example, n may be set to a natural value such as 2, 3, 4, and the like. Referring to Table 4, the condition for inferring the signaling value indicating a list to be used among the plurality of lists may be the condition that a larger value between the width and the height of the current block should be two times greater than a smaller value. If the width and the height of the current block is cbWidth and cbHeight, respectively, Abs(Log2(cbWidth/cbHeight)) may be 0 when cbWidth and cbHeight are the same, and Abs(Log2(cbWidth/cbHeight)) may be 1 when one of cbWidth and cbHeight is two times greater than the other. Accordingly, if one of cbWidth and cbHeight is greater than 2 times the other, Abs(Log2(cbWidth/cbHeight)) may be greater than 1 (i.e., may have a value greater than or equal to 2).

Figure 27:
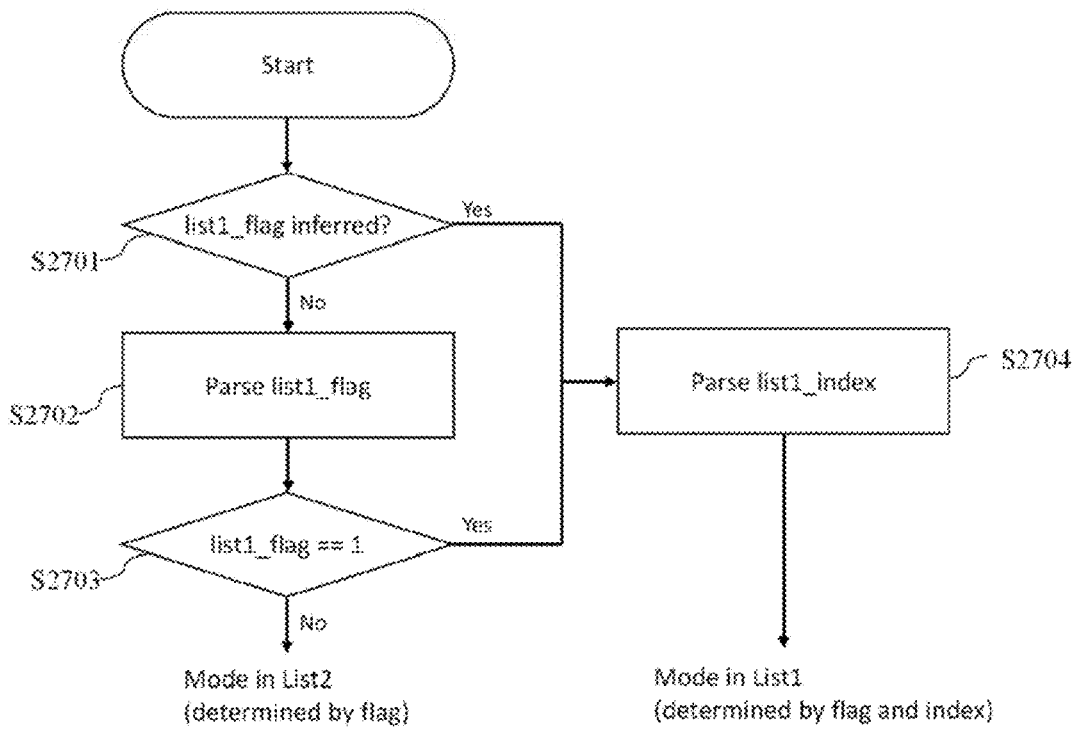
FIG. 27 is a diagram illustrating a method of determining a multi-hypothesis prediction mode according to an embodiment of the present disclosure.

FIG. 27 is a diagram illustrating a method of determining a multi-hypothesis prediction mode according to an embodiment of the present disclosure. As described in Tables 2 to 4, a prediction mode to be used for multi-hypothesis prediction may be determined based on a plurality of lists. For example, the prediction mode may be an intra-mode for generating a prediction based on intra-prediction. In addition, the plurality of lists may include two lists, such as a first list and a second list. Referring to FIG. 27, whether the first list is used may be determined based on list1_flag. According to an embodiment, a plurality of candidates may belong to the first list, and one candidate may belong to the second list.

If list1_flag is inferred, an encoder/decoder may infer that the value indicates the use of the first list in operation S2701. In this instance, list1_index which is an index indicating a candidate to be used in the first list may be parsed in operation S2704. If list1_flag is not inferred in operation S2701, the encoder/decoder may parse list1_flag in operation S2702. If list1_flag is 1, the encoder/decoder may parse list1_index. If list1_flag is not 1, the encoder/decoder may not parse the index. In addition, if list1_flag is 1, a mode to be actually used among the candidate modes of the first list may be determined based on the index in operation S2703. In addition, if list1_flag is not 1, the encoder/decoder may determine a candidate mode in the second list as a mode to be actually used, without using an index. That is, a mode may be determined based on both a flag and an index in the first list. A mode may be determined based on a flag in the second list.

Figure 28:
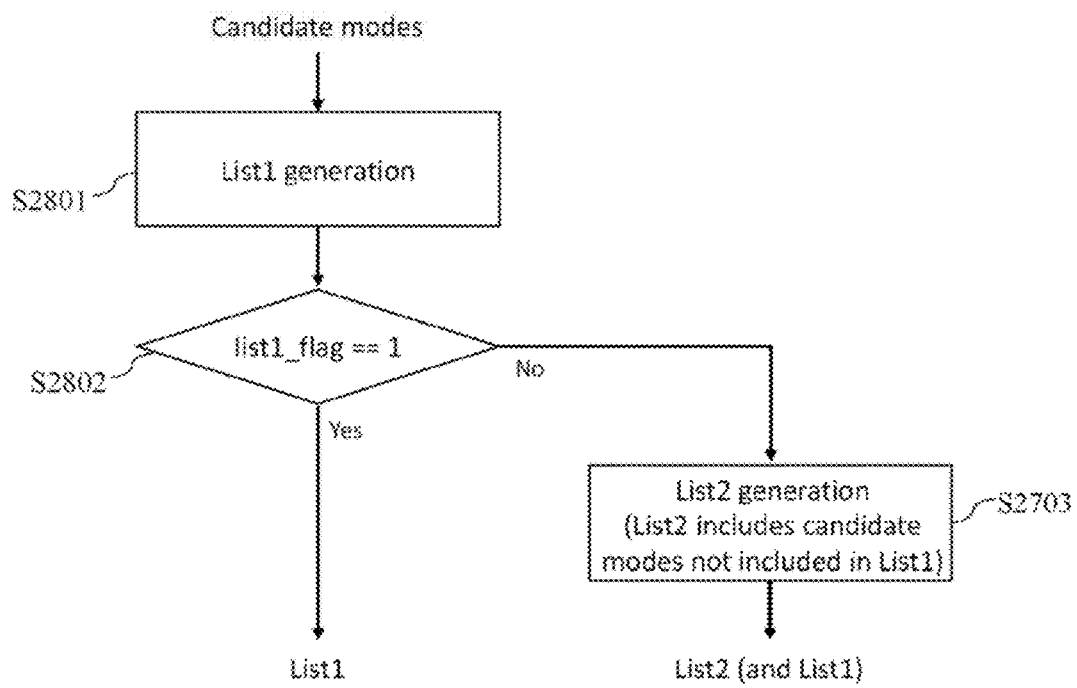
FIG. 28 is a diagram illustrating a method of determining a multi-hypothesis prediction mode according to an embodiment of the present disclosure.

FIG. 28 is a diagram illustrating a method of determining a multi-hypothesis prediction mode according to an embodiment of the present disclosure. According to an embodiment of the present disclosure, if a variable length coding is performed on an index that determines a candidate mode in a list, a method of determining the order of modes included in a candidate list may be applied in order to increase the coding efficiency. For example, the method of determining the order of modes included in the first list may be present. In this instance, the encoder/decoder may make reference to a mode in the neighboring area of a current block in order to determine the order of modes. In addition, in the case of the second list, the order of modes may be determined without making reference to a mode in the neighboring area of the current block. For example, the encoder/decoder may generate the first list by making reference to a mode in the neighboring area of the current block, and may add a mode that is not included in the first list to the second list. According to an embodiment, the first list may be an MPM mode and the second list may be a non-MPM mode. In addition, the total number of candidate modes is 4, and three modes are included in the first list and one candidate mode is included in the second list.

Referring to FIG. 28, list1_flag which is a syntax element indicating whether the first list is used may be present. If the first list is used, the encoder/decoder may generate the first list in operations S2801 and S2802, and may select a predetermined mode in the first list. In this instance, generation of the first list and identification of whether the first list is used may be performed in arbitrary order. For example, in the situation in which the first list is used, the first list may be generated before or after the use of the first list is identified. In addition, the encoder/decoder may not perform a process of generating the second list if the first list is used.

If the first list is not used, the encoder/decoder may generate the second list in operations S2803, and may select a predetermined mode in the second list. In this instance, the encoder/decoder may generate the first list in order to generate the second list. The encoder/decoder may add, to the second list, a candidate that is not included in the first list among the candidate modes. In addition, according to an embodiment of the present disclosure, the method of generating the first list may be the same, irrespective of whether the first list is used (list1_flag value), whether the use of the first is inferred, or the like. In this instance, the above-described method with reference to Tables 2 to 4 and FIG. 27 may be applied to list signaling and mode signaling.

Hereinafter, a method of configuring (or generating) a plurality of lists for determining a prediction mode to be used for multi-hypothesis prediction, which has been described with reference to FIGS. 27 and 28, will be additionally described. For example, as described above, the plurality of lists may include two lists. That is, the plurality of lists may include a first list and a second list. In addition, the plurality of lists may be used for a multi-hypothesis prediction process.

According to an embodiment of the present disclosure, the encoder/decoder may generate many lists by making reference to a mode in the neighboring area of the current block. In addition, the encoder/decoder may perform intra-prediction using a mode selected in the list, and may combine a prediction sample (or prediction block) generated via the intra-prediction with an inter-predicted prediction sample, so as to generate a multi-hypothesis prediction block. In the specification, although a final prediction sample (or prediction block) generated via the multi-hypothesis prediction is referred to as a multi-hypothesis prediction block, the present disclosure is not limited thereto. For example, the multi-hypothesis prediction block may be referred to as a prediction bock, a final prediction block, a multi-prediction block, a combined prediction block, an inter-intra weighed prediction block, a combined inter-intra prediction block, a combined inter-intra weighed prediction block, and the like.

According to an embodiment, a mode (candidate mode) that may be included in the list may be set to at least one of a planar mode, a DC mode, a vertical mode, and/or horizontal mode of an intra-prediction method. In this instance, the vertical mode may be a mode corresponding to index (or mode number) 50 of FIG. 6, and the horizontal mode may be a mode corresponding to index 18 of FIG. 6. In addition, the planar mode and the DC mode may be index 0 and index 1, respectively.

According to an embodiment of the present disclosure, a candidate mode list may be generated by making reference to the prediction mode of a neighboring block of the current block. In addition, the candidate mode list may be referred to as candModeList in the specification. According to an embodiment, the candidate mode list may be the first list which has been described in the above embodiments. In addition, according to an embodiment, the mode of a neighboring block of the current block may be expressed as candIntraPredModeX. That is, candIntraPredModeX is a variable indicating the mode of a neighboring block. Here, X may be a variable indicating a predetermined location in the neighboring area of the current block, such as A, B and the like.

According to an embodiment, the encoder/decoder may generate a candidate mode list based on whether a duplicate is present among a plurality of candIntraPredModeX. For example, candIntraPredModeX may be present in association with two locations, and the modes of the corresponding locations may be expressed as candIntraPredModeA and candIntraPredModeB. For example, if candIntraPredModeA and candIntraPredModeB are identical, the candidate mode list may include a planar mode and a DC mode.

According to an embodiment, if candIntraPredModeA and candIntraPredModeB are identical and the value indicates a planar mode or a DC mode, the encoder/decoder may add a mode indicated by candIntraPredModeA and candIntraPredModeB to the candidate mode list. In addition, the encoder/decoder may add, to the candidate mode list, a mode that is not indicated by candIntraPredModeA and candIntraPredModeB among the planar mode and the DC mode. In addition, the encoder/decoder may add, to the candidate mode list, a predetermined mode which is different from the planar mode or the DC mode. According to an embodiment, in this instance, the turns that the planar mode, the DC mode, and the predetermined mode have in the candidate mode list may be determined in advance. For example, the order of modes may be in the order of the planar mode, the DC mode, and the predetermined mode. That is, candModeList[0]=planar mode, candModeList[1]=DC mode, and candModeList[2]=the predetermined mode. In addition, the predetermined mode may be the vertical mode. According to another embodiment, among the planar mode, the DC mode, and the predetermined mode, a mode indicated by candIntraPredModeA and candIntraPredModeB may be added to the candidate mode list first. Among the planar mode and the DC mode, a mode that is not indicated by candIntraPredModeA and candIntraPredModeB may be added as a subsequent candidate. Subsequently, the predetermined mode may be added.

If candIntraPredModeA and candIntraPredModeB are identical and the value does not indicate the planar mode or the DC mode, the encoder/decoder may add a mode indicated by candIntraPredModeA and candIntraPredModeB to the candidate mode list. In addition, the planar mode and the DC mode may be added to the candidate mode list. In addition, the turns that the mode indicated by candIntraPredModeA and candIntraPredModeB, the planar mode, and the DC mode have in the candidate mode list may be determined in advance. In addition, the predetermined order may be in the order of the mode indicated by candIntraPredModeA and candIntraPredModeB, the planar mode, and the DC mode. That is, candModeList[0]=candIntraPredModeA, candModeList[1]=planar mode, candModeList[2]=DC mode.

In addition, if candIntraPredModeA and candIntraPredModeB are different from each other, the encoder/decoder may add both candIntraPredModeA and candIntraPredModeB to the candidate mode list. In addition, candIntraPredModeA and candIntraPredModeB may be included in the candidate mode list in a predetermined order defined in advance. For example, candIntraPredModeA and candIntraPredModeB may be included in the candidate mode list in the order of candIntraPredModeA and candIntraPredModeB. In addition, the order of candidate modes may be determined in advance, and the encoder/decoder may add, to the candidate mode list, a mode that is different from candIntraPredModeA and candIntraPredModeB among the modes in the predetermined order. In addition, a mode that is different from candIntraPredModeA and candIntraPredModeB may be added after candIntraPredModeA and candIntraPredModeB in the candidate mode list. In addition, the predetermined order may be in the order of the planar mode, the DC mode, and the vertical mode. In addition, the predetermined order may be in the order of the planar mode, the DC mode, the vertical mode, and the horizontal mode. That is, candModeList[0]=candIntraPredModeA, candModeList[1]=candIntraPredModeB, and candModeList[2] may be a foremost mode among the modes that are different from candIntraPredModeA and candIntraPredModeB among the planar mode, the DC mode, and the vertical mode.

In addition, according to an embodiment, a mode that is not included in the candidate mode list among the candidate modes may be defined as candIntraPredModeC. For example, candIntraPredModeC may be included in the second list. In addition, candIntraPredModeC may be determined when signaling indicating the use of the first list indicates that the first list is not used. If the first list is used, the encoder/decoder may determine a mode in the candidate mode list according to an index. If the first list is not used, a mode in the second list may be used.

In addition, as described above, after the candidate code list is generated, a process of correcting the candidate mode list may be added. For example, the encoder/decoder may or may not additionally perform the correcting process depending on a current block size condition. For example, the current block size condition may be determined based on the width and the height of the current block. For example, if a larger value between the width and the height of the current block is greater than n times the other, the correcting process may be additionally performed. For example, n may be defined to be 2.

In addition, according to an embodiment, the correcting process may be a process of replacing a mode, when the mode is included in the candidate mode list, with another mode. For example, if the vertical mode is included in the candidate mode list, the encoder/decoder may insert the horizontal mode, instead of the vertical mode, to the candidate mode list. Alternatively, if the vertical mode is included in the candidate mode list, the encoder/decoder may add candIntraPredModeC, instead of the vertical mode, to the candidate mode list. Alternatively, since the planar mode and the DC mode may be always included in the candidate mode list when the candidate mode list is generated, and thus, candIntraPredModeC may be the horizontal mode. In addition, the correcting process may be used when the height of the current block is greater than n times the width. For example, n may be defined to be 2. If the height is greater than the width, the lower side of the block is far from the reference sample of intra-prediction and thus, the accuracy of the vertical mode may be low. Alternatively, the correcting process may be used when it is inferred that the first list is used.

In addition, according to an embodiment of the present disclosure, as another example of the candidate list correcting process, if the horizontal mode is included in the candidate mode list, the encoder/decoder may add the vertical mode, instead of the horizontal mode, to the candidate mode list. Alternatively, if the horizontal mode is included in the candidate mode list, the encoder/decoder may add candIntraPredModeC, instead of the horizontal mode, to the candidate mode list. Alternatively, since the planar mode and the DC mode may be always included in the candidate mode list when the candidate mode list is generated, and thus, candIntraPredModeC may be the vertical mode. In addition, the correcting process may be used when the width of the current block is greater than n times the height. For example, n may be defined to be 2. If the width is greater than the height, the right side of the block is far from the reference sample of intra-prediction and thus, the accuracy of the horizontal mode may be low. Alternatively, the correcting process may be used when it is inferred that the first list is used.

An example of a list configuring method which has been described above will be additionally described. In the specification, IntraPredMode Y denotes a mode used for intra-prediction when multi-hypothesis prediction is performed. In addition, IntraPredModeY denotes the mode of a luma component. According to an embodiment, in multi-hypothesis prediction, an intra-prediction mode of a chroma component may be derived from a luma component. In addition, in the specification, mh_intra_luma_mpm_flag denotes a variable (or syntax element) indicating a list to be used among a plurality of lists. For example, mh_intra_luma_mpm_flag may be mh_intra_luma_mpm_flag of Tables 2 to 4, or may be list1_flag of FIGS. 27 and 28. In addition, in the specification, mh_intra_luma_mpm_idx denotes an index indicating a candidate to be used in a list. For example, mh_intra_luma_mpm_idx may be mh_intra_luma_mpm_idx of Tables 2 to 4, or may be list_index of FIG. 27. In addition, in the specification, xCb and yCb may be the x coordinate and y coordinate at the top-left of the current block. cbWidth and cbHeight may be the width and the height of the current block.

Figure 29:
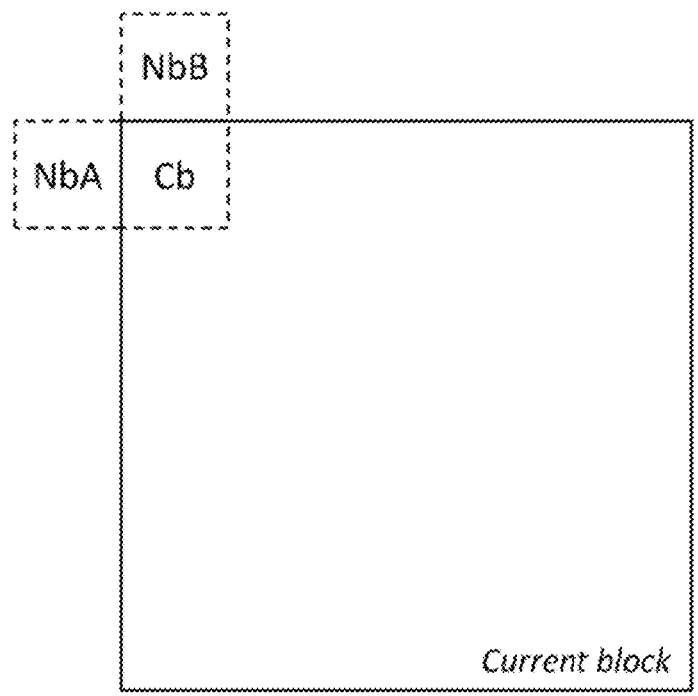
FIG. 29 is a diagram illustrating a neighboring location to which reference is made for multi-hypothesis prediction according to an embodiment of the present disclosure.

FIG. 29 is a diagram illustrating a neighboring location that multi-hypothesis prediction makes reference to according to an embodiment of the present disclosure. Referring to FIG. 29, as described above, an encoder/decoder may make reference to a neighboring location during the process of configuring a candidate list of multi-hypothesis prediction. For example, candIntraPredModeX, which has been described above, may be needed. In this instance, the locations of A and B adjacent to a current block may be NbA and NbB as shown in FIG. 29. That is, the locations may be on the left and on the top of a sample located at the top-left of the current block. If the location at the top-left of the current block is Cb as illustrated in FIG. 18, and the coordinates thereof are (xCb, yCb), NbA may be (xNbA, yNbA)=(xCb−1, yCb) and NbB may be (xNbB, yNbB)=(xCb, yCb−1).

Figures 30, 31:
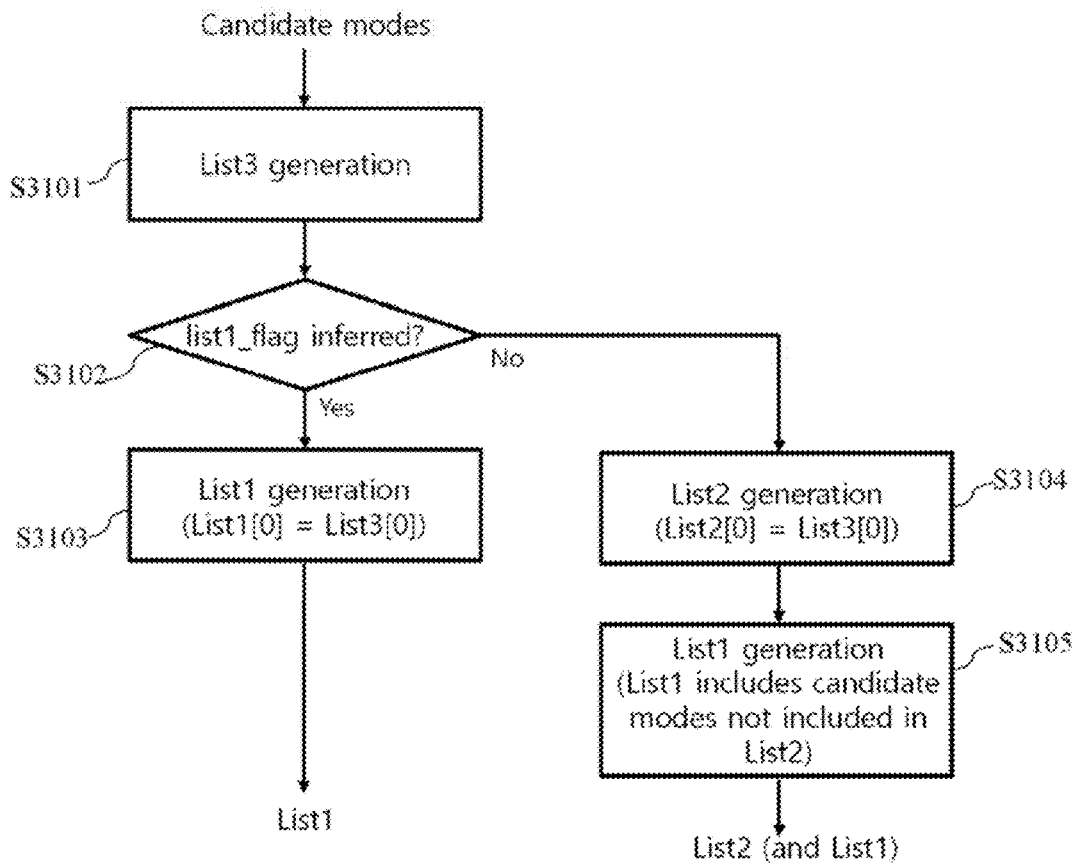
FIG. 30 is a diagram illustrating a method of making reference to a mode in a neighboring area according to an embodiment of the present disclosure.
FIG. 31 is a diagram illustrating a candidate list generating method according to an embodiment of the present disclosure.

FIG. 30 is a diagram illustrating a method of making reference to a mode in a neighboring area according to an embodiment of the present disclosure. Referring to FIG. 30, as described above, an encoder/decoder may make reference to a neighboring location during the process of configuring a candidate list of multi-hypothesis prediction. In addition, a candidate mode list may be generated using a neighboring mode or a mode based on the neighboring mode. For example, a mode obtained by making reference to a neighboring location may be candIntraPredModeX. According to an embodiment, if a neighboring location is unavailable, candIntraPredModeX may be a predetermined mode. The case in which a neighboring location is unavailable may include the case in which the neighboring location uses inter-prediction, the case in which a mode is not determined from the perspective of a predetermined order of encoding/decoding, and the like. In addition, if a neighboring location does not use multi-hypothesis prediction, candIntraPredModeX may be a predetermined mode. Alternatively, if a neighboring location is beyond the CTU and is located above the CTU that the current block belongs to, candIntraPredModeX may be a predetermined mode. As another example, if a neighboring location is beyond the CTU that the current block belongs to, candIntraPredModeX may be a predetermined mode. In addition, according to an embodiment, the predetermined mode may be the DC mode. According to another embodiment, the predetermined mode may be the planar mode.

According to an embodiment of the present disclosure, depending on whether the mode of a neighboring location is beyond a threshold angle, or whether the index of the mode of a neighboring location is beyond a threshold, candIntraPredModeX may be set. For example, if the index of the mode of a neighboring location is greater than the index of a predetermined directionality mode, the encoder/decoder may set candIntraPredModeX to the vertical mode index. In addition, if the index of the mode of a neighboring location is less than or equal to the index of a predetermined directionality mode, and corresponds to a directionality mode, the encoder/decoder may set candIntraPredModeX to the horizontal mode index. For example, the index of a predetermined directionality mode may be mode 34 of FIG. 6. In addition, if the mode of a neighboring location is the planar mode or the DC mode, candIntraPredModeX may be set to the planar mode or the DC mode.

Referring to FIG. 30, mh_intra_flag may be a syntax element (or a variable or a parameter) indicating whether multi-hypothesis prediction is used (or has been used). In addition, an intra-prediction mode used by a neighboring block may be X. In addition, a current block may use multi-hypothesis prediction, and a candidate list may be generated using a candidate intra-prediction mode that is based on the mode of a neighboring block. However, in this instance, the encoder/decoder may set the candidate intra-prediction mode to the DC mode which is a predetermined mode, irrespective of an intra-prediction mode of the neighboring block or whether the neighboring block uses intra-prediction since the neighboring block does not use multi-hypothesis prediction.

An example of the method of making reference to a mode in a neighboring area will be described again below.

According to an embodiment of the present disclosure, candIntraPredModeX (X is A or B) which is an intra-prediction mode of a neighboring block may be derived according to the following method.

1. A neighboring block availability check process calls an availability derive process for a designated block. The availability derive process sets a location (xCurr, yCurr) to (xCb, yCb), inputs (xNbX, yNbX) as a neighboring location (xNbY, yNbY), and allocates an output to an available variable availableX.
2. A candidate intra-prediction mode candIntraPredModeX may be derived according to the following method.
   A. If at least one of the following conditions is true, candIntraPredModeX may be set to INTRA_DC mode.
      a) The variable availableX is false.
      b) mh_intra_flag[xNbX][yNbX] is different from 1.
      c) X is B, yCb−1 is less than ((yCb>>CtbLog2SizeY)<<CtbLog2Size Y)
   B. Otherwise, if IntraPredMode Y[xNbX][yNbX]>INTRA_ANGULAR34, candIntraPredModeX may be set to INTRA_ANGULAR50.
   C. Otherwise, if IntraPredMode Y[xNbX][yNbX]<=INTRA_ANGULAR34, and IntraPredMode Y[xNbX][yNbY]>INTRA_DC, candIntraPredModeX may be set to INTRA_ANGULAR18.
   D. Otherwise, candIntraPredModeX is set equal to IntraPredMode Y[xNbX][yNbX].

As described above, in the above-described list configuration method, candIntraPredModeX may be determined according to the method of making reference to a neighboring mode.

FIG. 31 is a diagram illustrating a candidate list generating method according to an embodiment of the present disclosure. According to the method of generating a first list and a second list which has been described with reference to Tables 2 to 4, an encoder/decoder may generate a first list by making reference to a mode in the neighboring area of a current block, and may generate a second list using a mode that is not included in the first list among candidate modes. Due to spatial similarity within a picture, the mode in the neighboring area to which reference is made may have a high priority. That is, the first list may have a higher priority than the second list. However, according to the method of signaling the first list and the second list, which has been described in Tables 2 to 4, if a signaling that determines a list is not inferred, the encoder/decoder may perform signaling using a flag and an index in order to use a mode in the first list, and may use only a flag in order to use a mode in the second list. That is, the encoder/decoder may use a relatively smaller number of bits to perform signaling of the second list. However, the fact that a larger number of bits is used for signaling a mode in the list having a higher priority may be inefficient from the perspective of coding efficiency. Therefore, according to an embodiment of the present disclosure, there is provided a method of using a smaller number of bits for signaling a list and a mode with a high priority.

That is, according to an embodiment of the present disclosure, depending on whether only a list with a relatively higher priority is available, a candidate list generating method may be differently defined. Whether only the first list is available may indicate whether a signaling indicating a list to be used is inferred. For example, if it is assumed that a second list generated according to a predetermined method using a candidate mode is present, the encoder/decoder may distributively insert a third list into the first list and the second list. For example, the above-described candidate mode list and the generation method thereof may be applied as the third list generated according to a predetermined method and a third list generation method. If a signaling indicating a list to be used is inferred, only the first list may be used. In this instance, the encoder/decoder may fill the first list with the third list from the front part. In addition, if a signaling indicating a list to be used is not inferred, the first list or the second list may be used. In this instance, the encoder/decoder may fill the second list with the third list from the front part of the third list, and may fill the first list with the remaining part. In this instance, the encoder/decoder may fill the first list with the remaining part in the order named in the third list. That is, candIntraPredModeX may be added to a candidate list with reference to a mode in the neighboring area of the current block. If a signaling indicating a list is inferred, candIntraPredModeX may be added to the first list. Otherwise, candIntraPredModeX may be added to the second list.

According to an embodiment, the size of the second list may be 1. In this instance, if a signaling indicating a list is inferred, the encoder/decoder may add candIntraPredModeA to the first list. If the signaling is not inferred, candIntraPredModeA may be added to the second list. candIntraPredModeA may be list3[0] which is the foremost mode named in the third list. Therefore, in the present disclosure, candIntraPredModeA which is a mode based on a mode in the neighboring area may be added to both the first list and the second list depending on the case. Conversely, according to the method which has been described in Tables 2 to 4, candIntraPredModeA may be added to only the first list. That is, according to the present disclosure, depending on whether a signaling indicating a list to be used is inferred, the first list generating method may be differently configured.

Referring to FIG. 31, candidate modes may be candidates that may be used for generating an intra-prediction of multi-hypothesis prediction. That is, depending on whether list1_flag which is a signaling indicating a list to be used is inferred, a candidate list generating method may be changed in operations S3101 and S3102. If the signaling is inferred, it is inferred that a first list is used, and only the first list is used. Accordingly, the encoder/decoder may add a third list from the foremost mode to the first list in operation S3103. When generating the third list, the encoder/decoder may add a mode that is based on a mode in the neighboring area to the top of the third list. If the signaling is not inferred, both the first list and a second list may be used. Accordingly, the encoder/decoder may add the third list from the foremost mode to the second list that requires a small signaling in operation S3104. If the first list is needed, for example, if the use of the first list is signaled, the encoder/decoder may exclude the candidates added to the second list from the third list and may add the remaining candidates to the first list in operation S3105. In the present disclosure, although description is provided by taking example of the case of generating the third list for case of description, the present disclosure is not limited thereto. The first list and the second list may be generated by temporarily classifying candidates.

According to an embodiment of the present disclosure, a method of generating a candidate list according to the embodiments described below and the method of generating a candidates list which has been described with reference to FIGS. 27 and 28 may be adaptively used. For example, the encoder/decoder may select one of the two methods of generating a candidate list, depending on whether a signaling indicating a list to be inferred. In addition, this may correspond to the case of multi-hypothesis prediction. In addition, the first list may include three modes, and the second list may include one mode. In addition, as described in FIGS. 27 and 28, the encoder/decoder may signal a mode in the first list using a flag and an index, and may signal a mode in the second list using a flag.

According to an embodiment, if candIntraPredModeA and candIntraPredModeB are identical, and candIntraPredModeA is the planar mode or the DC mode, it is determined that List2[0]=planar mode, List1[0]=DC mode, List1[1]=vertical mode, and List1[2]=horizontal mode. According to another embodiment, if candIntraPredModeA and candIntraPredModeB are identical, and candIntraPredModeA is the planar mode or the DC mode, it is determined that List2[0]=candIntraPredModeA, List1[0]=!candIntraPredModeA, List1[1]=vertical mode, and List1[2]=horizontal mode.

In addition, according to an embodiment, if candIntraPredModeA and candIntraPredModeB are identical, and candIntraPredModeA is the directionality mode, it is determined that List2[0]=candIntraPredModeA, List1[0]=planar mode, List1[1]=DC mode, and List1[2]=vertical mode. In addition, according to an embodiment, if candIntraPredModeA and candIntraPredModeB arc different, List2[0]=candIntraPredModeA, and List1[0]=candIntraPredModeB. To List1[1] and List1[2], a mode which is different from candIntraPredModeA and candIntraPredModeB may be added first among the planar mode, the DC mode, the vertical mode, and the horizontal mode.

Figure 32:
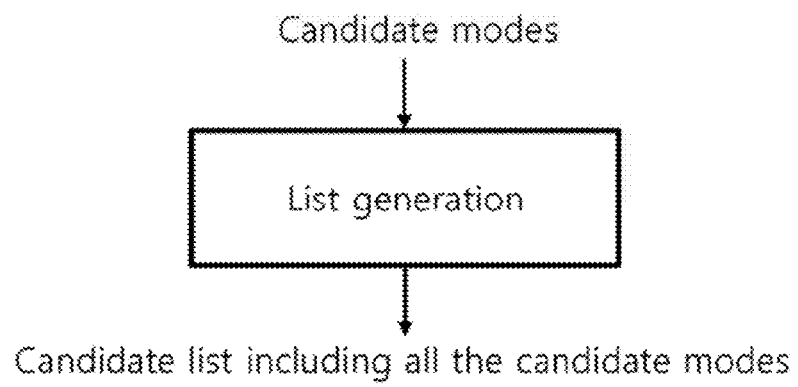
FIG. 32 is a diagram illustrating a candidate list generating method according to an embodiment of the present disclosure.

FIG. 32 is a diagram illustrating a candidate list generating method according to an embodiment of the present disclosure. In above-described embodiments, the method of determining a mode based on a plurality of lists has been described. Referring to FIG. 32, according to an embodiment of the present disclosure, a mode may be determined based on a single list instead of a plurality of lists. Particularly, as illustrated in FIG. 32, a single candidate list including all the candidate modes of multi-hypothesis prediction may be generated. Table 5 shows a multi-hypothesis prediction-related syntax structure according to an embodiment of the present disclosure.

TABLE 5

| | |
|---|---|
| if( mh_conditions ) | |
|   mh_intra_flag[ x0 ][ y0 ] | ae(v) |
| if( mh_intra_flag[ x0 ][ y0 ] ) { | |
|   mh_intra_luma_idx[ x0 ][ y0 ] | ae(v) |
| } | |

Referring to Table 5, a single candidate list is present and thus, a signaling for selecting a list is not present, but an index signaling indicating a mode to be used among the modes in the candidate list may be present. Therefore, if mh_intra_flag indicating the use of multi-hypothesis prediction is "1", a decoder may parse mh_intra_luma_idx which is a candidate index. According to an embodiment of the present disclosure, the method of generating a candidate list of multi-hypothesis prediction may be based on the existing MPM list generation method of intra-prediction. Alternatively, according to an embodiment, the candidate list of multi-hypothesis prediction may be configured in the form of a list in which the first list and the second list are combined sequentially according to the method of generating the first list and the second list as described in FIG. 28.

That is, if the candidate list of multi-hypothesis prediction is referred to as a candidate mode list, the size of the candidate mode list may be 4 in the embodiment. If candIntraPredModeA and candIntraPredModeB are identical, and correspond to the planar mode or the DC mode, the candidate mode list may be determined in a predetermined order. For example, candModeList[0]=planar mode, candModeList[1]=DC mode, candModeList[2]=vertical mode, and candModeList[3]=horizontal mode. According to another embodiment, if candIntraPredModeA and candIntraPredModeB are identical, and correspond to the planar mode or the DC mode, it is determined that candModeList[0]=candIntraPredModeA, candModeList[1]=!candIntraPredModeA, candModeList[2]=vertical mode, and candModeList[3]=horizontal mode.

Alternatively, if candIntraPredModeA and candIntraPredModeB are identical, and correspond to the directionality mode, it is determined that candModeList[0]=candIntraPredModeA, candModeList[1]=planar mode, candModeList[2]=DC mode, and candModeList[3]=mode different from candIntraPredModeA, planar mode, and DC mode. If candIntraPredModeA and candIntraPredModeB are different, candModeList[0]=candIntraPredModeA, and candModeList[1]=candIntraPredModeB. In addition, to candModeList[2] and candModeList[3], a mode that is different from candIntraPredModeA and candIntraPredModeB may be added sequentially in a predetermined order of the candidate modes. The predetermined order may be in the order of the planar mode, the DC mode, the vertical mode, and the horizontal mode.

According to an embodiment of the present disclosure, the candidate list may differ depending on a block size condition. If a larger value between the width and the height of a block is greater than n times the other, the candidate list may be short. For example, if the width is greater than n times the height, the encoder/decoder may remove the horizontal mode from the candidate list which has been described with reference to FIG. 31, and may fill the candidate list with a mode subsequent to the horizontal mode. In addition, if the height is greater than n times the width, the encoder/decoder may remove the vertical mode from the candidate list which has been described with reference to FIG. 32, and may fill the candidate list with a mode subsequent to the vertical mode. Therefore, if the width is greater than n times the height, the size of the candidate list may be 3. In addition, if the width is greater than n times the height, the size of the candidate list may be the shorter than or equal to the opposite case.

According to an embodiment, variable length coding may be performed on a candidate index according to the embodiment of FIG. 32. Through the above, a mode having a high probability of being used is added to the front part of the list, and thus, signaling efficient may be increased. According to another embodiment, fixed length coding may be performed on a candidate index according to the embodiment of FIG. 32. The number of modes used in multi-hypothesis prediction may be 2 to the nth power. For example, as described above, four intra-prediction modes may be used. In this instance, even though fixed length coding is performed, a value that is not allocated is not present and an unnecessary part may not be present in signaling. In addition, if fixed length coding is performed, the number of cases of lists configured may be 1. Irrespective of which index is signaled, the number of bits is the same.

According to an embodiment, depending on the case, variable length coding or fixed length coding may be performed on a candidate index. For example, as described above, the size of the candidate list may differ depending on the case. According to an embodiment, variable length coding or the fixed length coding may be performed on a candidate index depending on the size of the candidate list. For example, if the size of the candidate list corresponds to 2 to the nth power, fixed length coding may be performed. Otherwise, variable length coding may be performed. That is, according to the above-mentioned embodiments, a coding method may differ depending on a block size condition.

According to an embodiment of the present disclosure, if the DC mode is used when multi-hypothesis prediction is used, weights for a plurality of predictions associated with the entire block may be the same and thus, the result may be identical, or similar to adjusting a weight for a prediction block. Accordingly, the DC mode may be excluded from the multi-hypothesis prediction. According to an embodiment, the encoder/decoder may use only planar mode, the vertical mode, the horizontal mode in the multi-hypothesis prediction. In this instance, the encoder/decoder may signal multi-hypothesis prediction using a single list as described in FIG. 32. In addition, the encoder/decoder may use variable length coding for index signaling. According to an embodiment, a list may be generated in a fixed order. For example, the fixed order may be in the order of the planar mode, the vertical mode, and the horizontal mode.

According to another embodiment, the encoder/decoder may generate a list by making reference to a mode in the neighboring area of the current block. For example, if candIntraPredModeA and candIntraPredModeB are identical, candModeList[0]=candIntraPredModeA. If candIntraPredModeA and candIntraPredModeB are identical, and candIntraPredModeA is the planar mode, candModeList[1] and candModeList[2] may be configured in a predetermined order. If candIntraPredModeA and candIntraPredModeB are identical, and candIntraPredModeA is different from the planar mode, candModeList[1]=planar mode, and candModeList[2]=mode that is different from candIntraPredModeA and the planar mode. If candIntraPredModeA and candIntraPredModeB are different, candModeList[0]=candIntraPredModeA, candModeList[1]=candIntraPredModeB, and candModeList[2]=mode different from candIntraPredModeA and candIntraPredModeB.

According to another embodiment, the encoder/decoder may use only three modes in the multi-hypothesis prediction. The three modes may include the planar mode and the DC mode. In addition, the three modes may include one of the vertical mode and the horizontal mode according to a condition. The condition may be a condition related to a block size. For example, which one of the modes between the horizontal mode and the vertical mode is to be included may be determined depending on which one of the width and the height of the block is a larger value. For example, if the width of the block is greater than the height, the vertical mode may be included. If the height of the block is greater than the width, the horizontal mode may be included. If the height and the width of the block are identical, a predetermined mode defined in advance between the vertical mode and the horizontal mode may be included.

In addition, according to an embodiment, the encoder/decoder may generate a list in a fixed order. For example, the fixed order may be defined in the order of the planar mode, the DC mode, the vertical mode or the horizontal mode. According to another embodiment, a list may be generated by making reference to a mode in the neighboring area of the current block. For example, if candIntraPredModeA and candIntraPredModeB are identical, candModeList[0]=candIntraPredModeA. If candIntraPredModeA and candIntraPredModeB are identical, and candIntraPredModeA is different from the directionality mode, the encoder/decoder may configure candModeList[1] and candModeList[2] in a predetermined order. If candIntraPredModeA and candIntraPredModeB are identical, and candIntraPredModeA is the directionality mode, candModeList[1]=planar mode and candModeList[2]=DC mode. If candIntraPredModeA and candIntraPredModeB are different, candModeList[0]=candIntraPredModeA, candModeList[1]=candIntraPredModeB, and candModeList[2]=mode different from candIntraPredModeA and candIntraPredModeB.

According to another embodiment of the present disclosure, only two modes may be used in the multi-hypothesis prediction. The two modes may include the planar mode. In addition, the two modes may include one of the vertical mode and the horizontal mode according to a condition. The condition may be a condition related to a block size. For example, which of the modes between the horizontal mode and the vertical mode is to be included may be determined by the encoder/decoder depending on which one of the width and the height of the block is a larger value. For example, if the width of the block is greater than the height, the vertical mode may be included. If the height of the block is greater than the width, the horizontal mode may be included. If the height and the width of the block are identical, a predetermined mode defined in advance between the vertical mode or the horizontal mode may be included. In this instance, a flag indicating a mode to be used in the multi-hypothesis prediction may be signaled.

According to an embodiment, the encoder/decoder may exclude a predetermined mode depending on a block size. For example, if the size of the block is small, a predetermined mode may be excluded. For example, if the size of the block is small, only the planar mode may be used in the multi-hypothesis prediction. If a predetermined mode is excluded, mode signaling may be omitted or a decreased signaling may be performed.

According to another embodiment of the present disclosure, the encoder/decoder may use only one mode (i.e., an intra-prediction mode) for generating an intra-predicted sample in the multi-hypothesis prediction. According to an embodiment, the one mode may be defined to be the planar mode. As described above, the multi-hypothesis prediction may use an inter-prediction sample and an intra-prediction sample. If an inter-prediction sample is generated, and also an intra-prediction sample is generated by determining an optimal prediction mode, the accuracy of prediction may be increased, but the complexity of encoding may be increased and the number of signaling bits may be increased. Therefore, when performing multi-hypothesis prediction, by using only the planar mode which is statistically frequently used as an intra-prediction mode, the complexity of encoding may be improved and signaling bits may be saved, and thus, the performance of compression of an image may be increased.

According to another embodiment, the one mode may be determined based on a block size between the vertical mode and the horizontal mode. For example, one of the vertical mode and the horizontal mode may be determined as the mode depending on which one of the width and the height of the block is a larger value. For example, if the width of the block is greater than the height, the vertical mode may be determined as the mode. If the height of the block is greater than the width, the horizontal mode may be determined as the mode. If the width and the height of the block are identical, the encoder/decoder may determine a predetermined mode as the mode. If the width and the height of the block are identical, the encoder/decoder may determine, as the mode, a predetermined mode between the horizontal mode or the vertical mode. If the width and the height of the block are identical, the encoder/decoder may determine a predetermined mode between the planar mode or the DC mode as the mode.

In addition, according to an embodiment of the present disclosure, a flipping signaling that flips a prediction generated in the multi-hypothesis prediction may be present. Through the above, although a single mode is selected in the multi-hypothesis prediction, flipping may remove a residual in the other side. In addition, through the above, the number of candidate modes available in the multi-hypothesis prediction may be decreased. More particularly, for example, flipping may be used for the case that uses only a single mode among the embodiments. Through the above, the performance of prediction may be increased. The flipping may be flipping with respect to the x axis, flipping with respect to the y axis, or flipping with respect to both the x axis and the y axis. According to an embodiment, a flipping direction may be determined based on a selected mode in the multi-hypothesis prediction. For example, if the selected mode is the planar mode in the multi-hypothesis prediction, the encoder/decoder may determine that the flipping is flipping with respect to both the x axis and the y axis. Flipping with respect to the both the x axis and the y axis may be based on a block size or shape. For example, if the block is not a square, the encoder/decoder may determine that flipping may be performed with respect to not all the x axis and the y axis. For example, if the selected mode is the horizontal mode in the multi-hypothesis prediction, the encoder/decoder may determine that the flipping is flipping with respect to the x axis. For example, if the selected mode is the vertical mode in the multi-hypothesis prediction, the encoder/decoder may determine that the flipping is flipping with respect to the y axis. In addition, if the selected mode in the multi-hypothesis prediction is the DC mode, the encoder/decoder may determine that no flipping is present and may not perform explicit signaling/parsing.

In addition, the DC mode in the multi-hypothesis prediction may provide an effect similar to that of illumination compensation. Therefore, according to an embodiment of the present disclosure, if one of the DC mode in the multi-hypothesis prediction and the illumination compensation is used, the other may not be used. In addition, the multi-hypothesis prediction may provide an effect similar to that of generalized bi-prediction (GBi). For example, in the multi-hypothesis prediction, the DC mode may provide an effect similar to that of GBi. GBi prediction may be a scheme that adjusts weights for two reference blocks of bi-prediction in units of blocks and in units of CUs. Therefore, according to an embodiment of the present disclosure, if one of the multi-hypothesis prediction (or the DC mode in the multi-hypothesis prediction) and the GBi prediction is used, the other may not be used. In addition, this may be the case that includes bi-prediction among the predictions of the multi-hypothesis prediction. For example, if a merge candidate selected from the multi-assumption prediction is bi-prediction, GBi prediction may not be used. In the embodiments, the relationship between multi-hypothesis prediction and GBi prediction may be limited to the case in which a predetermined mode of the multi-hypothesis prediction, for example, a DC mode, is used. Alternatively, in the case in which a GBi prediction-related signaling is present earlier than a multi-hypothesis prediction-related signaling, if the GBi prediction is used, multi-hypothesis prediction or a predetermined mode of the multi-hypothesis prediction may not be used. In the present disclosure, not using a predetermined method means that a signaling associated with the predetermined method is not performed and a related syntax is not parsed.

Figure 33:
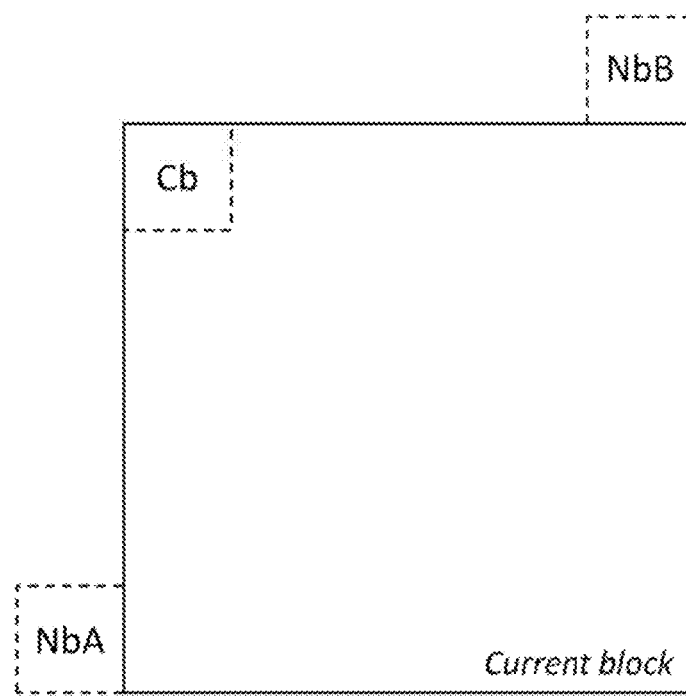
FIG. 33 is a diagram illustrating a neighboring location to which reference is made for multi-hypothesis prediction according to an embodiment of the present disclosure.

FIG. 33 is a diagram illustrating a neighboring location that multi-hypothesis prediction makes reference to according to an embodiment of the present disclosure. As described above, an encoder/decoder may make reference to a neighboring location during the process of configuring a candidate list of multi-hypothesis prediction. For example, candIntraPredModeX which has been described above may be needed. In this instance, the locations of A and B which are adjacent to a current block and to which reference is made may be NbA and NbB as shown in FIG. 33. If the location at the top-left of the current block is Ch as illustrated in FIG. 29, and the coordinates thereof are (xCb, yCb), NbA may be (xNbA, yNbA)=(xCb−1, yCh+cbHeight−1), and NbB may be (xNbB, yNbB)=(xCb+cbWidth−1, yCb−1). Here, cbWidth and cbHeight may be the width and the height of the current block, respectively. In addition, in the process of configuring a candidate list of the multi-hypothesis prediction, a neighboring location may be the same as a neighboring location to which reference is made for generating an MPM list of intra-prediction.

According to another embodiment, a neighboring location to which reference is made for configuring a candidate list of multi-hypothesis prediction may be the left-central point of the current block, the top-central point of the current, or a location adjacent thereto. For example, NbA and NbB may be (xCb−1, yCh+cbHeight/2−1), (xCb+cbWidth/2−1, yCb−1). Alternatively, NbA and NbB may be (xCb−1, yCh+cbHeight/2), (xCb+cbWidth/2, yCb−1).

Figures 34, 35:
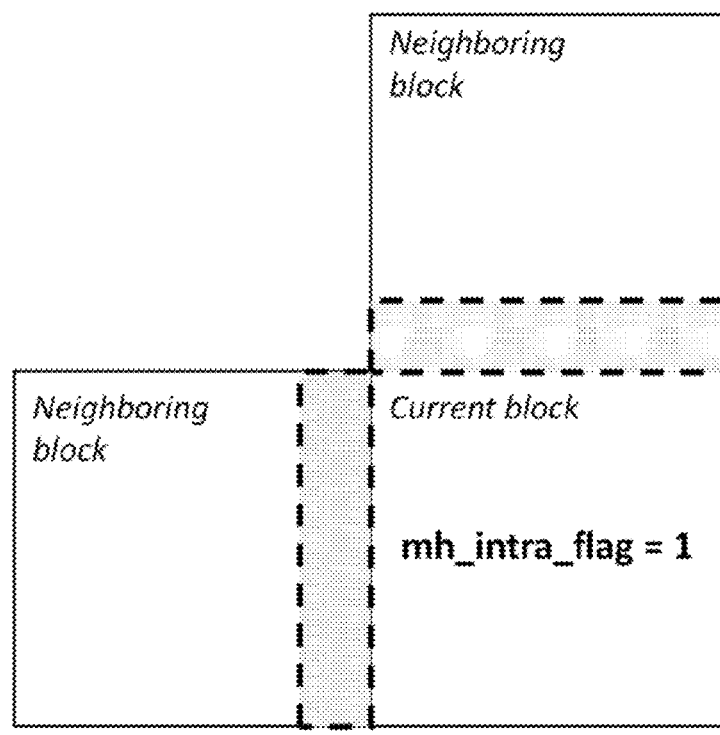
FIG. 34 is a diagram illustrating a method of making reference to a mode in a neighboring area according to an embodiment of the present disclosure.
FIG. 35 is a diagram illustrating a method of using a neighboring reference sample according to an embodiment of the present disclosure.

FIG. 34 is a diagram illustrating a method of making reference to a mode in a neighboring area according to an embodiment of the present disclosure. As described above, reference is made to a neighboring location in the process of generating a candidate list of multi-hypothesis prediction. In the embodiment of FIG. 30, if a neighboring location does not use multi-hypothesis prediction, candIntraPredModeX may be set to a predetermined mode. The reason for this is that sometimes the mode of the neighboring location is different from candIntraPredModeX when candIntraPredModeX is set. Therefore, according to an embodiment of the present disclosure, although the neighboring location does not use multi-hypothesis prediction, if a mode that the neighboring location uses is a mode used for the multi-hypothesis prediction, the encoder/decoder may set candIntraPredModeX to the mode that the neighboring location uses. In addition, the mode used for the multi-hypothesis prediction may be the planar mode, the DC mode, the vertical mode, and the horizontal mode.

Alternatively, although the neighboring location does not use the multi-hypothesis prediction, the mode that the neighboring location uses is a predetermined mode, the encoder/decoder may set candIntraPredModeX to the mode that the neighboring location uses. Alternatively, although the neighboring location does not use the multi-hypothesis prediction, the mode that the neighboring location uses is the vertical mode or the height mode, the encoder/decoder may set candIntraPredModeX to the mode that the neighboring location uses. Alternatively, in the case in which the neighboring location is located in the upper side of the current block, although the neighboring location does not use the multi-hypothesis prediction, and the mode that the neighboring location uses is the vertical mode, the encoder/decoder may set candIntraPredModeX to the mode that the neighboring location uses. Alternatively, in the case in which the neighboring location is on the left of the current block, although the neighboring location does not use the multi-hypothesis prediction, the mode that the neighboring location uses is the horizontal mode, thus the encoder/decoder may set candIntraPredModeX to the mode that the neighboring location uses.

Referring to FIG. 34, mh_intra_flag may be a syntax element (or a variable) indicating whether multi-hypothesis prediction is used (or has been used). In addition, an intra-prediction mode used by a neighboring block may be the horizontal mode. In addition, the current block may use multi-hypothesis prediction, and a candidate list may be generated using candIntraPredMode that is based on the mode of a neighboring block. Although multi-hypothesis prediction is not used in the neighboring area, an intra-prediction mode of the neighboring block is a predetermined mode, for example, the horizontal mode, the encoder/decoder may set candIntraPredMode to the horizontal mode.

Hereinafter, the example of the method of making reference to a mode in a neighboring area which has been described above will be described again, in combination with another embodiment of FIG. 30. According to an embodiment of the present disclosure, candIntraPredModeX (X is A or B) which is an intra-prediction mode of a neighboring block may be derived according to the following method.

1. A neighboring block availability check process calls an availability derive process for a designated block. The availability derive process sets a location (xCurr, yCurr) to (xCb, yCb), a neighbouring location (xNbY, yNbY) set equal to (xNbX, yNbX) as inputs, and an output is assigned to an available variable availableX.
2. A candidate intra-prediction mode candIntraPredModeX may be derived according to the following method.
A. If at least one of the following conditions is true, candIntraPredModeX may be set to INTRA_DC mode.
a) The variable availableX is false.
b) mh_intra_flag[xNbX][yNbX] is different from 1 and IntraPredModeY[xNbX][yNbX] is different from INTRA_ANGULAR50 and INTRA_ANGULAR18.
c) X is B, yCb−1 is less than ((yCb>>CtbLog2SizeY)<<CtbLog2SizeY)
B. Otherwise, if IntraPredModeY[xNbX][yNbX]>INTRA_ANGULAR34, candIntraPredModeX may be set to INTRA_ANGULAR50.
C. Otherwise, if IntraPredModeY[xNbX][yNbX]<=INTRA_ANGULAR34 and IntraPredModeY[xNbX][yNbX]>INTRA_DC, candIntraPredModeX may be set to INTRA_ANGULAR18.
D. Otherwise, candIntraPredModeX may be set to IntraPredModeY[xNbX][yNbX].

According to another embodiment of the present disclosure, candIntraPredModeX (X is A or B) which is an intra-prediction mode of a neighboring block may be derived according to the following method.

1. A neighboring block availability check process calls an availability derive process for a designated block. The availability derive process sets a location (xCurr, yCurr) to (xCb, yCb), a neighbouring location (xNbY, yNbY) set equal to (xNbX, yNbX) as inputs, and an output is assigned to an available variable availableX.
2. A candidate intra-prediction mode candIntraPredModeX may be derived according to the following method.
A. If at least one of the following conditions is true, candIntraPredModeX may be set to INTRA_DC mode.
a) The variable availableX is false.
b) mh_intra_flag[xNbX][yNbX] is different from 1 and IntraPredModeY[xNbX][yNbX] is different from INTRA_PLANAR, INTRA_DC, INTRA_ANGULAR50, and INTRA_ANGULAR18.
c) X is B, yCb−1 is less than ((yCb>>CtbLog2SizeY)<<CtbLog2SizeY).
B. Otherwise, if IntraPredModeY[xNbX][yNbX]>INTRA_ANGULAR34, candIntraPredModeX may be set to INTRA_ANGULAR50.
C. Otherwise, if IntraPredModeY[xNbX][yNbX]<=INTRA_ANGULAR34 and IntraPredModeY[xNbX][yNbX]>INTRA_DC, candIntraPredModeX may be set to INTRA_ANGULAR18.
D. Otherwise, candIntraPredModeX may be set to IntraPredModeY[xNbX][yNbX].

As described above, in the above-described list configuring method, candIntraPredModeX may be determined according to the method of making reference to a neighboring mode.

FIG. 35 is a diagram illustrating a method of using a neighboring reference sample according to an embodiment of the present disclosure. As described above, if multi-hypothesis prediction is used, intra-prediction may be used in combination with another prediction. Therefore, if multi-hypothesis prediction is used, an intra-prediction may be generated using a neighboring sample of the current block as a reference sample. According to an embodiment of the present disclosure, a mode that uses a reconstruction sample may be used when multi-hypothesis prediction is used. In addition, a mode that uses a reconstruction sample may not be used when multi-hypothesis prediction is not used. The reconstruction sample may be a reconstruction sample adjacent to the current block.

As an example of the mode that uses the reconstruction sample, a template matching method may be used. That is, reconstruction samples in a predetermined location based on a predetermined block may be defined as a template (or template area). Template matching may be an operation that compares costs between the template of the current block and templates of blocks to be compared with, and finds a block that requires a low cost. In this instance, the costs may be defined as the sum of absolute value of the template, the sum of squares of a difference, or the like. For example, an encoder/decoder may search for a block that is expected to be similar to the current block by performing template matching between the current block and blocks in a reference picture, and may configure or refine a motion vector based thereon. In addition, examples of a mode that uses the reconstruction sample may include motion vector refinement and motion compensation which may use a reconstruction sample.

In order to use the reconstruction sample adjacent to the current block, the process of decoding the current block needs to wait until decoding of a neighboring block is complete. In this instance, there may be a difficulty in processing the current block and a neighboring block in parallel. Therefore, if multi-hypothesis prediction is not used, the encoder/decoder may not use a mode that uses a reconstruction sample adjacent to the current block in order to enable parallel processing. Alternatively, if multi-hypothesis prediction is used, an intra-prediction may be generated using a reconstruction sample adjacent to the current block, and thus, the encoder/decoder may use another mode that uses a reconstruction sample adjacent to the current block.

In addition, according to an embodiment of the present disclosure, although multi-hypothesis prediction is used, whether a reconstruction sample adjacent to the current block is available may differ depending on a candidate index. According to an embodiment, if the candidate index is less than a predetermined threshold set in advance, a reconstruction sample adjacent to the current block may be available. If the candidate index is low, the number of candidate index signaling bits may be low, and the accuracy of a candidate may be high, and accuracy may be increased by using the reconstruction sample for the candidate with a high coding efficiency. According to another embodiment, if the candidate index is greater than a predetermined threshold, a reconstruction sample adjacent to the current block may be available. If the candidate index is high, the number of candidate index signaling bits may be high and the accuracy of a candidate may be low, and the reconstruction sample adjacent to the current block may be used for the candidate with a low accuracy, so as to enhance the accuracy.

According to an embodiment of the present disclosure, if multi-hypothesis prediction is used, the encoder/decoder may generate an inter-prediction using a reconstruction sample adjacent to the current block, and may generate a prediction block by combining the inter-prediction and an intra-prediction of multi-hypothesis prediction. Referring to FIG. 35, the value of mh_intra_flag which is a signaling indicating whether the current block uses multi-hypothesis prediction is 1. The current block uses multi-hypothesis prediction, and thus, a mode that uses reconstruction samples adjacent to the current block may be used.

Figures 36, 37:
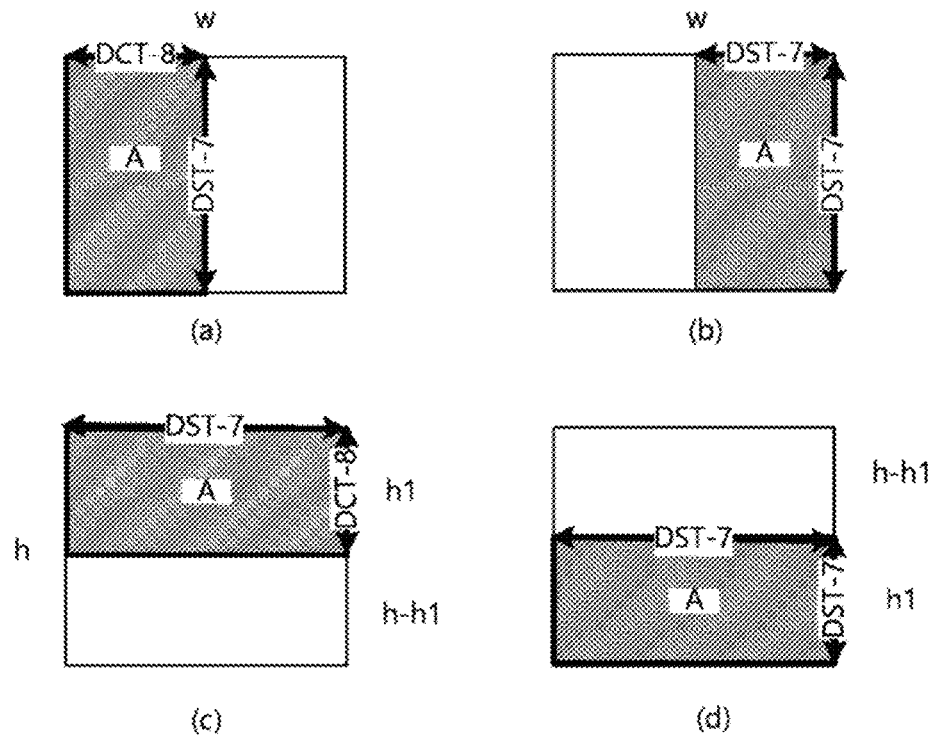
FIG. 36 is diagram illustrating examples of a transform mode according to an embodiment of the present disclosure.
FIG. 37 is a diagram illustrating a relationship of chroma components according to an embodiment of the present disclosure.

FIG. 36 is a diagram illustrating examples of a transform mode according to an embodiment of the present disclosure. According to an embodiment of the present disclosure, a transform mode that performs transform with respect to only a sub-part of a block may be present. In the specification, as described above, a transform mode that applies transform only to a sub-part may be referred to as a sub-block transform (SBT), spatially varying transform (SVT), or the like. For example, a CU or a PU may be divided into multiple TUs, and some of the multiple TUs may be transformed. Alternatively, for example, one of the multiple TUs may be transformed. A TU that is not transformed among the multiple TUs may be configured to have a residual of 0.

Referring to FIG. 36, SBT-vertical (SBT-V) and SBT-horizontal (SBT-H) may be the types of division of a single CU or PU into multiple TUs. According to SBT-V, the heights of the multiple TUs are the same as the height of CU or PU, and the widths of the multiple TUs are different from the width of CU or PU. According to SBT-H, the heights of the multiple TUs are different from the height of CU or PU, and the widths of the multiple TUs are the same as the width of CU or PU. According to an embodiment, the width and the location of a TU transformed according to SBT-V may be signaled. In addition, the height and the location of a TU transformed according to SBT-H may be signaled. According to an embodiment, a transform kernel associated with an SBT type, a location, a width, or a height may be predetermined.

As described above, the mode that transforms a part of a CU or PU may be present because it is possible that a residual after prediction is mainly present in a part of a CU or PU. That is, the SBT may be the same concept as a skip mode for a TU. In this instance, the existing skip mode may be a skip mode for a CU.

Referring to FIG. 36, a location that is to be transformed and is marked with A may be defined for each type, that is, SBT-V(36(a), 36(b)), SBT-H(36(c), 36(d)). The width or the height may be defined to be ½ or ¼ of the width of a CU or the height of a CU. In addition, a part different from the area marked with A may be regarded to have a residual of 0. In addition, a condition for using SBT may be defined. For example, conditions for using SBT may be signaled in association with a condition related to a block size, information associated with availability in a syntax of a high level (e.g., a sequence, slice, tile, and the like).

According to an embodiment of the present disclosure, there may be an association between multi-hypothesis prediction and a transform mode. For example, depending on which one of them is used, whether the other one is to be used may be determined. Alternatively, depending on the mode of any one of them, whether the mode of the other is to be used may be determined. In addition, depending on which one of them is used, whether the mode of the other is to be used may be determined. According to an embodiment, the transform mode may be SBT of FIG. 36. That is, depending on whether multi-hypothesis prediction is used, whether SBT is to be used may be determined. Alternatively, depending on whether SBT is used, whether multi-hypothesis prediction is to be used may be determined. Table 6 is a syntax structure which shows the relationship between multi-hypothesis prediction and a transform mode according to an embodiment of the present disclosure.

TABLE 6

| | Descriptor |
|---|---|
| coding unit( x0, y0, cbWidth, cbHeight, treeType ) { <br> ... <br>   if( CuPredMode[ x0 ][ y0 ] != MODE_INTRA && cu_skip_flag[ x0 ][ y0 ] == 0 ) <br>     cu_cbf <br>   if( cu_cbf) { <br>     if( CuPredMode[ x0 ][ y0 ] != MODE_INTRA && sps_sbt_enable_flag ) { <br>       if( sbtBlockConditions ) { <br>         if( !mh_intra_flag[ x0 ][ y0 ] ) <br>           cu_sbt_flag[ x0 ][ y0 ] <br>       } <br>       if( cu_sbt_flag[ x0 ][ y0 ] ) { <br>         // sbt syntax <br>       } <br>     } <br>     transform_tree( x0, y0, cbWidth, cbHeight, treeType ) <br>   } <br> } | <br><br>ae(v)<br><br><br><br><br>ae(v) |

Referring to Table 6, depending on whether multi-hypothesis prediction is used, whether SBT is to be used may be determined. That is, if multi-hypothesis prediction is not applied to the current block (if !mh_intra_flag is true), a decoder may parse cu_sbt_flag which is a syntax element indicating whether to apply STB. If multi-hypothesis prediction is not applied to the current block, cu_sbt_flag may not be parsed. In this instance, it is inferred that cu_sbt_flag has a value of 0 according to a condition defined in advance.

As described above, in the case of SBT, if a residual after prediction of a block that is being processed is present in a part of the block, compression performance refinement may follow. In the case of multi-hypothesis prediction, the movement of an object may be effectively reflected via inter-prediction, and in parallel, prediction of the remaining area may be efficiently performed via intra-prediction, and thus, the performance of prediction of the entire block may be expected to be improved. That is, if multi-hypothesis prediction is applied, the performance of prediction of the entire block may be improved and thus, the phenomenon in which a residual is concentrated in a part of the block may less frequently occur. Therefore, according to an embodiment of the present disclosure, the encoder/decoder may not apply SBT if multi-hypothesis prediction is applied. Alternatively, if SBT is applied, the encoder/decoder may not apply multi-hypothesis prediction.

According to an embodiment of the present disclosure, depending on the use of multi-hypothesis prediction or a mode of the multi-hypothesis prediction, the location of a TU transformed according to SBT may be restricted. Alternatively, depending on the use of multi-hypothesis prediction or a mode of the multi-hypothesis prediction, the width (SBT-V) or the height (SBT-H) of a TU transformed according to SBT may be restricted. Through the above, a signaling associated with a width or a height may be decreased. For example, the location of a TU transformed according to SBT may be different from an area where a weight for intra-prediction of multi-hypothesis prediction is high. A residual in the area where a weight is high may be reduced by multi-hypothesis prediction.

Therefore, if multi-hypothesis prediction is used, a mode that transforms a part where a weight is high may not be present in SBT. For example, if the horizontal mode or the vertical mode is used in multi-hypothesis prediction, the SBT type of FIGS. 36(b) and 36(d) may be omitted (i.e., may not be taken into consideration). According to another embodiment, if the planar mode is used in the multi-hypothesis prediction, the location of a TU transformed according to SBT may be restricted. For example, if the planar mode is used in the multi-hypothesis prediction, the SBT type of FIGS. 36(a) and 36(c) may be omitted. If the planar mode is used in the multi-hypothesis prediction, an area adjacent to a reference sample of intra-prediction may have a value similar to the value of the reference sample. Accordingly, the area adjacent to the reference sample may have a relatively low residual.

According to another embodiment, if multi-hypothesis prediction is used, the width or height of a TU transformed according to available SBT may differ. Alternatively, if a predetermined mode is used in the multi-hypothesis prediction, the width or height of a TU transformed according to available SBT may differ. For example, in the case in which multi-hypothesis prediction is used, a residual may not remain in a wide part of a block and thus, if the width value or the height value of a TU transformed according to SBT has a high value, the width value or the height value of the TU may be excluded. Alternatively, in the case in which multi-hypothesis prediction is used, if the width value or the height value of a TU transformed according to SBT is the same as a unit based on which a weight is changed in the multi-hypothesis prediction, the width value or height value of the TU may be excluded.

Referring to Table 6, cu_sbt_flag indicating whether SBT is used and mh_intra_flag indicating whether multi-hypothesis prediction is used may be present. If mh_intra_flag is 0, cu_sbt_flag may be parsed. In addition, if cu_sbt_flag is not present, it is inferred to be 0. Both the combination with an intra-prediction in multi-hypothesis prediction and SBT are to solve a problem of a large amount of residuals remaining in only a part of a CU or PU when the corresponding technology is not used. Therefore, two technologies may be associated with each other, and thus, whether one of the technologies is to be used, whether a predetermined mode of one technology is to be used, and the like may be determined based on information associated with the other technology.

In addition, sbtBlockConditions in Table 6 may be conditions for SBT. The conditions for SBT may include a condition related to a block size, a signaling value indicating availability in a high level (e.g., a sequence, slice, tile, and the like), and the like.

FIG. 37 is a diagram illustrating relationship of chroma components according to an embodiment of the present disclosure. Referring to FIG. 37, a color format may be expressed using chroma_format_idc, chroma format, separate_colour_plane_flag, and the like. In the case of monochrome, only one sample array may be present. In addition, both SubWidthC and SubHeightC may be 1. In the case of 4:2:0 sampling, two chroma arrays (or chroma components or chroma blocks) may be present. In addition, the chroma array may have a width corresponding to a half of a luma array (or a luma component, or a luma block), and may have a height corresponding to a half of the luma array. In addition, both SubWidthC and SubHeightC may be 2. SubWidthC and SubHeightC may show the size of the chroma array when compared to the luma array. If the width or height of the chroma array is a half of the luma array, SubWidthC or SubHeightC may be 2. If the width or the height of the chroma array is the same as the luma array, SubWidthC or SubHeightC may be 1.

In the case of 4:2:2 sampling, two chroma arrays may be present. In addition, the chroma array may have a half width or the same width of that of the luma array. SubWidthC and SubHeightC may be 2 and 1, respectively. In the case of 4:4:4 sampling, the chroma array may have the same width and the same height as the luma array. Both SubWidthC and SubHeightC may be 1. In this instance, the processing may be differently performed based on separate_colour_plane_flag. If separate_colour_plane_flag is 0, the chroma array may have the same width and the same height as those of the luma array. If separate_colour_plane_flag is 1, three color planes (luma, Cb, Cr) may be processed respectively. Irrespective of separate_colour_plane_flag, both SubWidthC and SubHeightC may be 1 in the case of 4:4:4.

Figure 38:
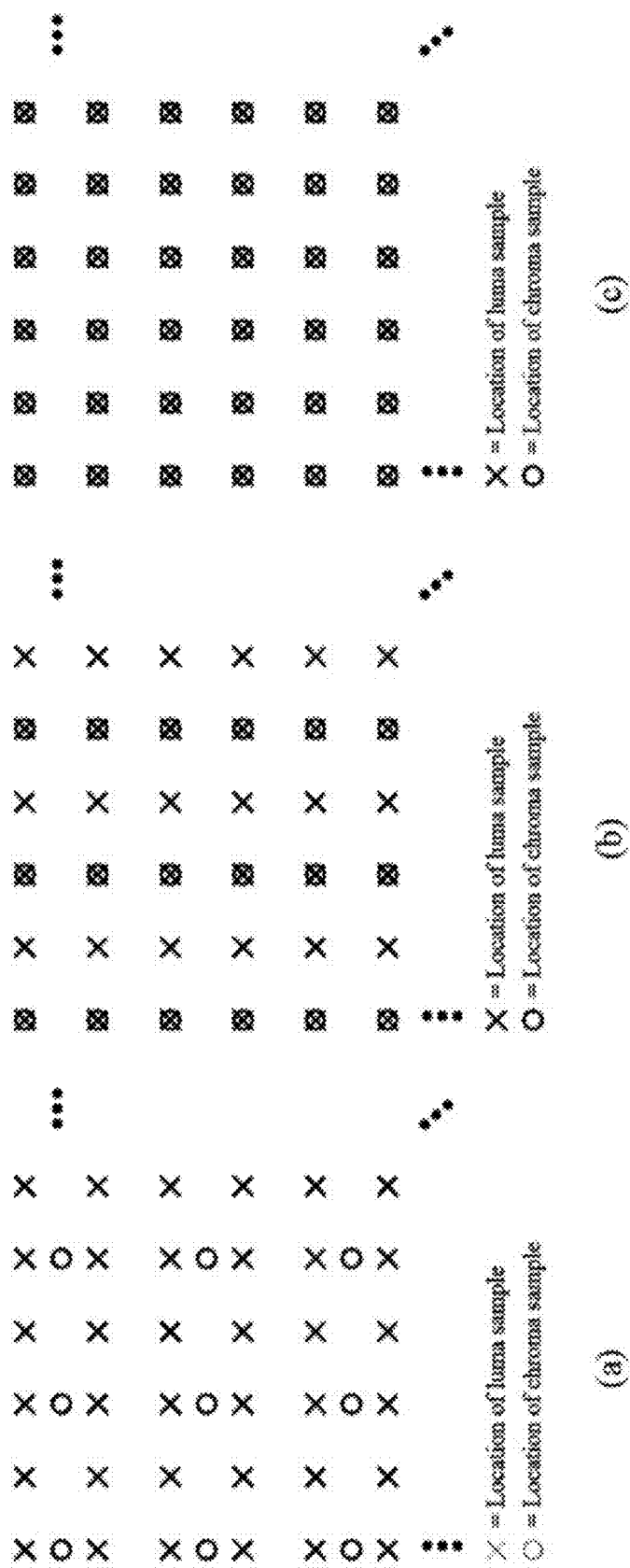
FIG. 38 is diagram illustrating examples of a relationship of color components according to an embodiment of the present disclosure.

If separate_colour_plane_flag is 1, an array corresponding to only one color component may be present in a single slice. If separate_colour_plane_flag is 0, an array corresponding to multiple color components may be present in a single slice. Referring to FIG. 38, only in the case of 4:2:2, SubWidthC and SubHeightC are different from each other. Therefore, in the case of 4:2:2, the relationship of a luma-based width to a luma-based height may be different from the relationship of a chroma-based width to a chroma-based height.

For example, in the case in which a luma sample-based width is widthL and a chroma sample-based width is widthC, if widthL corresponds to widthC, the relationship thereof may be as shown in Equation 6 below.

$$widthC = widthL/SubWidthC \quad \text{[Equation 6]}$$

i.e., $widthL = widthC * SubWidthC$

In addition, in the case in which a luma sample-based height is heightL and a chroma sample-based height is heightC, if heightL corresponds to heightC, the relationship thereof may be as shown in Equation 7 below.

$$heightC = heightL/SubHeightC \quad \text{[Equation 7]}$$

i.e., $heightL = heightC * SubHeightC$

In addition, a value indicating (representing) a color component may be present. For example, cIdx may indicate a color component. For example, cIdx may be a color component index. If cIdx is 0, this may indicate a luma component. If cIdx is different from 0, this may indicate a color component. In addition, if cIdx is 1, this may indicate a chroma Cb component. In addition, if cIdx is 2, this may indicate a chroma Cr component.

FIG. 38 is diagram illustrating examples of a relationship of color components according to an embodiment of the present disclosure. FIGS. 38(a), 38(b), 38(c) assume 4:2:0, 4:2:2, and 4:4:4, respectively. Referring to FIG. 38(a), one chroma sample (one Cb and one Cr) may be disposed per two luma samples in the horizontal direction. In addition, one chroma sample (one Cb and one Cr) may be disposed per two luma samples in the vertical direction. Referring to FIG. 38(b), one chroma sample (one Cb and one Cr) may be disposed per two luma samples in the horizontal direction. In addition, one chroma sample (one Cb and one Cr) may be disposed per luma sample in the vertical direction. Referring to FIG. 38(c), one chroma sample (one Cb and one Cr) may be disposed per luma sample in the horizontal direction. In addition, one chroma sample (one Cb and one Cr) may be disposed per luma sample in the vertical direction.

As described above, SubWidthC and SubHeightC which have been described in FIG. 37 may be determined based on the above-mentioned relationship. Based on SubWidthC and SubHeightC, transform between a luma sample reference and a chroma sample reference may be performed.

Figures 39, 40:
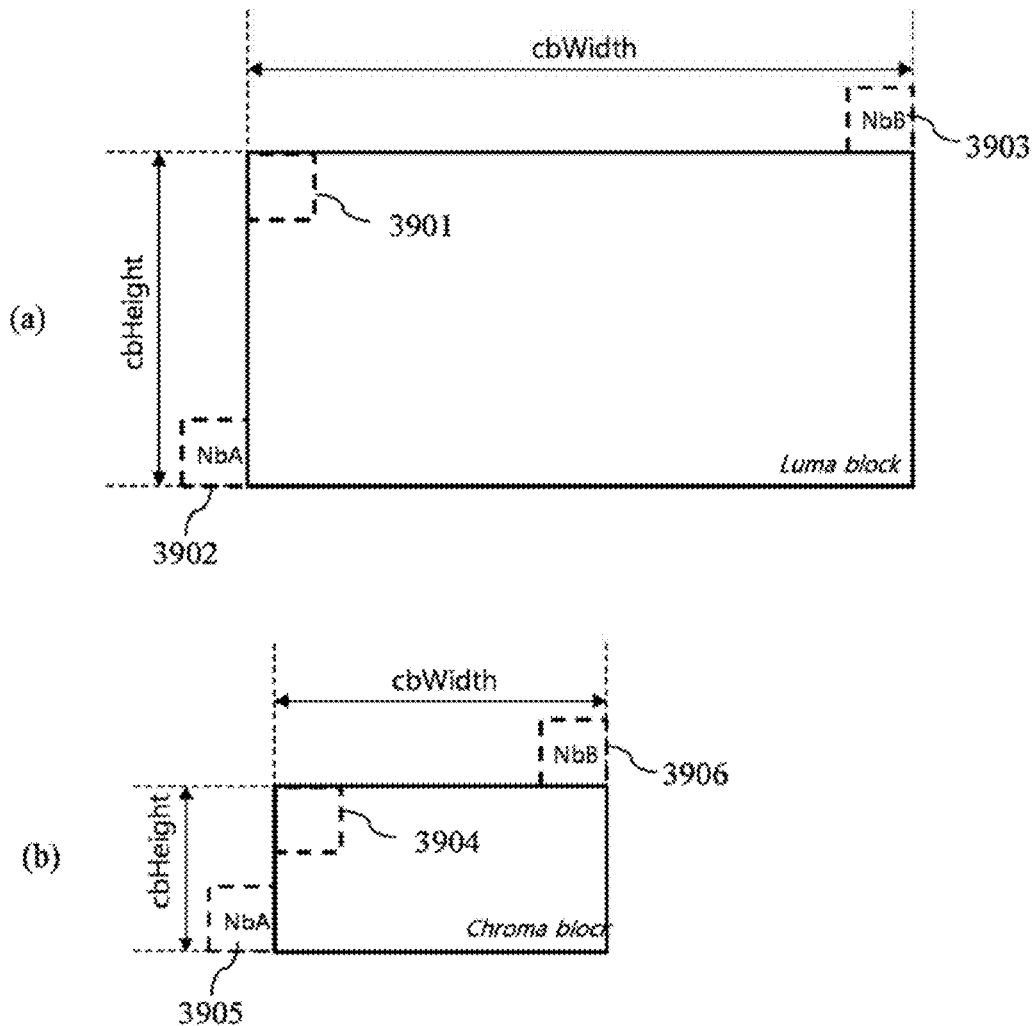
FIG. 39 is diagram illustrating examples of a neighboring reference location according to an embodiment of the present disclosure.
FIG. 40 is a diagram illustrating a weighted-sample prediction process according to an embodiment of the present disclosure.

FIG. 39 is diagram illustrating examples of a neighboring reference location according to an embodiment of the present disclosure. An encoder/decoder according to an embodiment of the present disclosure may make reference to a neighboring location when performing prediction. For example, as described above, the encoder/decoder may make reference to a neighboring location when performing combined inter-picture merge and intra-picture prediction (CIIP). CIIP may be the above-described multi-hypothesis prediction. That is, CIIP may be a prediction method that combines inter-prediction (e.g., a merge-mode inter-prediction) and intra-prediction. According to an embodiment of the present disclosure, the encoder/decoder may combine inter-prediction and intra-prediction by making reference to a neighboring location. For example, the encoder/decoder may determine the ratio of an inter-prediction to an intra-prediction by making reference to a neighboring location. Alternatively, the encoder/decoder may determine a weight (weighting) when combining inter-prediction and intra-prediction by making reference to a neighboring location. Alternatively, the encoder/decoder may determine a weight when performing a weighted sum (or a weighted average) of inter-prediction and intra-prediction by making reference to a neighboring location.

According to an embodiment of the present disclosure, the neighboring location to which reference is made may include NbA and NbB. The coordinates of NbA and NbB may be (xNbA, yNbA) and (xNbB, yNbB), respectively. In addition, NbA may be a location on the left of a current block. Particularly, if the coordinates of the top-left of the current block are (xCb, yCb), and the width and the height of the current block are cbWidth and cbHeight, respectively, NbA may be (xCb−1, yCb+cbHeight−1). The coordinates (xCb, yCb) of the top-left of the current block is the value based on a luma sample. Alternatively, coordinates (xCb, yCb) of the top-left of the current block correspond to the location of a top-left luma sample of a current luma coding block associated with a top-left luma sample of a current picture. In addition, cbWidth and cbHeight may denote a width and a height based on a corresponding color component. The above-described coordinates may be associated with a luma component (or a luma block). For example, cbWidth and cbHeight may denote a width and a height based on a luma component.

In addition, NbB may be a location on the top of the current block. Particularly, the coordinates of the top-left of the current block are (xCb, yCb), and the width and the height of the current block are cbWidth and cbHeight, respectively, NbB may be (xCb+cbWidth−1, yCb−1). The top-left coordinates (xCb, yCb) of the current block may be the value based on a luma sample. Alternatively, the coordinates (xCb, yCb) of the top-left of the current block correspond to the location of a top-left luma sample of a current luma coding block associated with a top-left luma sample of the current picture. In addition, cbWidth and cbHeight may be values based on a corresponding color component. The above-described coordinates may be associated with a luma component (luma block). For example, cbWidth and cbHeight may be values based on a luma component.

Referring to FIG. 39, the coordinates of the top-left of a luma block, the coordinates of NbA, the coordinates of NbB, and the like are illustrated. In addition, NbA may be a location on the left of the current block. Particularly, the top-left coordinates of the current block are (xCb, yCb), and the width and the height of the current block are chWidth and cbHeight, respectively, NbA may be (xCb−1, yCb+2*cbHeight−1). The top-left coordinates (xCb, yCb) of the current block may be the value based on a luma sample. Alternatively, the top-left coordinates (xCb, yCb) of the current block may be the location of a top-left luma sample of a current luma coding block associated with a top-left luma sample of the current picture. In addition, cbWidth and cbHeight may be values based on a corresponding color component. The above-described coordinates may be associated with a chroma component (chroma block). For example, cbWidth and cbHeight may be values based on a chroma component. In addition, the coordinates may correspond to the case of 4:2:0 format.

In addition, NbB may be a location on the top of the current block. Particularly, if the top-left coordinates of the current block are (xCb, yCb), and the width and the height of the current block are chWidth and cbHeight, respectively, NbB may be (xCb+2*cbWidth−1, yCb−1). The top-left coordinates (xCb, yCb) of the current block may be the value based on a luma sample. Alternatively, the top-left coordinates (xCb, yCb) of the current block may be the location of top-left luma sample of a current luma coding block associated with a top-left luma sample of the current picture. In addition, cbWidth and cbHeight may be values based on a corresponding color component. The above-described coordinates may be associated with a chroma component. For example, cbWidth and cbHeight may be values based on a chroma component. In addition, the coordinates may correspond to the case of 4:2:0 format or 4:2:2 format. Referring to FIG. 39, the top-left coordinates of a chroma block, the coordinates of NbA, the coordinates of NbB, and the like are illustrated.

Figures 44, 45:
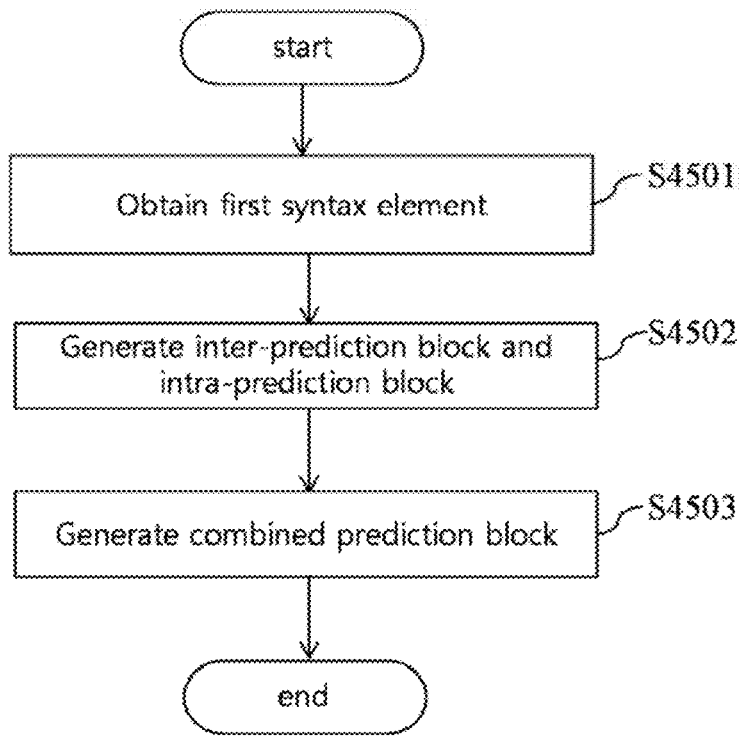
FIG. 44 is a diagram illustrating a weighted-sample prediction process according to an embodiment of the present disclosure.
FIG. 45 is a diagram illustrating a video signal processing method based on multi-hypothesis prediction according to an embodiment according of the present disclosure.

FIG. 40 is a diagram illustrating a weighted-sample prediction process according to an embodiment of the present disclosure. According to an embodiment of FIG. 40, a method of combining two or more prediction signals will be described. In addition, the embodiment of FIG. 40 may be applied to the case in which CIIP is used. In addition, the embodiment of FIG. 40 may include the method of making reference to a neighboring location which has been described in FIG. 39. Referring to FIG. 44, scallFact which is a variable indicating a scaling factor may be described as shown in Equation 8 below.

$$scallFact = (cIdx == 0)?0:1 \qquad \text{[Equation 8]}$$

In equation 8, if cIdx is 0, the encoder/decoder may set scallFact to 0. If cIdx is not 0, the encoder/decoder may set scallFact to 1. According to an embodiment of the present disclosure, if x is true or x is different from 0, x?y:z denotes a y value. Otherwise (i.e., x is false (or x is 0)), x?y:z denotes a z value.

In addition, the encoder/decoder may set (xNbA, yNbA) and (xNbB, yNbB) which are the coordinates of neighboring locations NbA and NbB to which reference is made for multi-hypothesis prediction. According to the embodiment described in FIG. 39, (xNbA, yNbA) and (xNbB, yNbB) for a luma component may be set to (xCb−1, yCb+cbHeight−1) and (xCb+cbWidth−1, yCb−1), respectively. (xNbA, yNbA) and (xNbB, yNbB) for a chroma component may be set to (xCb−1, yCb+2*cbHeight−1), (xCb+2*cbWidth−1, yCb−1), respectively. An operation of multiplying by 2^n may be the same as an operation of doing a left shift of n bits. For example, an operation of multiplying by 2 may be calculated to be the same as a value obtained by doing a left shift of one bit. In addition, performing a left shift of n bits with respect to x may be expressed as "x<<n". An operation of dividing by 2^n may be the same as an operation of doing a right shift of n bits. An operation of dividing by 2^n and rounding down to the nearest whole number may be calculated to be the same as a value obtained by doing a right shift of n bits. For example, an operation of dividing by 2 may be calculated to be the same as a value obtained by doing a right shift of one bit. In addition, performing a right shift of n bits with respect to x may be expressed as "x>>n". Therefore, (xCb−1, yCb+2*cbHeight−1) and (xCb+2*cbWidth−1, yCb−1) may be expressed as (xCb−1, yCb+(cbHeight<<1)−1) and (xCb+(cbWidth<<1)−1, yCb−1). Therefore, if the above-described coordinates associated with the luma component and the coordinates associated with the chroma component are expressed together, they may be as shown in Equation 9 below.

$$(xNbA, yNbA) = (xCb - 1, yCb + (cbHeight \ll scallFact) - 1) \qquad \text{[Equation 9]}$$

$$(xNbB, yNbB) = (xCb + (cbWidth \ll scallFact) - 1, yCb - 1)$$

In Equation 9, scallFact may be determined to be (cIdx==0)? 0:1, as described above. In this instance, cbWidth and cbHeight may be a width and a height based on each color component. In the case in which a width and a height based on a luma component are chWidthL and cbHeightL, if a weighted sample prediction process is performed with respect to the luma component, cbWidth and cbHeight may be cbWidthL and cbHeightL, respectively. In the case in which a width and a height based on a luma component are chWidthL and cbHeightL, if a weighted sample prediction process is performed with respect to a chroma component, cbWidth and cbHeight may be cbWidthL/SubWidthC and cbHeightL/SubHeightC, respectively.

In addition, according to an embodiment, the encoder/decoder may determine the prediction mode of a corresponding location by making reference to a neighboring location. For example, the encoder/decoder may determine whether the prediction mode is intra-prediction. In addition, the prediction mode may be indicated by CuPredMode. If CuPredMode is MODE_INTRA, this indicates that intra-prediction is used. In addition, the value of CuPredMode may be MODE_INTRA, MODE_INTER, MODE_IBC, or MODE_PLT. If CuPredMode is MODE_INTER, this indicates that inter-prediction is used. In addition, if CuPredMode is MODE_IBC, this indicates that an intra-block copy (IBC) is used. In addition, if CuPredMode is MODE_PLT, this may indicate that a palette mode is used. In addition, CuPredMode may be expressed depending on a channel type (chType), and a location. For example, that may be expressed as CuPredMode[chType][x][y], and the value thereof may be the value of CuPredMode associated with a channel type chType at a location (x, y).

In addition, according to an embodiment of the present disclosure, chType may be based on a tree type. For example, a tree type may be set to the value of SINGLE_TREE, DUAL_TREE_LUMA, DUAL_TREE_CHROMA, or the like. In the case of SINGLE_TREE, a luma component and a chroma component may share a part of block partitioning. For example, in the case of SINGLE_TREE, a luma component and a chroma component may have an identical block partitioning. Alternatively, in the case of SINGLE_TREE, a luma component and a chroma component may have an identical or partially identical block partitioning. Alternatively, in the case of SINGLE_TREE, block partitioning of a luma component and block partitioning of a chroma component may be performed by the same syntax element value.

In addition, according to an embodiment of the present disclosure, in the case of DUAL TREE, block partitioning of a luma component and block partitioning of a chroma component may be independent from each other. Alternatively, in the case of DUAL TREE, block partitioning of a luma component and block partitioning of a chroma component may be performed by different syntax element values. In addition, in the case of DUAL TREE, a tree type value may be DUAL_TREE_LUMA or DUAL_TREE_CHROMA. If the tree type is DUAL_TREE_LUMA, this indicates that DUAL TREE is used and it is a process associated with a luma component. If the tree type is DUAL_TREE_CHROMA, this indicates that DUAL TREE is used and it is a process associated with a chroma component. In addition, chType may be determined whether a tree type is DUAL_TREE_CHROMA. For example, chType may be set to 1 if a tree type is DUAL_TREE_CHROMA, and may be set to 0 if a tree type is different from DUAL_TREE_CHROMA. Therefore, referring to FIG. 40, the value of CuPredMode[0][xNbX][yNbY] may be determined. X may be replaced with A and B. That is, the value of CuPredMode associated with NbA and NbB locations may be determined.

In addition, according to an embodiment of the present disclosure, the value of isIntraCodedNeighbourX may be set based on the determination of the prediction mode of the neighboring location. For example, depending on whether CuPredMode associated with the neighboring location is MODE_INTRA, the value of isIntraCodedNeighbourX may be set. If CuPredMode associated with the neighboring location is MODE_INTRA, the value of isIntraCodedNeighbourX may be set to TRUE. If CuPredMode associated with the neighboring location is not MODE_INTRA, the value of isIntraCodedNeighbourX may be set to FALSE. X may be replaced with A, B, or the like in the present disclosure which has been described above, and is to be described below. X may refer to something that corresponds to location X.

In addition, according to an embodiment of the present disclosure, whether a corresponding location is available may be determined by making reference to a neighboring location. Whether the corresponding location is available may be set based on availableX. In addition, isIntraCodedNeighbourX may be set based on availableX. For example, if availableX is TRUE, isIntraCodedNeighbourX may be set to TRUE. For example, if availableX is FALSE, isIntraCodedNeighbourX may be set to FALSE. Referring to FIG. 40, whether the corresponding location is available may be determined by calling "the derivation process for neighbouring block availability". In addition, whether the corresponding location is available may be determined based on whether the corresponding location falls within a current picture. In the case in which the corresponding location is (xNbY, yNbY), if xNbY or yNbY is less than 0, the corresponding location is beyond the current picture, and availableX may be set to FALSE. In addition, if xNbY is greater than or equal to a picture width, the corresponding location is beyond the current picture and availableX may be set to FALSE. The picture width may be indicated by pic_width_in_luma_samples. In addition, if yNbY is greater than or equal to a picture height, the corresponding location is beyond the current picture and availableX may be set to FALSE. The picture height may be indicated by pic_height_in_luma_samples. In addition, if the corresponding location is present in a different block or a different slice which is different from the current block, availableX may be set to FALSE. In addition, if reconstruction of the corresponding location is incomplete, availableX may be set to FALSE. Whether reconstruction is complete may be indicated by IsAvailable[cIdx][xNbY][yNbY]. Therefore, if one of the following conditions is satisfied, availableX may be set to FALSE. Otherwise (if none of the following conditions are satisfied), availableX may be set to TRUE.

Condition 1: xNbY<0
Condition 2: yNbY<0
Condition 3: xNbY>=pic_width_in_luma_samples
Condition 4: yNbY>=pic_height_in_luma_samples
Condition 5: IsAvailable[cIdx][xNbY][yNbY]==FALSE
Condition 6: The corresponding location (the neighboring location or the location of (xNbY, yNbY)) belongs to a different block (or different slice) which is different from the current block.

In addition, according to an embodiment of the present disclosure, by determining whether the current location and the corresponding location have the same CuPredMode according to an option, availableX may be set. By combining the two above-described conditions, isIntraCodedNeighbourX may be set. For example, all of the following conditions are satisfied, isIntraCodedNeighbourX may be set to TRUE. Otherwise (if at least one of the conditions is not satisfied), isIntraCodedNeighbourX may be set to FALSE.

Condition 1: availableX==TRUE
Condition 2: CuPredMode[0][xNbX][yNbX]==MODE_INTRA In addition, according to an embodiment of the present disclosure, a weight for CIIP may be determined based on a plurality of isIntraCodedNeighbourXs. For example, a weight to be used when inter-prediction and intra-prediction are combined may be determined based on the plurality of isIntraCodedNeighbourXs. For example, those may be determined based on isIntraCodedNeighbourA and isIntraCodedNeighbourB. According to an embodiment, if both isIntraCodedNeighbourA and isIntraCodedNeighbourB are TRUE, w may be set to 3. For example, w may be a weight for CIIP or may be a value for determining a weight. In addition, if both isIntraCodedNeighbourA and isIntraCodedNeighbourB are FALSE, w may be set to 1. In addition, if one of isIntraCodedNeighbourA and isIntraCodedNeighbourB is FALSE (if one of them is TRUE), w may be set to 2. That is, based on whether a neighboring location is predicted according to intra-prediction or how many neighboring locations are predicted according to intra-prediction, w may be set.

In addition, according to an embodiment of the present disclosure, w may be a weight for intra-prediction. In addition, a weight corresponding to inter-prediction may be determined based on w. For example, a weight corresponding to inter-prediction may be (4−w). When combining two or more prediction signals, an encoder/decoder may use Equation 10 below.

$$predSampleComb[x][y] = (w * predSamplesIntra[x][y] + \quad \text{[Equation 10]}$$
$$(4 - w) * predSamplesInter[x][y] + 2) \gg 2$$

In Equation 10, predSamplesIntra and predSamplesInter may be prediction signals. For example, predSamplesIntra and predSamplesInter may be a prediction signal predicted according to intra-prediction and a prediction signal predicted according to inter-prediction (e.g., a merge mode, more particularly a regular merge mode), respectively. In addition, predSampleComb may be a prediction signal used for CIIP.

In addition, according to an embodiment, a process of updating a prediction signal which is to be combined may be included in advance of applying Equation 10. For example, Equation 11 below may be applied to the updating process. For example, the process of updating a prediction signal may be a process of updating an inter-prediction signal for CIIP.

$$idxY = predSamplesInter[x][y] \gg Log2(OrgCW) \quad \text{[Equation 11]}$$
$$predSamplesInter[x][y] = Clip1Y(LmcsPivot[idxY] + (ScaleCoeff[idxY] *$$
$$(predSamplesInter[x][y] - InputPivot[idxY]) + (1 \ll 10)) \gg 11)$$

FIG. 41 is a diagram illustrating a neighboring reference location according to an embodiment of the present disclosure.

A neighboring reference location has been described with reference to FIGS. 39 and 40. If the described location is used for all cases (e.g., all chroma blocks), a problem may happen, and the problem is described with reference to FIG. 41. The embodiment of FIG. 41 illustrates a chroma block. In FIGS. 39 and 40, the coordinates of NbA and NbB, expressed based on a luma sample for a chroma block, were (xCb−1, yCb+2*cbHeight−1), (xCb+2*cbWidth−1, yCb−1), respectively. If SubWidthC or SubHeightC is 1, this may indicate a location illustrated in FIG. 41, which is different from the location illustrated in FIG. 39. cbWidth and cbHeight are expressed based on each color component (saturation component in this example), and the coordinates are expressed based on luma. Accordingly, multiplying cbWidth and cbHeight by 2 in the above coordinates may be for compensation associated with the number of chroma samples per luma sample in the case of 4:2:0. That is, this may be used for representing, based on luminance, the coordinates of the case in which the number of chroma samples corresponding to two luma samples based on the x-axis is one and the number of chroma samples corresponding to two luma samples based on the y-axis is one. Therefore, if SubWidthC or SubHeightC is 1, this may indicate a different location. Accordingly, if the location of (xCb−1, yCb+2*cbHeight−1) and (xCb+2*cbWidth−1, yCb−1) is always used with respect to a chroma block, reference may be made to a location that is far away from the current chroma block. In addition, in this instance, a relative location used by the luma block of the current block and a relative location used by the chroma block may not be identical. In addition, reference may be made to another location associated with the chroma block, and thus, a weight may be set by making a location that has a low correlation with the current block. Alternatively, decoding/reconstruction may not be performed according to the order of block decoding.

Referring to FIG. 41, the location at luma-based coordinates in the case of 4:4:4, that is, in the case in which both SubWidthC and SubHeightC are 1, is illustrated. NbA and NbB may be disposed in locations far from a chroma block marked with a solid line.

FIG. 42 is a diagram illustrating a weighted-sample prediction process according to an embodiment of the present disclosure. The embodiment of FIG. 42 may be an embodiment to solve the drawbacks which have been described with reference to FIGS. 39 to 41. In addition, description of the duplicated content of the above-described content will be omitted. In FIG. 40, a neighboring location is set based on scallFact, and scallFact may be a value for transforming a location when SubWidthC and SubHeightC are 2 as described in FIG. 41. However, as described above, a problem may happen depending on a color format, and the ratio of a chroma sample to a luma sample may differ depending on a width and a height. According to an embodiment of the present disclosure, scallFact may be used separately for a width and a height.

According to an embodiment of the present disclosure, scallFactWidth and scallFactHeight may be present, and a neighboring location may be set based on scallFactWidth and scallFactHeight. In addition, the neighboring location may be set based on a luma sample (luma block). In addition, scallFactWidth may be set based on cIdx and SubWidthC. For example, if cIdx is 0 or if SubWidthC is 1, scallFactWidth may be set to 0. Otherwise (if cIdx is different from 0 and SubWidthC is different from 1 (if SubWidthC is 2)), scallFactWidth may be set to 1. In this instance, scallFactWidth may be determined using Equation 12 below.

$$scallFactWidth = (cIdx == 0 || SubWidthC == 1)?0:1 \quad \text{[Equation 12]}$$

In addition, scallFactHeight may be set based on cIdx and SubHeightC. For example, if cIdx is 0 or SubHeightC is 1, scallFactHeight may be set to 0. Otherwise (cIdx is different from 0 and SubHeightC is different from 1 (SubHeightC is 2)), scallFactHeight may be set to 1. In this instance, scallFactHeight may be determined using Equation 13 below.

$$scallFactHeight = (cIdx == 0 || SubHeightC == 1)?0:1 \quad \text{[Equation 13]}$$

In addition, the x coordinate of the neighboring location may be expressed based on scallFactWidth, and the y coordinate of the neighboring location may be expressed based on scallFactHeight. For example, the coordinates of NbB may be expressed based on scallFactWidth. For example, the coordinates of NbA may be expressed based on scallFactHeight. In addition, as described above, the fact that something is based on scallFact Width indicates that the thing is based on SubWidthC, and the fact that something is based on scallFactHeight indicates that the thing is based on SubHeightC. For example, the coordinates of the neighboring location may be as shown in Equation 14 below.

$$(xNbA, yNbA) = \quad \text{[Equation 14]}$$
$$(xCb - 1, yCb + (cbHeight \ll scallFactHeight) - 1)$$
$$(xNbB, yNbB) = (xCb + (cbWidth \ll scallFactWidth) - 1, yCb - 1)$$

In this instance, xCb and yCb may be the coordinates represented based on a luma sample, as described above. In addition, cbWidth and cbHeight may be values represented based on each color component.

Therefore, if it is a chroma block and SubWidthC is 1, (xNbB, yNbB)=(xCb+cbWidth−1, yCb−1). That is, in this instance, the coordinates of NbB associated with a luma block and the coordinates of NbB associated with a chroma block may be identical. In addition, if it is a chroma block and SubHeightC is 1, (xNbA, yNbA)=(xCb−1, yCb+cbHeight−1). That is, in this instance, the coordinates of NbA associated with a luma block and the coordinates of NbA associated with a chroma block may be identical.

Therefore, according to an embodiment of FIG. 42, the coordinates of a neighboring location may be set to be identical to the coordinates in the embodiments of FIGS. 39 and 40 in the case of 4:2:0 format, and the coordinates of a neighboring location may be set to be different from the coordinates in the embodiment of FIGS. 39 and 40 in the case of 4:2:2 format or 4:4:4 format.

Other processes in FIG. 42 may be the same as the processes described with reference to FIG. 40. That is, a prediction mode or availability thereof may be determined based on the coordinates of a neighboring location described in FIG. 42, and a weight for CIIP may be determined. In the present disclosure, a neighboring location and the coordinates of a neighboring location may be interchangeably used.

FIG. 43 is a diagram illustrating a weighted-sample prediction process according to an embodiment of the present disclosure. The embodiment of FIG. 43 may express the coordinates of a neighboring location, which has been described with reference to FIG. 42, in a different manner. Therefore, duplicated content of the above-described content may be omitted. As described above, a bit shift may be expressed as multiplication. FIG. 42 provides description using a bit shift, and FIG. 43 provides description using multiplication.

According to an embodiment, scallFact Width may be set based on cIdx and SubWidthC. For example, if cIdx is 0 or if SubWidthC is 1, scallFactWidth may be set to 1. Otherwise (if cIdx is different from 0 and SubWidthC is different from 1 (if SubWidthC is 2)), scallFactWidth may be set to 2. In this instance, scallFactWidth may be determined using Equation 15 below.

$$scallFactWidth = (cIdx == 0 || SubWidthC == 1)?1:2 \quad \text{[Equation 15]}$$

In addition, scallFactHeight may be set based on cIdx and SubHeightC. For example, if cIdx is 0 or SubHeightC is 1, scallFactHeight may be set to 1. Otherwise (cIdx is different from 0 and SubHeightC is different from 1 (SubHeightC is 2)), scallFactHeight may be set to 2. In this instance, scallFactHeight may be determined using Equation 16 below.

$$scallFactHeight = (cIdx == 0 || SubHeightC == 1)?1:2 \quad \text{[Equation 16]}$$

In addition, the x coordinate of the neighboring location may be expressed based on scallFactWidth, and the y coordinate of the neighboring location may be expressed based on scallFactHeight. For example, the coordinates of NbB may be expressed based on scallFactWidth. For example, the coordinates of NbA may be expressed based on scallFactHeight. In addition, as described above, the fact that something is based on scallFactWidth indicates that the thing is based on SubWidthC, and the fact that something is based on scallFactHeight indicates that the thing is based on SubHeightC. For example, the coordinates of the neighboring location may be as shown in Equation 17 below.

$$(xNbA, yNbA) = \quad \text{[Equation 17]}$$
$$(xCb - 1, yCb + (cbHeight * scallFactHeight) - 1)$$
$$(xNbB, yNbB) = (xCb + (cbWidth * scallFactWidth) - 1, yCb - 1)$$

In this instance, xCb and yCb may be the coordinates represented based on a luma sample, as described above. In addition, cbWidth and cbHeight may be values represented based on each color component.

FIG. 44 is a diagram illustrating a weighted-sample prediction process according to an embodiment of the present disclosure. In the embodiments of FIGS. 40, 42, 43, and the like, whether a corresponding location is available is determined by making reference to a neighboring location. In this instance, cIdx which is an index indicating a color component is set to 0 (a luma component). In addition, in the process of determining whether the corresponding location is available, cIdx may be used for determining whether reconstruction of cIdx of the corresponding location is complete. That is, in the process of determining whether the corresponding location is available, cIdx may be used for determining the value of IsAvailable[cIdx][xNbY][yNbY]. However, in the process of performing a weighted sample prediction process on a chroma block, if reference is made to the value of IsAvailable corresponding to cIdx 0, incorrect determination may be made. For example, in the case in which the reconstruction of a luma component of a block including the neighboring location is incomplete but the reconstruction of a chroma component is complete, if cIdx is different from 0, IsAvailable[0][xNbY][yNbY] may be FALSE and IsAvailable[cIdx][xNbY][yNbY] may be TRUE. Therefore, even though the neighboring location is available, it may be incorrectly determined that the neighboring location is unavailable. In the embodiment of FIG. 44, to solve the problem, cIdx of the current coding block may be used as an input for determining whether the corresponding location is available by making reference to the neighboring location. That is, cIdx of the current coding block may be used as cIdx which is an input for calling "the derivation process for neighboring block availability". In the embodiment, duplicated description of the content described with reference to FIGS. 42 and 43 will be omitted.

In addition, in the process of determining the prediction mode of the neighboring location which has been described, if reference is made to CuPredMode[0][xNbX][yNbY] which is CuPredMode corresponding to chType 0 and that is not identical to chType of the current block, reference may be made to an incorrect parameter. Therefore, according to an embodiment of the present disclosure, when determining the prediction mode of the neighboring location, reference may be made to CuPredMode[chType][xNbX][yNbY] that corresponds to chType corresponding to the current block.

FIG. 45 is a diagram illustrating a video signal processing method based on multi-hypothesis prediction according to an embodiment according of the present disclosure. Referring to FIG. 45, a description will be provided mainly from the perspective of a decoder for ease of description, but the present disclosure is not limited thereto. A video signal processing method based on multi-hypothesis prediction according to the embodiment may be applied to an encoder in substantially the same manner.

Particularly, if a merge mode is applied to a current block, a decoder may obtain a first syntax element indicating whether combined prediction is applied to the current block in operation S4501. Here, the combined prediction may be a prediction mode that combines inter-prediction and intra-prediction. As described above, the present disclosure is not limited to the name, and the multi-hypothesis prediction in the specification may be referred to as multi-prediction, numerous predictions, combined prediction, inter-intra weighted prediction, combined inter-intra prediction, combined inter-intra weighed prediction, or the like. According to an embodiment, in advance of operation S4501, the decoder may receive information for predicting the current block, and may determine whether a merge mode is applied to the current block based on the information for the prediction.

If the first syntax element indicates that the combined prediction is applied to the current block, the decoder may generate an inter-prediction block and an intra-prediction block of the current block in operation S4502. The decoder may generate a combined prediction block by performing a weighted-sum of the inter-prediction block and the intra-prediction block in operation S4503. The decoder may decode a residual block of the current block, and may reconstruct the current block using the combined prediction block and the residual block.

As described above, according to an embodiment, the operation of decoding the residual block may include an operation of obtaining a second syntax element indicating whether sub-block transform is applied to the current block when the first syntax element indicates that the combined prediction is not applied to the current block. That is, sub-block transform may be applied only when the combined prediction is not applied to the current block, and a syntax signaling associated with the application may be performed. Here, the sub-block transform may be a transform mode that applies transform to any one of the sub-blocks of the current block divided in the horizontal direction or vertical direction.

As described above, according to an embodiment, if the second syntax element is not present, the value of the second syntax element may be inferred to be 0.

As described above, according to an embodiment, if the first syntax element indicates that combined prediction is applied to the current block, an intra-prediction mode for intra-prediction of the current block may be set to a planar mode.

As described above, according to an embodiment, the decoder may set the locations of a left neighboring block and an upper side neighboring block to which reference is made for combined prediction, and the combined prediction may be performed based on the intra-prediction mode of the set locations. According to an embodiment, the decoder may determine a weight to be used for combined prediction based on the intra-prediction mode of the set locations. In addition, as described above, the locations of the left neighboring block and the upper side neighboring block may be determined using a scaling factor variable which is determined according to a color component index of the current block.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device, the video signal decoding device comprising:
   a processor,
   wherein the processor is configured to:
   obtain a value of a first syntax element indicating whether a combined prediction is applied to a current block,
   when the first syntax element indicates that the combined prediction is not applied to the current block, obtain a value of a second syntax element indicating whether a sub-block transform is applied to the current block,
   wherein when the second syntax element is not present, the value of the second syntax element is inferred as a value indicating that the sub-block transform is not applied to the current block,
   wherein the combined prediction is a prediction mode using inter-prediction and intra-prediction, and
   wherein the sub-block transform indicates a transform mode that applies transform to part of sub-blocks of the current block divided in a horizontal direction or in a vertical direction,
   when the value of the first syntax element indicates that the combined prediction is applied to the current block, reconstruct the current block based on the combined prediction,
   when the value of the first syntax element indicates that the combined prediction is not applied to the current block and the value of the second syntax element indicates that the sub-block transform is applied to the current block, reconstruct the current block based on the sub-block transform.

2. The video signal decoding device of claim 1, wherein when a merge mode is applied to the current block, the first syntax element is parsed.

3. The video signal decoding device of claim 1, wherein when the value of the first syntax element indicates that the combined prediction is applied to the current block, the current block is reconstructed based on a combined prediction block of the current block, wherein the combined prediction block of the current block is obtained by a weighted-sum of an inter-prediction block and an intra-prediction block, wherein the inter-prediction block is obtained by the merge mode of the inter-prediction for the current block, and the intra-prediction block is obtained by the intra prediction for the current block.

4. The video signal decoding device of claim 3, wherein the intra-prediction block is obtained based on a planar mode.

5. The video signal decoding device of claim 1, wherein neighbouring locations referenced by the combined prediction are (xCb−1, yCb−1+cbHeight) and (xCb−1+cbWidth, yCb−1), wherein (xCb, yCb) is a coordinate of the top-left of the current block, the cbHeight is a height of the current block and the cbWidth is a width of the current block.

6. The video signal decoding device of claim 5, wherein the neighbouring locations are determined using a scaling factor variable which is determined based on a color component index value of the current block.

7. A video signal encoding device, the video signal encoding device comprising:
a processor,
wherein the processor is configured to:
determine whether a combined prediction is applied to a current block,
when the combined prediction is not applied to the current block, determine whether a sub-block transform is applied to the current block,
obtain a bitstream including information related to whether the combined prediction is applied to the current block,
wherein when a second syntax element indicating whether a sub-block transform is applied to the current block is not included in the bitstream, the sub-block transform is not applied to the current block,
wherein the combined prediction is a prediction mode using the merge mode of inter-prediction and intra-prediction, and
wherein the sub-block transform indicates a transform mode that applies transform to part of sub-blocks of the current block divided in a horizontal direction or in a vertical direction,
when the combined prediction is applied to the current block, reconstruct the current block based on the combined prediction,
when the combined prediction is not applied to the current block and the sub-block transform is applied to the current block, reconstruct the current block based on the sub-block transform.

8. The video signal encoding device of claim 7, wherein when a merge mode is applied to the current block, a first syntax element indicating whether the combined prediction is applied to the current block is included in the bitstream.

9. The video signal encoding device of claim 7, wherein when the combined prediction is applied to the current block, the current block is reconstructed based on a combined prediction block of the current block, wherein the combined prediction block of the current block is obtained by a weighted-sum of an inter-prediction block and an intra-prediction block, wherein the inter-prediction block is obtained by the merge mode of the inter-prediction for the current block, and the intra-prediction block is obtained by the intra prediction for the current block.

10. The video signal encoding device of claim 9, wherein the intra-prediction block is obtained based on a planar mode.

11. The video signal encoding device of claim 7, wherein neighbouring locations referenced by the combined prediction are (xCb−1, yCb−1+cbHeight) and (xCb−1+cbWidth, yCb−1), wherein (xCb, yCb) is a coordinate of the top-left of the current block, the cbHeight is a height of the current block and the cbWidth is a width of the current block.

12. The video signal encoding device of claim 11, wherein the neighbouring locations are determined using a scaling factor variable which is determined based on a color component index value of the current block.

13. A method of obtaining a bitstream, the method comprising:
determining whether a combined prediction is applied to a current block;
when the combined prediction is not applied to the current block, determining whether a sub-block transform is applied to the current block; and
obtaining the bitstream including information related to whether the combined prediction is applied to the current block,
wherein when a second syntax element indicating whether a sub-block transform is applied to the current block is not included in the bitstream, the sub-block transform is not applied to the current block,
wherein the combined prediction is a prediction mode using the merge mode of inter-prediction and intra-prediction, and
wherein the sub-block transform indicates a transform mode that applies transform to part of sub-blocks of the current block divided in a horizontal direction or in a vertical direction,
when the combined prediction is applied to the current block, reconstruct the current block based on the combined prediction,
when the combined prediction is not applied to the current block and the sub-block transform is applied to the current block, reconstruct the current block based on the sub-block transform.

14. The method of claim 13, wherein when a merge mode is applied to the current block, a first syntax element indicating whether the combined prediction is applied to the current block is included in the bitstream.

15. The method of claim 13, wherein when the combined prediction is applied to the current block, the current block is reconstructed based on a combined prediction block of the current block, wherein the combined prediction block of the current block is obtained by a weighted-sum of an inter-prediction block and an intra-prediction block, wherein the inter-prediction block is obtained by the merge mode of the inter-prediction for the current block, and the intra-prediction block is obtained by the intra prediction for the current block.

16. The method of claim 15, wherein the intra-prediction block is obtained based on a planar mode.

17. The method of claim 13, wherein neighbouring locations referenced by the combined prediction are (xCb−1, yCb−1+cbHeight) and (xCb−1+cbWidth, yCb−1), wherein (xCb, yCb) is a coordinate of the top-left of the current block, the cbHeight is a height of the current block and the cbWidth is a width of the current block.

18. The method of claim 17,
wherein the neighbouring locations are determined using a scaling factor variable which is determined based on a color component index value of the current block.

19. A method of video signal processing, the method comprising:
- obtaining a value of a first syntax element indicating whether a combined prediction is applied to a current block; and
- when the first syntax element indicates that the combined prediction is not applied to the current block, obtaining a value of a second syntax element indicating whether a sub-block transform is applied to the current block,
- wherein when the second syntax element is not present, the value of the second syntax element is inferred as a value indicating that the sub-block transform is not applied to the current block,
- wherein the combined prediction is a prediction mode using inter-prediction and intra-prediction, and
- wherein the sub-block transform indicates a transform mode that applies transform to part of sub-blocks of the current block divided in a horizontal direction or in a vertical direction,
- when the value of the first syntax element indicates that the combined prediction is applied to the current block, reconstruct the current block based on the combined prediction,
- when the value of the first syntax element indicates that the combined prediction is not applied to the current block and the value of the second syntax element indicates that the sub-block transform is applied to the current block, reconstruct the current block based on the sub-block transform.

20. The method of claim 19, the method further comprising:
- wherein when a merge mode is applied to the current block, the first syntax element is parsed.

* * * * *